United States Patent [19]

Litteral et al.

[11] 4,071,483

[45] Jan. 31, 1978

[54] POLYSILOXANE-POLYOXYALKYLENE BLOCK COPOLYMERS AS STABILIZERS IN THE PRODUCTION OF URETHANE FOAM

[75] Inventors: Carl James Litteral, Marietta, Ohio; David Lee Mullins, Williamstown, W. Va.

[73] Assignee: Union Carbide Corporation, New York, N.Y.

[21] Appl. No.: 701,669

[22] Filed: July 1, 1976

Related U.S. Application Data

[62] Division of Ser. No. 507,998, Sept. 20, 1974, Pat. No. 3,980,688.

[51] Int. Cl.$^2$ ............................................. C08G 18/14
[52] U.S. Cl. ............................................. 260/2.5 AH
[58] Field of Search ................................. 260/2.5 AH

[56] References Cited

U.S. PATENT DOCUMENTS

| | | | |
|---|---|---|---|
| 3,634,344 | 1/1972 | Koerner | 260/2.5 AH |
| 3,637,541 | 1/1972 | Rossmy | 260/2.5 AH |
| 3,723,491 | 3/1973 | Rossmy | 260/2.5 AH |
| 3,801,616 | 4/1974 | Litteral | 260/2.5 AH |
| 3,980,688 | 9/1976 | Litteral | 260/448.8 R |
| 4,025,456 | 5/1977 | Litteral | 252/351 |

*Primary Examiner*—C. Warren Ivy
*Attorney, Agent, or Firm*—Reynold J. Finnegan

[57] ABSTRACT

Polyoxyalkylene polyether admixtures and polysiloxane-polyoxyalkylene block copolymers, a solventless process for producing said copolymers using said admixtures, a process for producing flexible polyether polyurethane foam using said copolymers as foam stabilizers and the foam produced thereby.

23 Claims, No Drawings

POLYSILOXANE-POLYOXYALKYLENE BLOCK COPOLYMERS AS STABILIZERS IN THE PRODUCTION OF URETHANE FOAM

BACKGROUND OF THE INVENTION

Polysiloxane-polyoxyalkylene block copolymers have found wide acceptance as foam stabilizers in the production of polyurethane foam. Such blocks copolymers include those copolymers whereby the polysiloxane and polyoxyalkylene blocks are linked by hydrolytically unstable silicon-oxygen-carbon bonds which copolymers are often referred to as hydrolyzable polysiloxane-polyoxyalkylene block copolymers, as well as those copolymers whereby said blocks are linked by hydrolytically stable silicon-carbon bonds, which copolymers are often referred to as non-hydrolyzable polysiloxane-polyoxyalkylene block copolymers.

Hydrolyzable polysiloxane-polyoxyalkylene block copolymers can be prepared by a variety of common chemical reactions, e.g. by reacting a linear polyoxyalkylene polymer (polyether) whose linear chain is end blocked at one end by a hydroxyl group and at the other end by an alkoxy, aryloxy, or aralkyloxy group, with a polysiloxane containing a silanic hydrogen, an alkoxy radical, an amino radical, or a halogen atom directly attached to a silicon atom of the polysiloxane, as shown e.g. by the following skeletal equations:

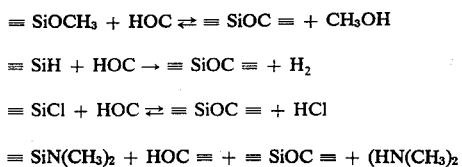

Non-hydrolyzable polysiloxane-polyoxyalkylene block copolymers are usually prepared by the platinum catalyzed addition reaction of a siloxane containing silanic hydrogen with a linear polyoxyalkylene polymer (polyether) whose linear chain is end blocked at one end by an alkenyloxy group (e.g. allyloxy) and at the other end by an alkoxy, aryloxy, aralkyloxy, or an acyloxy group, as shown e.g. by the following skeletal equation:

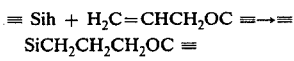

Thus, polysiloxane-polyoxyalkylene block copolymers in general are normally prepared by mixing the polysiloxane and polyoxyalkylene reactants in the presence of a solvent and a catalyst, effecting the required chemical reaction, neutralizing the catalyst, removing the solvent, and filtering. Of course, it is understood that reactions which produce a by-product that is in equilibrium with the desired product and reactants must be driven to completion. For example, a compound such as an organic amine may be added to react with the hydrogen chloride produced by the reaction of a ployoxyalkylene alcohol with a chlorosiloxane as shown above, while the methanol produced by the reaction of a polyoxyalkylene alcohol with methoxysiloxane as shown above, may be removed by distillation. The employment of a solvent increases the cost of the operation to produce suitable polysiloxane-polyoxyalkylene block copolymer foam stabilizers for polyurethane foam: by reducing the amount of block copolymer that can be prepared per batch in a given reactor; by increasing the time required to prepare a batch of the block copolymer by the time required to remove the solvent; and by adding the cost of the solvent to the raw material cost of the block copolymer. It is quite obviously desirable then to be able to reduce or eliminate the required use of a solvent in the production of suitable polysiloxanepolyoxyalkylene block copolymer foam stabilizers for polyurethane foam.

Moreover, it is also well known that both the polysiloxane blocks and the polyoxyalkylene blocks of polysiloxane-polyoxyalkylene block copolymers employed as foam stabilizing agents for polyurethane foam are comprised of a mixture of molecular species. The polysiloxane blocks (e.g., polydimethylsiloxane) have species distributed by molecular weight, by the number of coupling sites in a molecule and by the position of the coupling sites in a molecule, while polyoxyalkylene blocks (e.g. polyoxyethylene-oxypropylene) have species distributed by molecular weight and by the proportion of ethylene oxide and propylene oxide units within a molecule. The polysiloxane-polyoxyalkylene block copolymers then have polyoxyalkylene blocks representing various molecules in the mixture distributed on different polysiloxane molecules.

SUMMARY OF THE INVENTION

It has now been surprisingly discovered that the distribution of the molecular species of the polysiloxane-polyoxyalkylene block copolymers has a definite effect on the polysiloxane-polyoxyalkylene block copolymers performance as a foam stabilizing agent.

Therefore it is an object of this invention to provide a novel admixture of polyoxyalkylene copolymers. Another object of this invention is to provide novel polysiloxane-polyoxyalkylene block copolymers derived from the above-mentioned novel admixture of polyoxyalkylene copolymers and to provide a novel solventless process for producing such polysiloxane-polyoxyalkylene block copolymers. Still another object of this invention is to provide a process for producing polyurethane foams employing such novel polysiloxane-polyoxyalkylene block copolymers as foam stabilizers, and to provide polyurethane foam products produced thereby. Other objects and advantages of this invention will become readily apparent from the following description and appended claims.

Accordingly, this invention provide as novel compositions of matter an admixture consisting essentially of from about 20 to about 80 percent by weight of component (A) and from about 80 to about 20 percent by weight of component (B), said percentages being based on the total weight of components (A) and (B) present in the admixture, wherein component (A) represents low molecular weight polyoxyalkylene polyether, said polyether being selected from the class consisting of (i) a polyoxyakylene copolymer having an average molecular weight in the range of from about 800 to about 2300 wherein about 20 to about 60 weight percent of the oxyalkylene groups of said copolymer are oxyethylene, the remainder of the oxyalkylene groups being oxypropylene, and (ii) a blend of at least two polyoxyalkene copolymers having different average molecular weights in the range of from about 500 to about 2900 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 800 to about 2300; and wherein component (B) represents high molecular weight polyoxyalkylene polyether, said polyether being selected from the class consisting of (i) a polyoxyalkylene copolymer having an average molecular weight in the range of from about 3400 to about 5500, wherein about 20 to about 60 weight percent of the oxyalkylene groups of said copolymer are oxyethylene, the remainder of the oxyalkylene groups being oxypropylene, and (ii) a blend of at least two polyoxyalkylene copolymers having different average molecular weights in the range of from about 3000 to about 5500 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range from about 3400 to 5500, and wherein the polyoxyalkylene copolymers of (A) and (B) contain terminal groups selected from the class consisting of hydroxy and alkenyloxy at one end of the copolymer and terminal groups selected from the class consisting of alkoxy, aryloxy and aralkyloxy at the other end of the copolymer, with the proviso that when the copolyner contains a terminal alkenyloxy group at one end, the terminal group at the other end of the copolymer can also be acyloxy; with the added proviso that said admixture of (A) and (B) has an average molecular weight in the range of about 1600 to abot 2900.

The novel polysiloxane-polyoxyalkylene block copolymers of this invention consist essentially of from about 15 to about 35 percent by weight of polysiloxane blocks and from about 85 to about 65 percent by weight of polyoxyalkylene blocks, and further consist essentially of siloxy units of the formula $R_2SiO$, siloxy units selected from the group consisting of those of the formulas $(R)(Q)SiO$ and $RSiO3/2$ and terminal siloxy units selected from the class consisting of those of the formulas $R_3SiO1/2$ and $(R_2)(Q)SiO1/2$, wherein the average number of total siloxy units per molecule of the polysiloxane-polyoxyalkylene block copolymer ranges from about 20 to about 200, wherein from about 6 to about 15 percent of said total siloxy units are selected from the group consisting of $(R)(Q)SiO$ and $(R_2)(Q)SiO1/2$ and wherein there are no more than about four $RSiO_{3/2}$ siloxy units per average polysiloxane molecule, wherein each R individually represents a monovalent hydrocarbon radical or a substituted monovalent hydrocarbon radical, said radicals being free from aliphatic multiple carbon to carbon bonds, and wherein each Q individually represents a polyoxyalkylene polyether block having the formula —MX wherein each M is a bridging group individually selected from the class consisting of —O— —$C_nH_{2n}O$— wherein n has a value of 2 or 3, and X ia a polyoxyalkylene radical consisting essentially of an admixture of Units A and B of the formula $(C_2H_4O)_x(C_3H_6)_yZ$ wherein Z is a terminal group selected from the class consisting of alkyl, aryl and aralkyl radicals, with the proviso that when M is —$C_nH_{2n}O$— as defined above, Z can also be a terminal acyl radical, the values of x and y being determined by the following conditions prevailing for Units A and B;

Unit A repesenting from about 20 to about 80 percent by weight of low molecular weight polyoxalkylene polyether based on the total weight of Units A and B in said admixture; said polyether being selected from the class consisting of (i) a polyoxyalkylene copolymer having an average molecular weight in the range of from about 800 to about 2300 wherein about 20 to about 60 weight percent of the oxyalkylene groups said copolymer are oxyethylene, the remainder of the oxyalkylene groups being oxypropylene, and (ii) a blend of at least two polyoxyalkylene copolymers having different average molecular weights in the range of from about 500 to about 2900 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 800 to about 2300; and Unit B representing from about 80 to about 20 percent by weight of high molecular weight polyoxyalkylene polyether based on the total weight of Units A and B in said admixture said polyether being selected from the class consisting of (i) a polyoxyalkylene copolymer having an average molecular weight in the range of from about 3400 to about 5500 wherein about 20 to about 60 weight percent of the oxyalkylene groups of said copolymer are oxyethylene, the remainder of the oxyalkylene groups being oxypropylene, and (ii) a blend of at least two polyoxyalkylene copolymers having different average molecular weights in the range of from about 3000 to about 5500 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 3400 to about 5500; and with the added proviso that said admixture of units A and B has an average molecular weight in the range of from about 1600 to about 2900.

This invention further provides an improved process for producing the novel polysiloxane-polyoxyalkylene block copolymers as defined above by reacting a polysiloxane polymer with a polyoxyalkylene polyether in the presence of a catalyst, the improvement which comprises carrying out the process in the absence of a solvent and employing as the polyoxyalkylene polyether composition of matter an admixture consisting essentially of from about 20 to about 80 percent by weight of component (A) and from about 80 to about 20 percent by weight of component (B), said percentages being based on the total weight of components (A) and (B) present in the admixture wherein component (A) represents low molecular weight polyoxyalkylene polyether, said polyether being selected from the class consisting of (i) polyoxyalkylene copolymer having an average molecular weight in the range of from about 800 to about 2300 wherein about 20 to about 60 weight percentof the oxyalkylene groups of said copolymer are oxyethylene, the remainder of the oxyalkylene groups being oxypropylene, and (ii) a blend of at least two polyoxyalkylene copolymers having different average molecular weights in the range of from about 500 to about 2900 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 800 to about 2300; wherein component (B) represents high molecular weight polyoxyalkylene polyether, said polyether being selected from the class consisting of (i) a polyoxyalkylene copolymer having an average molecular weight in the range of from about 3400 to about 5500 wherein about 20 to about 60 weight percent of the oxyalkylene groups of said copolymer are oxyethylene, the remainder of the oxyalkylene groups being oxypropylene, and (ii) a blend of at least two polyoxyalkylene copolymers having different average molecular weights in the range of from about 3000 to about 5500 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 3400 to about 5500; and wherein the polyoxyalkylene copolymers of (A) and (B) contain terminal groups selected from the class consisting of hydroxy and alkenyloxy at one end of the copolymer and terminal groups selected from the class consisting of alkoxy, aryloxy and aralkyloxy at the other end of the copolymer, with the proviso that when the copolymer contains a terminal alkenyloxy group at one end, the terminal group at the other end of the copolymer can also be acyloxy; and with the added proviso that said admixture of (A) and (B) has an averagemolecular weight in the range of from about 1600 to about 2900.

This invention also provides a method for producing a flexible polyether polyurethane foam by simultaneously reacting and foaming a mixture of (a) a polyether containing at least two hydroxyl groups per molecule, (b) an organic polyisocyanate, (c) a catalyst for the reaction of (a) and (b) to produce the polyurethane, (d) a blowing agent and (e) a novel polysiloxane-polyoxyalkylene block copolymer as defined above as a foam stabilizer.

This invention still further provides a flexible polyether polyurethane foam as produced by the above defined method.

While the use of polyoxyalkylene polyether and mixtures thereof to produce polysiloxane-polyoxyalkylene block copolymer foam stabilizers for polyether urethane foam is well known, as pointed out above, such foam stabilizers are usually prepared in the presence of a solvent (e.g. toluene) capable of dissolving the polysiloxane and polyoxyalkylene blocks as seen e.g. by U.S. Pat. Nos. 2,834,748, 3,637,541 and 3,801,616. It has now been discovered that excellent polysiloxanepolyoxyalkylene block copolymer foam stabilizers for flexible polyether polyurethane foam can be prepared in the absence of a solvent by employing as the polyether reactant the above defined novel admixture of polyoxyalkylene polyethers of this invention. This discovery is indeed surprising since it is connected to the novel discovery that the distribution of the molecular species of the polysiloxane-polyoxyalkylene block copolymers has a definite effect on the polysiloxane-polyoxyalkylene block copolymers performance as a foam stabilizing agent for flexible polyether polyurethane foam. For instance, polysiloxane-polyoxyalkylene block copolymers produced in the absence of a solvent using polyoxyalkylene polyether having an average molecular weight in the range commonly employed for foam stabilizers of flexible polyether poluyrethane foam but outside of the scope of above defined novel admixture of polyoxyalkylene polyethers of this invention have been found to inadequately stabilize flexible polyether polyurethane foam or must be used in higher concentrations than those of the instant invention.

Thus, the instant invention involves the discovery hat polysiloxane-polyoxyalkylene block copolymers prepared without a solvent require a polyoxyalkylene block containing a broad distribution of molecular species and that this distribution must contain a significant portion of high molecular weight species in order for said copolymers to function as suitable foam stabilizers for flexible polyether polyurethane foam.

Accordingly the novel admixtures of polyoxyalkylene polyether of this invention as defined above contain several essential features. For instance, the admixture must consist of at least two distinct polyoxyalkylene polyethers having different average molecular weights, i.e., low molecular weight polyoxyalkylene polyether and high molecular weight polyoxyalkylene polyether. Of course, it is obvious that the said novel admixture of this invention is not to be misinterpreted as encompassing merely the different species that may constitute a polyoxyalkylene polyether having a specific average molecular weight as produced. The low molecular weight ppolyoxyalkylene polyether in said admixture must constitute from about 20 to about 80 percent by weight of said admixture based on the tota weight of said low and high molecular weight polyoxyalkylene polyethers present in said admixture and must have an average molecular weight in the range of about 800 to about 2300, although it may also consist of a blend of at least two distinct polyoxyalkylene copolymers having different average molecular weights the lowest of which is at least about 500 and the highest of which is about 2900. Of course, it is understood that the total number of polyoxyalkylene copolymers in said blend of low molecular weight polyoxyalkylene copolymers is immaterial so long as the blend has an average molecular weight in the range of about 800 to about 2300. The high molecular weight polyoxyalkylene polyether in said admixture must constitute from about 80 to about 20 percent by weight of said admixture based on the total weight of said low and high molecular weight polyoxyalkylene polyethers present in said admixture and must have an average molecualr weight in the range of about 3400 to about 5500, although it may also consist of a blend of at least two distinct polyoxyalkylene copolymers having different average molecular weights the lowest of which is at least about 3000 and the highest of which is at least about 5500. Of course, it is understood that the total number of polyoxyalkylene copolymers in said blend of high molecular weight polyoxyalkylene copolymers is immaterial so long as the blend has an average molecular weight in the range of about 3400 to about 5500. Moreover the proportions of said low and high molecular weight polyoxyalkylene polyethers must be such that said novel admixture of same has an average molecular weight in the range of from about 1600 to about 2900 and it should be obvious that the total number of different low and high molecular weight polyoxyalkylene polyethers in the admixture is also immaterial so long as this essential feature is met along with the other features defined herein. About 20 to 60 weight percent of the oxyalkylene groups of the polyoxyalkylene copolymers (be they low or high molecular weight polyoxyalkylene polyethers) in said novel admixture must be oxyethylene, the remainder of the oxyalkylene groups of said copolymers being oxypropylene. Of course it is to be understood that the oxyethylene and oxypropylene groups of said copolymers may be present in the polyoxyalkylene block in a random or block fashion. Finally, the polyoxyalkylene copolymers (be they low or high molecular weight polyoxyalkylene polyethers) in said novel admixture are terminated by terminal or end-blocking groups selected from the class consisting of hydroxy and alkenyloxy (e.g. vinyloxy, allyloxy, and the like) at one end of the copolymer and by termainal or end-blocking groups selected from the class consisting of alkoxy (e.g. methoxy, ethoxy, propoxy, butoxy and the like), aryloxy (e.g. phenoxy, and the like), aralkyloxy (e.g. phenylethoxy, and the like) at the other end of the copolymer, with the proviso that when the copolymer contains a terminal alkenyloxy group at one end, the terminal group at the other end of the copolymer can also be acyloxy (e.g. acetoxy, and the like).

The polyoxyalkylene polyether components of the novel admixtures of this invention are poly(oxyethyleneoxypropylene) copolymers as pointed out above. Such copolymers are well known in the art and/or can be produced by any conventional process. For instance, the desired monohydroxy terminated polyoxyalkylene polyethers used in this invention can be prepared by reacting a suitable alcohol with both ethylene oxide and propylene oxide (1,2-propylene oxide). Suitable alcohols are alkanols, e.g. methanol, ethanol, propanol, isopropanol, butanol, tertiary butanol, and the like; hydroxy aryl compounds, e.g. phenol, and the like; hydroxy aralkyl compounds, e.g. 2-phenyl ethanol, and the like; and hydroxy alkenyl compounds, e.g. allyl alcohol and the like. In general the alcohol starter preferably is placed in an autoclave or other high-pressure vessel along with catalytic amounts of a suitable catalyst, such as sodium hydroxide, potassium hydroxide, other alkali metal hydroxides, or sodium or other alkali metals. The ethylene oxide and propylene oxide is then injected into the starter and catalyst and, the reaction being exothermic, the temperature increases, and preferably is controlled at 70° C. to 120° C. The ethylene oxide and propylene oxide are preferably premixed and injected together to produce copolymers having oxyethylene and oxypropylene units in random distribution, although if desired they may be separately injected simultaneously to also produce a random distribution of oxide units or one oxide may be injected to produce an oxide block of desired size and then the other oxide injected to produce another oxide block of desired size. The latter procedure may be repeated to produce more than two such oxide blocks as desired. Since the oxides are normally gaseous materials, pressure is controlled preferably at 50 to 70 p.s.i.g. The oxides are preferably injected over a period of time until the poly(oxyethylene-oxypropylene) copolymer of the desired average molecular weight size is obtained. The rate of injection can be regulated to help control the pressure and temperature within the autoclave. The proportions of starter and oxide (as well as the percentage of ethylene oxide to propylene oxide) used can be varied, as desired to produce the polyoxyalkylene polyethers of the desired average molecular weight. Said percentage and average molecular weight of the polyoxyalkylene polyethers used in this invention as well as the preferred embodiments thereof have already been defined above. Of course, it is understood and well known in the art that the resulting polyethers comprise mixtures of copolymers containing different amounts of combined alkylene oxide and thus have different molecular weights from molecule to molecule and that the formulas of the polyoxyalkylene copolymers and radicals given herein represent average compositions.

The above-described alcohol-oxide reaction produces a monohydroxy endblocked poly(oxyethyleneoxypropylene) copolymer in which the other endblocking group is an alkoxy, aryloxy, aralkyloxy, or alkenyloxy radical.

The desired monoalkenyloxy terminated polyoxyalkylene polyethers used in this invention can be prepared by converting (capping) the hydroxyl terminal group of said monohydroxy endblocked poly(oxyethyleneoxypropylene) copolymers by any conventional means. For example, when the monohydroxy terminated copolymer is started with an alkanol, hydroxy aryl or hydroxy aralkyl compound the copolymer can be reacted with an alkali metal alkoxide preferably sodium methoxide to produce the alkali metal alkoxide of the copolymer which is then reacted with an alkenyl halide, preferably a chloride and especially allyl chloride, to give the desired monoalkenyloxy endblocked poly(oxyethyleneoxypropylene) copolymers in which the other endblocking group is alkoxy, aryloxy, or aralkyloxy radical. Alternatively, when the monohydroxy terminated copolymer is started with an hydroxy alkenyl compound, the hydroxyl terminal group of the copolymer can be capped in the same manner using alkyl, aryl or aralkyl halides (preferably chlorides) or by esterifying said hydroxy terminal group with an acyl (preferably acetic anhydride) compound to give the desired monoalkenyloxy endblocked poly(oxyethylene-oxypropylene) copolymers in which the other endblocking group is an alkoxy, aryloxy, aralkyloxy or acyloxy radical.

Thus the polyoxyalkylene polyethers in the novel admixture of this invention may if desired be represented by the average formula:

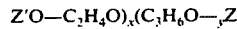

$$Z'O-C_2H_4O)_x(C_3H_6O-)_yZ$$

wherein $x$ and $y$ are determined by the above defined average molecular weight of the copolymers and ratio of oxyethylene groups to oxypropylene groups in the copolymer. Z' is hydrogen or an alkenyl radical and Z is an alkyl, aryl or an aralkyl, radical with the proviso that when Z' is alkenyl, Z can also be an acyl radical. Illustrative examples of such polyoxyalkylene polyethers then include those having the average formulas

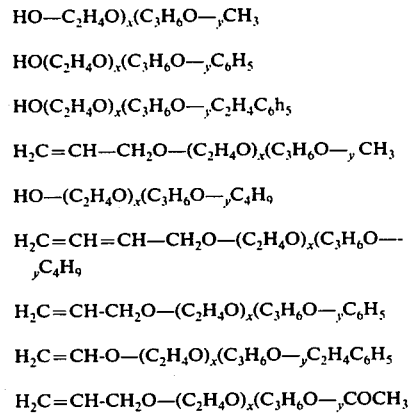

$HO-C_2H_4O)_x(C_3H_6O-)_yCH_3$ $HO(C_2H_4O)_x(C_3H_6O-)_yC_6H_5$ $HO(C_2H_4O)_x(C_3H_6O-)_yC_2H_4C_6H_5$ $H_2C=CH-CH_2O-(C_2H_4O)_x(C_3H_6O-)_yCH_3$ $HO-(C_2H_4O)_x(C_3H_6O-)_yC_4H_9$ $H_2C=CH-CH-CH_2O-(C_2H_4O)_x(C_3H_6O-)_yC_4H_9$ $H_2C=CH-CH_2O-(C_2H_4O)_x(C_3H_6O-)_yC_6H_5$ $H_2C=CH-O-(C_2H_4O)_x(C_3H_6O-)_yC_2H_4C_6H_5$ $H_2C=CH-CH_2O-(C_2H_4O)_x(C_3H_6O-)_yCOCH_3$ and the like, where $x$ and $y$ are the same as defined above. Of course it is to be understood that the novel polyether admixtures of this invention can consist of only one type of endblocked polyoxyalkylene copolymer or any combination of the different types of endblocked polyoxyalkylene copolymers. Indeed such admixtures can simultaneously consist of both such types of polyoxyalkylene polyethers as the monohydroxy terminated polyoxyalkylene copolymers and the monoalkenyloxy terminated polyoxyalkylene copolymers if desired. Of course, it is to be also understood that a minor amount of polyoxy alkylene copolymers (be they low or high molecular weight polyoxyalkylene polyethers) that are simultaneously terminated at both ends e.g. by the same hydroxy, alkenyloxy, alkoxy, aryloxy, aralkyloxy or acyloxy groups may be present in said novel admixture due to their possible production in the making of the desired polyoxyalkylene polyethers or by their deliberate addition if desired so long as said minor amount of polyoxyalkylene copolymers does not adversely effect the desired result of the instant invention.

Accordingly, one preferred class of the novel compositions of matter of this invention are admixtures consisting essentially of from about 20 to about 80 percent by weight (preferably from about 25 to about 50) percent by weight of (A) a low molecular weight polyoxyalkylene copolymer having an average molecular weight in the range of from about 800 to about 2300 (preferably from about 900 to about 1300) wherein about 20 to about 60 (preferably about 30 to about 55) weight percent of the oxyalkylene groups of said copolymer are oxyethylene, the remainder of the oxyalkylene groups being oxypropylene; and from about 80 to about 20 (preferably from about 75 to about 50) percent by weight of (B) a high molecular weight polyoxyalkylene copolymer having an average molecular weight in the range of from about 3400 to about 5500 (preferably from about 3800 to about 5000), wherein about 20 to about 60 (preferably about 30 to about 55) weight percent of the oxyalkylene groups of said copolymer are oxyethylene, the remainder of the oxyalkylene groups being oxypropylene; and wherein the polyoxyalkylene copolymers of (A) and (B) contain terminal groups selected from the class consisting of hydroxy an alkenyloxy at one end of the copolymer and terminal groups selected from the class consisting of alkoxy, aryloxy and aralkyloxy at the other end of the copolymer, with the proviso that when the copolymer contains a terminal alkenyloxy group at one end, the terminal group at the other end of the copolymer can also be acyloxy; with the added proviso that said admixture of (A) and (B) has an average molecular weight in the range of from about 1600 to about 2900 (preferably about 2000 to about 2400). The preferred terminal groups are alkenyloxy (especially allyloxy) and alkoxy (especially butoxy). Said weight percentages of (A) and (B) are of course based on the total weight of (A) and (B) present in the admixture.

Another preferred class of novel compositions of matter of this invention are admixtures consisting essentially of from about 20 to about 80 (preferably from about 30 to about 60) percent by weight of (A) a blend of at least two low molecular weight polyoxyalkylene copolymers having different average molecular weights in the range of about 500 to about 2900 (preferably at least one of said copolymers has an average molecular weight in the range of about 900 to about 1300 and at least one of said copolymers has an average molecular weight in the range of about 1700 to about 2900) and wherein about 20 to about 60 (preferably about 30 to about 55) weight percent of the oxyalkylene groups of the copolymers in said blend are oxyethylene, the remainder of the oxyalkylene groups being oxypropylene, with the proviso that said blend has an average molecular weight in the range of from about 800 to about 2300 (preferably from about 110 to about 1900); and from about 80 to about 20 (preferably from about 70 to about 40) percent by weight of (B) a high molecular weight polyoxyalkylene copolymer having an average molecular weight in the range of from about 3400 to about 5500 (preferably from about 3800 to about 5000), wherein about 20 to about 60 (preferably from 30 to about 55) weight percent of the oxyalkylene groups of said copolymer are oxethylene, the remainder of the oxyalkylene groups being oxypropylene, and wherein the polyoxalkylene copolymers of (A) and (B) contain terminal groups selected from the class consisting of hydroxy and alkenyloxy (e.g. allyloxy) at one end of the copolymer and terminal groups selected from the class consisting of alkoxy, aryloxy and aralkyloxy at the other end of the copolymer, with the proviso that when the copolymer contains a terminal alkenyloxy group at one end, the terminal group at the other end of the copolymer can also be acyloxy; and with the added proviso that said admixture of (A) and (B) has an average molecular weight in the range of from about 1600 to about 2900. Said weight percentages of (A) and (B) are of course based on the total weight of (A) and (B) present in the admixture.

Still another preferred class of novel compositions of matter of this invention are admixtures consisting essentially of from about 20 to about 80 (preferably from about 30 to about 60) percent by weight of a low molecular weight polyoxyalkylene copolymer having an average molecular weight in the range of from about 800 to about 2300 (preferably about 900 to about 1300) wherein about 20 to about 60 (preferably about 30 to about 55) weight percent of the oxyalkylene groups of said copolymer ar oxyethylene, the remainder of the oxyalkylene groups being oxypropylene; and from about 80 to about 20 (preferably from about 70 to about 40) percent by weight of (B) a blend of at least two high molecular weight polyoxyalkylene copolymers having different average molecular weights in the range of about 3000 to about 5500, (preferably at least one of said copolymers has an average molecular weight in the range of abut 3000 to about 3400 and at least one of said copolymers has an average molecular weight in the range of about 3800 to about 5000), wherein about 20 to about 60 (preferably about 30 to about 55) weight percent of the oxyalkylene groups of the copolymers in said blend are oxyethylene, the remainder of the oxyalkylene groups being oxypropylene, with the proviso that said blend has an average molecular weight in the range of from about 3400 to about 5500 (preferably about 3400 to about 50009 and wherein the polyoxyalkylene copolymers of (A) and (B) contain terminal groups selected from the class consisting of hydroxy and alkenyloxy at one end of the copolymer and terminal groups selected from the class consisting of alkoxy, aryloxy and aralkyloxy at the other end of the copolymer, with the proviso that when the copolymer contains a terminal alkenyloxy group at one end, the terminal group at the other end of the copolymer can also be acyloxy; and with the added proviso that said admixture of (A) and (B) has an average molecular weight in the range of about 1600 to about 2900 (preferably about 1600 to about 2600). Said weight percentages of (A) and (B) are of course based on the total weight of (A) and (B) present in the admixture.

Yet another preferred class of novel compositons of matter of this invention are admixtures consisting essentially of from about 20 to about 80 percent by weight of (A) a blend of at least two low molecular weight polyoxyalkylene copolymers having different average molecular weights in the range of about 500 to about 2900 and wherein about 20 to about 60 weight percent of the oxyalkylene groups of the copolymers in said blend ar oxyethylene, the remainder of the oxyalkylene groups being oxypropylene, with the proviso that said blend has an average molecular weight in the range of from about 800 to about 2300; and from about 80 to about 20 percent by weight of (B) a blend of at least two high molecular weight polyoxyalkylene copolymers having different average molecular weights in the range of about 3000 to about 5500, wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 3400 to about 5500; and wherein the polyoxyalkylene copolymers of (A) and (B) contain terminal groups selected from the class consisting of hydroxy and alkenyloxy at one end of the copolymer and terminal groups selected from the class consisting of alkoxy, aryloxy and aralkyloxy at the other end of the copolymer, with the proviso that when the copolymer contains a terminal alkenyloxy group at one end, the terminal group at the other end of the copolymer can also be acyloxy; and with the added proviso that said admixture of (A) and (B) has an average molecular weight in the range of about 1600 to about 2900. Said weight percentages of (A) and (B) are of course, based on the total weight of (A) and (B) present in the admixture.

The method of producing the novel polysiloxane-polyoxyalkylene block copolymers of this invention can be conducted in the same manner as any conventional known method for producing polysiloxanepolyoxyalkylene block copolymers such as described e.g. in U.S. Pat. Nos. 2,834,748, 2,970,150 and 3,801,616. Such conventional methods have been described above and involve the common chemical reactions of reacting the polyoxyalkylene polyether with a polysiloxane containing a silanic hydrogen, an alkoxy radical, an amino radical or a halogen atom directly attached to a silicon atom of the polysiloxane at elevated temperatures, e.g. from about 60° C to about 140° C. in the presence of a catalyst such as trifluoroacetic acid, platinum catalysts (e.g. chloroplatinic acid), and the like, and in the presence of a solvent (e.g. liquid hydrocarbons, such as toluene and the like) for the polyoxyalkylene polyether and polysiloxane reactants. The usual conventional amounts of components and reaction conditions can be employed and such is well within the knowledge of one skilled in the art. For instance, approximately stoichiometric amounts or slightly higher of the polyoxyalkylene polyether and the functional containing polysiloxane reactants (one hydroxy or alkenyloxy polyether group per silanic hydrogen or silicon-bonded alkoxy, amino or halogen radical) are preferred, while the amount of catalyst need obviously only be a catalytic amount. The temperature of the reaction, of course, largely depends merely on the reactants involved and the polysiloxane-polyoxyalkylene block copolymer desired to be produced.

The polysiloxane functional containing reactants used to produce the novel polysiloxane-polyoxyalkylene block copolymers of this invention as well as methods for their production are well known in the art. Illustrative of such polysiloxanes are those polymers consisting essentially of siloxy units of the formula $R_2SiO$, siloxy units selected from the group consisting of (R) (L)SiO and $RSiO3/2$ and terminal siloxy units selected from the class consisting of those of the formulas $R_3SiO1/2$ and $(R_2)(L)SiO1/2$, wherein the average number of total siloxy units per molecule of the polysiloxane polymer ranges from about 20 to about 200, wherein from about 6 to about 15 percent of said total siloxy units are selected from the group consisting of (R)(L)SiO and $(R_2)(L)SiO1/2$ and wherein there are no more than about four $RSiO3/2$ siloxy units per average polysiloxane molecule, wherein R is the same as defined above and wherein each L individually represents a functional radical selected from the group consisting of hydrogen, alkoxy (e.g. methoxy, ethoxy and the like), halogen (e.g. chlorine and the like) and an amino radical (e.g.$-N(CH_3)_2$, and the like). Preferably polysiloxanes wherein L is hydrogen or alkoxy are employed. Of course, the polyoxyalkylene polyether reactants employed are the novel polyoxyalkylene polyether admixture compositions of matter of this invention defined above.

In addition, as mentioned above, the novel polysiloxane-polyoxyalkylene block copolymers of this invention can be produced in the same manner as just described above, but in the absence of a solvent for the polyoxyalkylene polyether and polysiloxane reactants and such a solventless process is the more preferred method for producing said polysiloxane-polyoxyalkylene block copolymers in view of the disadvantages attendent to the use of a solvent as discussed above.

Accordingly, this invention includes an improved process for producing novel polysiloxane-polyoxyalkylene block copolymers as defined above which are suitable foam stabilizers for flexible polyether polyurethane foam by reacting a functional containing polysiloxane polymer with a polyoxyalkylene polyether in the presence of a catalyst, the improvement which comprises carrying out the process in the absence of a solvent and employing as the polyoxyalkylene polyether reactant the novel polyoxyalkylene polyether admixture compositions of matter of this invention. The particular desired product, reactants and reaction conditions as well as their preferred embodiments have already been defined above and are, of course applicable to the novel solventless process of this invention.

As defined herein the average molecular weights of the various polyoxyalkylene polyether compounds in the novel polyether admixtures of this invention are calculated by dividing the molecular weight of the functional group (e.g. the hydroxy or allyloxy group) on the polyether compound which is to be reacted with the functional containing polysiloxane polymer starting material in the making of the novel polysiloxane-polyoxyalkylene copolymers of this invention by the weight fraction of said functional group on said polyether compound.

The novel polysiloxane-polyoxyalkylene block copolymers of this invention as defined above contain several essential features. For instance, said block copolymers consist essentially of polysiloxane and polyoxyalkylene blocks wherein these blocks are linked through a silicon to oxygen bond (e.g. where M is —O—) or a silicon to carbon bond (e.g. where M is —$C_nH_{2n}O$— and n has a value of 2 or 3). Of course, it is to be understood that the novel polysiloxane-polyoxyalkylene block copolymers of this invention include copolymers simultaneously containing both such types of bridging groups. That is to say that the same block copolymer if desired can at the same time contain both polyoxyalkylene blocks linked through a silicon to oxygen bond and polyoxyalkylene blocks linked through a silicon to carbon bond. As pointed out the average polysiloxane copolymer of this invention consists essentially of from about 15 to about 35 percent by weight of polysiloxane blocks, the remainder of the copolymer (about 85 to about 65 percent by weight) being constituted essentially of the polyoxyalkylene blocks which are illustrated as an admixture of the formula -MX as defined above. Preferably the block copolymers of this invention consist essentially of from about 18 to about 27 percent by weight of polysiloxane blocks and from about 73 to about 82 percent by weight of polyoxyalkylene blocks. Further said block copolymers consist essentially of at least three different types of siloxy units, i.e. siloxy units of the formula $R_2SiO$, siloxy units selected from the class consisting of those of the formulas $(R)(Q)SiO$ and $RSiO_{3/2}$, and terminal siloxy units selected from the class consisting of those of the formulas $R_3SiO_{1/2}$ and $(R)_2(Q)SiO_{1/2}$, wherein R and Q are the same as defined above, with the proviso that said block copolymers contain no more than about four (preferably about 1.2 to about 1.6) $RSiO_{3/2}$ siloxy units per average polysiloxane molecule so as to avoid gellation of the copolymer. The average number of the total siloxy units per molecule of the polysiloxaneoxyalkylene block copolymer can range from about 20 to about 200; and from about 6 to about 15 percent said total siloxy units are selected from the group consisting of $(R)(Q)SiO$ and $(R_2)(Q)SiO$, where R and Q are the same as defined above.

Typical of the monovalent hydrocarbon radicals free of aliphatic carbon to carbon multiple bonds represented by R in the formulas above are alkyl radicals (e.g. methyl, ethyl, n-propyl, isopropyl, n-butyl, sec-butyl, isobutyl, t-butyl, n-octyl, decyl, dodecyl, and the like), cycloalkyl radicals (e.g. cyclohexyl, cycloheptyl, and the like) aryl radicals (e.g. phenyl, naphthyl, and the like), aralkyl radicals (e.g. benzyl, 2-phenylethyl, and the like), and alkaryl groups (e.g. tolyl, and the like). Moreover R can also represent a substituted monovalent hydrocarbon radical so long as the substituent does not adversely effect the desired result of the instant invention. Illustrative of such substituted hydrocarbon radicals include halo-substituted alkyl and aryl radicals, such as bromo-, chloro- and fluoro- substituted methyl, ethyl, propyl, and phenyl radicals, and the like. Preferably R represents a lower alkyl radical having from 1 to 4 carbon atoms especially methyl. Thus the most preferred siloxy units are those of the formulas $Me_2SiO$, $(Me)(Q)SiO$, $MeSiO_{3/2}$, $Me_3SiO_{1/2}$ and $(Me_2)(Q)SiO_{1/2}$ wherein Me is a methyl radical and Q is the same as defined above.

The symbol Q in the above siloxy unit formulas of the novel polysiloxane-polyoxyalkylene block copolymers of this invention represents a polyoxyalkylene polyether block having the formula —MX wherein M is the same as defined above and wherein X is a polyoxyalkylene radical consisting essentially of an admixture of Units A and B of the formula $-(C_2H_4O)_x(C_3H_6O-)_yZ$ wherein Z, x, y, Unit A and Unit B are the same as defined above. Accordingly, it is obvious that the formula —MX represents the polyoxyalkylene polyether radical and block obtained upon the use of the above defined novel polyoxyalkylene polyether admixtures of this invention in the production of the novel polysiloxane-polyoxyalkylene block copolymers of this invention and that any particular desired —MX formula will merely depend upon and correspond to the particular novel polyoxyalkylene polyether admixture of this invention employed to produce the particular novel polysiloxane-polyoxyalkylene block copolymer of this invention that is desired. Thus, the above definition and preferred embodiments of the novel polyoxyalkylene polyether admixtures of this invention equally correspond to the definition and preferred embodiments of the above formula —MX represented by the symbol Q in the siloxy unit formulas of the novel polysiloxane-polyoxyalkylene block copolymers of this invention. Of course, it is to be understood that the above formula $-C_2H_4O)_x$ $C_3H_6O-)_yZ$ like the above formula $Z'O-C_2H_4O-_x(C_3H_6O-)_yZ$ and the specific illustrations thereof as well as the expression poly(oxyethylene-oxypropylene) copolymers as employed herein are used to represent copolymers in which oxyalkylene groups are present in random distribution (and indeed such is preferred) as well as copolymers in which the oxyalkylene groups are present as blocks. Therefore, in no way should said formulas or the expression poly(oxyethylene-oxypropylene) copolymer be interpreted as merely encompassing copolymers in which oxyalkylene groups are present in blocks, i.e., a block of oxyethylene and a block of oxypropylene. Of course, it is to be also understood that the term propylene oxide and formula $(C_3H_6O)_y$ employed herein refer to 1,2-propylene oxide and the oxypropylene radical derived therefrom.

Accordingly, one preferred class of novel polysiloxane-polyoxyalkylene block copolymers of this invention is directed to polymers consisting essentially of $R_2SiO$, $(R)(Q)SiO$ and $R_3SiO1/2$ siloxy units wherein R and Q are the same as defined above.

A more preferred subclass of such polysiloxane-polyoxyalkylene block copolymers consists essentially of from about 19 to about 26 (more preferably from about 20 to about 24) percent by weight of polysiloxane blocks and from about 81 to about 74 (more preferably from about 80 to about 76) percent by weight of polyoxyalkylene blocks, and further consists essentially of from about 65 to about 140 (more preferably from about 100 to about 135) siloxy units of the formula $(CH_3)_2SiO$, from about 6 to about 17 (more preferably from about 10 to about 15) siloxy units of the formula $CH_3(Q)SiO$, and two siloxy units of the formula $(CH_3)_3SiO1/2$, wherein about 7 to about 14 (more preferably about 8 to about 12) percent of the total siloxy units are $CH_3(Q)SiO$ units, and wherein each Q individually represents a polyoxyalkylene polyether block having the formula —MX wherein M is a $-C_3H_6O-$ bridging group and X is a polyoxyalkylene radical consisting essentially of an admixture of Units A and B of the formula $(C_2H_4O)_x(C_3H_6O)_yZ$ wherein Z is a terminal group selected from the class consisting of alkyl, aryl, aralkyl and acyl (more preferably methyl or n-butyl) radicals, the values of x and y being determined by the following conditions prevailing for Units A and B;

Unit A representing from about 25 to about 50 preferably from about 35 to about 45) percent by weight of low molecular weight polyoxyalkylene polyether copolymer based on the total weight of Units A and B in said admixture, said polyether copolymer having an average molecular weight in the range of from about 900 to about 1300 and wherein from about 20 to about 60 (more preferably about 30 to about 55) weight percent of the oxyalkylene groups of said polyether copolymer are oxyethylene, the remainder of the oxyalkylene groups being oxypropylene; and Unit B representing from about 75 to about 50 (more preferably from about 65 to about 55) percent by weight of high molecular weight polyoxyalkylene polyether copolymer based on the total weight of Units A and B in said admixture, said polyether copolymer having an average molecular weight in the range of from about 3800 to about 5000 (more preferably from about 4000 to about 5000), and wherein from about 20 to about 60 (more preferably from about 30 to about 55) weight percent of the oxyalkylene groups of said polyether copolymer are oxyethylene, the remainder of the oxyalkylene groups being oxypropylene; with the added proviso that said admixture of Units A and B has an average molecular weight in the range of from about 1800 to about 2600 (more preferably from about 2000 to about 2400).

Another more preferred subclass of such polysiloxane-polyoxyalkylene block copolymers consists essentially of from about 19 to about 26 (more preferably from about 20 to about 24) percent by weight of polysiloxane blocks and from about 81 to about 74 (more preferably from about 80 to about 76) percent by weight of polyoxyalkylene blocks, and further consists essentially of from about 25 to about 65 (more preferably from about 40 to about 60) siloxy units of the formula $(CH_3)_2SiO$ from about 3.5 to about 7.5 (more preferably from about 4 to about 7) siloxy units of the formula $CH_3(Q)SiO$ and two siloxy units of the formula $(CH_3)_3SiO1/2$, wherein about 10 to about 12 percent of the total siloxy units are $CH_3(Q)SiO$ units, and wherein each Q individually represents a polyoxyalkylene polyether block having the formula —MX wherein M is a —$C_3H_6O$— bridging group and X is a polyoxyalkylene radical consisting essentially of an admixture of Units A and B of the formula $(C_2H_4O)_x(C_3H_6O)_yZ$ wherein Z is a terminal group selected from the class consisting of alkyl, aryl, aralkyl and acyl (more preferably methyl or n-butyl) radicals, the values of $x$ and $y$ being determined by the following conditions prevailing for Units A and B;

Unit A representing from about 35 to about 45 percent by weight of low molecular weight polyoxyalkylene polyether copolymer based on the total weight of Units A and B in said admixture, said polyether copolymer having an average molecular weight in the range of from about 800 to about 1300, and wherein from about 20 to about 60 (more peferably about 30 to about 55) weight percent of the oxyalkylene groups of said polyether copolymer are oxyethylene, the remainder of the oxyalkylene groups being oxypropylene; and Unit B representing from about 65 to about 55 percent by weight of a blend of two high molecular weight polyoxyalkylene polyether copolymers based on the total weight of Units A and B in said admixture said blend consisting of from about 50 to about 75 (more preferably from about 60 to about 70) percent by weight of a polyoxyalkylene polyether copolymer having an average molecular weight in the range of from about 3000 to about 3400, wherein from about 20 to about 60 (more preferably from about 30 to about 55) weight percent of the oxyalkylene groups of said polyether copolymer are oxyethylene, the remainder of the oxyalkylene groups being oxypropylene, and from about 50 to about 25 (more preferably from about 40 to about 30) percent by weight of a polyoxyalkylene polyether copolymer having an average molecular weight in the range of from about 3800 to about 5000, wherein from about 20 to about 60 (more preferably from about 30 to about 55) weight percent of the oxyalkylene groups of said polyether copolymer are oxyethylene, the remainder of the oxyalkylene groups being oxypropylene; with the proviso that said polyether copolymer blend has an average molecular weight in the range of from about 3400 to about 4000 (more preferably from about 3400 to about 3800); and with the added proviso that said admixture of Units A and B has an average molecular weight in the range of about 1600 to about 2100 (more preferably from about 1700 to about 1900).

Another class of novel polysiloxane-polyoxyalkylene block copolymers of this invention is directed to polymers consisting essentially of $R_2SiO$, $(R)(Q)SiO$ and $(R_2)(Q)SiO1/2$ siloxy units wherein R and Q are the same as defined above.

Still another class of novel polysiloxanepolyoxyalkylene block copolymers of this invention is directed to polymers consisting essentially of $R_2SiO$, $(R)(Q)SiO$, $RSiO3/2$, and $R_3SiO1/2$ siloxy units, wherein R and Q are the same as defined above. Yet another class of novel polysiloxane-polyoxyalkylene block copolymers of this invention is directed to polymers consisting essentially of $R_2SiO$, $(R)(Q)SiO$, $RSiO3/2$, and $(R_2)(Q)SiO$ siloxy units wherein R and Q are the same as defined above.

Finally another preferred class of polysiloxanepolyoxyalkylene block copolymers of this invention is directed to polymers consisting essentially of $R_2SiO$, $RSiO3/2$, and $(R_2)(Q)SiO$ siloxy units, wherein R and Q are the same as defined above.

A more preferred subclass of such polysiloxanepolyoxylakylene block copolymers consists essentially of from about 17 to about 26 (more preferably from about 19 to about 24) percent by weight of polysiloxane blocks and from about 83 to about 74 (more preferably from about 81 to about 76) percent by weight of polyoxyalkylene blocks, and further consists essentially of from about 17 to about 24 siloxy units of the formula $(CH_3)_2SiO$, from about 1.2 to about 1.8 siloxy units of the formula $CH_3SiO_{1.5}$ and from about 3 to about 4 siloxy units of the formula $(CH_3)_2QSiO1/2$, and wherein each Q individually represents a polyoxyalkylene polyether block having the formula —MX wherein M is a —O— bridging group and X is a polyoxyalkylene radical consisting essentially of an admixture of Units A and B of the formula $(C_2H_4O)_x(C_3H_6O)_yZ$ wherein Z is a terminal group selected from the class consisting of alkyl, aryl and aralkyl (more preferably n-butyl) radicals, the values of $x$ and $y$ being determined by the following conditions prevailing for Units A and B;

Unit A representing from about 30 to about 40 percent by weight of low molecular weight polyoxyalkylene polyether copolymer based on the total weight of Units A and B in said admixture, said polyether copolymer having an average molecular weight in the range of from about 900 to about 1300, wherein from about 20 to about 60 (more preferably from about 30 to about 55) weight percent of the oxyalkylene groups of said polyether copolymer are oxyethylene, the remainder of the oxyalkylene groups being oxypropylene; and Unit B representing from about 70 to about 60 percent by weight of a blend of two high molecular weight polyoxyalkylene polyether copolymers based on the total weight of Units A and B in said admixture, said blend consisting of from about 55 to about 70 percent by weight of a polyoxyalkylene polyether copolymer having an average molecular weight in the range of from about 3000 to about 3400, wherein from about 20 to about 60 (more preferably from about 30 to about 55) weight percent of the oxyalkylene groups of said polyether copolymer are oxyethylene, the remainder of the oxyalkylene groups being oxypropylene, and from about 45 to about 30 percent by weight of a polyoxyalkylene polyether copolymer having an average molecular weight in the range of from about 3800 to about 5500 (more preferably from about 4000 to about 5000), wherein from about 20 to about 60 (more preferably from about 30 to about 55) weight percent of the oxyalkylene groups of said polyether copolymer are oxyethylene, the remainder of the oxyalkylene groups being oxypropylene; with the proviso that said polyether copolymer blend has an average molecular weight in the range of from about 3400 to about 4000 (more preferably from about 3400 to about 3800); and with the added proviso that said admixture of Units A and B has an average molecular weight in the range of from about 1600 to about 2100 (more preferably from about 1700 to about 1900).

Of course, it is to be understood that the polysiloxane-polyoxyalkylene block copolymers of this invention can contain small amounts of other siloxy units e.g. SiH groups (owing to incomplete reaction thereof with the polyoxyalkylene reactant) and/or Si-alkoxy or Si-OH groups owing to the incomplete hydrolysis and condensation of the silanes used to produce the siloxane reactant.

The novel polysiloxane-polyoxyalkylene block copolymers of this invention are normally liquid homogeneous compositions and comprise mixtures of polymer species which differ in molecular weight, polyether and siloxane contents and relative number of monomeric units. It is to be understood, therefore, that as expressed herein the values of these parameters are average values. It is to be also understood that a small amount of the polyoxyalkylene blocks may comprise residual uncapped hydroxyl-terminated groups introduced with the polyoxyalkylene ether reactants.

The above described novel polysiloxane-polyoxyalkylene block copolymers of this invention are unique in that they have been found to be excellent efficient foam stablizers for flexible polyether polyurethane foam regardless of whether prepared in the presence or absence of solvent. Moreover, they have been found to be extremely potent stabilizers in relation to other polysiloxane-polyoxyalkylene block copolymers falling outside of the scope of this invention. For example, it has been found that a smaller amount of the polysiloxane-polyoxyalkylene block copolymers of this invention need be employed to achieve a given level of performance as foam stabilizers for flexible polyether polyurethane foam than is required by certain other polysiloxane-polyoxyalkylene block copolymers falling outside of the scope of this invention. The polysiloxane-polyoxyalkylene block copolymers have also been found to provide greater latitude in the amount of tin catalyst required in the manufacture of flexible polyether polyurethane foam thereby giving one greater control over the production and quality (height of rise, cells per inch and air flow rate) of the foam desired. Thus, excellent open (porous) foams can be achieved even over a broad range of operating conditions, such as tin catalyst concentrations, by this invention.

Thus the novel polysiloxane-polymers of this invention can be employed as foam stabilizers in the production of flexible polyether polyurethane foam as a 100 percent active stream or in dilute form as a solution in various types of organic liquids including polar and nonpolar solvents. For example, the polymers may be diluted with nonpolar solvents such as the normally liquid aliphatic and aromatic unsubstituted and halogen-substituted hydrocarbons such as heptane, xylene, toluene, chlorobenzene and the like. When used, the preferred diluents are compounds encompassed by the formula:

$$Z'''O(Z''O)_tZ''''$$

wherein $Z'''$ is hydrogen or a monovalent hydrocarbon group including alkyl (e.g. methyl, ethyl, propyl and butyl), aryl (e.g., phenyl and tolyl) and aralkyl (e.g., benzyl) groups; $Z''$ is a bivalent alkylene group (e.g., ethylene, propylene, trimethylene and butylene);

$Z''''$ is a monovalent hydrocarbon group such as defined for $Z'''$, and $t$ has an average value of at least two.

When $Z'''$ is hydrogen, it is preferred that such $Z'''$ groups (that is, —OH) represent no more than about 5 weight percent of the solvent. Illustrative solvents are alkylene oxide adducts of starters such as water, monools, diols and other polyols, while such organic starters are typically illustrated by butanol, propylene glycol, glycerol and 1,2,6-hexantriol. Preferred adducts of the organic starters are the mixed alkylene oxide adducts, particularly those containing a combination of oxyethylene and oxypropylene units. For example, one class of such preferred organic solvents are mixed ethylene oxide-propylene oxide adducts of butanol which are presented by the general formula, $HO(C_2H_4O)_s(C_3H_6O)_uC_4H_9$, wherein $s$ has an average value from about 8 to about 50, and $u$ has an average value from about 6 to about 40. Preferably, the values of $s$ and $u$ are such that the weight percent of oxyethylene units is about equal to the weight percent of the oxypropylene units. When employed, the solution compositions preferably contain from about 25 to about 80 parts by weight of the polysiloxane-polyoxyalkylene block copolymers per 100 parts by weight of the total weight of block copolymer and solvent, but can contain from 1 to 99 parts by weight of the block copolymer.

The novel polysiloxane-polyoxyalkylene block copolymers of this invention may also be used in combination with non ionic organic surfactants such as adducts produced by reacting $k$ mols of ethylene oxide (wherein $k$ has an average value from about 4 to about 40, inclusive of whole and fractional numbers) per mol of any of the following hydrophobes: n-undecyl alcohol, myristyl alcohol, lauryl alcohol, trimethyl nonanol, tridecyl alcohol, pentadecyl alcohol, cetyl alcohol, nonylphenol, dodecylphenol, tetradecylphenol and the like. Especially useful are ethylene oxide adducts of the nonylphenol having the average composition, $C_9H_{19}$—$C_6H_4$—$(OC_2H_4)_n$OH, wherein $n$ has an average value from about 9 up to about 20 or more, including whole and fractional numbers such as 9, 10.5, 13, 14.5, and 15. When used, such nonionic organic surfactants are used in amounts from about 2 to about 20 parts by weight per 100 parts by weight of the block copolymer, It is to be understood that such additives may also be present as a component of the aforementioned solutions of the block copolymers.

Also included within the scope of this invention is the use of the novel polysiloxane-polyoxyalkylene block copolymers of this invention in combination with other types of silicon-containing surfactants such as, for example, those described in U.S. Pat. Nos. 2,834,748; 3,505,377 and 3,657,305. When used, the additional organosilicone surfactant is used in a minor amount which is usually from about 1 to about 30 parts by weight per 100 parts by weight of the novel polysiloxane-polyoxyalkylene block copolymer of this invention.

In addition to the novel polysiloxane polyoxyalkylene block copolymers of the present invention, the other essential types of components and reactants employed in providing flexible polyether polyurethane foams as described herein are polyether polyols, organic polyisocyanates, the catalyst system and blowing agent.

In producing the flexible polyether polyurethane foams of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Such polyether polyols are well known in the art and include, for example, polyethers exemplified by the following classes of composition:

a. Polyoxyalkylene polyols including alkylene oxide adducts of, for example, water; ethylene glycol; diethylene glycol; propylene glycol; 1,5-pentanediol; hexylene glycol; dipropylene glycol; trimethylene glycol; 1,2-cyclohexanediol; 3-cyclohexane-1, 1-dimethanol and dibromo-derivatives thereof; glycerol; 1,2,6-hexanetriol; 1,1,1-trimethylolethane; 1, 1, 1-trimethyolpropane; 3-(2-hydroxyethoxy)- and 3-(2-hydroxypropoxy)-1,2-propanediols; 2,4-dimethyl-2-(2-hydroxyethoxy)methylpentanediol-1,5; 1,1,1-tris[(2-hydroxyethoxy)methyl]ethane; 1,1,1-tris[(2-hydroxypropoxy)methyl]propane; pentaerythritol; sorbitol; susrose; lactose; alphamethyl glucoside; alpha-hydroxyalkylglucoside; ammonia; triethanolamine; triisopropanolamine; ethylenediamine, diethylenetriamine, novalac resins; phosphoric acid; benzenephosphoric acid; polyphosphoric acids such as tripolyphosphoric acid and tetrapolyphosphoric acid; phenolaniline; formaldehyde tertiary condensation products; aniline-formaldehyde condensation products; and the like. The alkylene oxides employed in producing the polyoxyalkylene polyols normally have 2 to 4 carbon atoms. Propylene oxide and mixtures of propylene oxide with ethylene oxide are preferred.

b. Polymer/polyether polyols which are produced by polymerizing one or more ethylenically unsaturated monomers dissolved or dispersed in a polyether polyol in the presence of a free radical catalyst. Suitable polyether polyols for producing such compositions include, for example, any of the above described polyols encompassed by paragraph (a) above. Illustrative of suitable ethylenically unsaturated monomers are those encompassed by the general formula $$R'-\underset{\underset{R''}{|}}{C}=CH_2$$

where: R' is hydrogen, methyl or any of the halogens (i.e., fluorine, chlorine, bromine or iodine); and R" is R', cyano, phenyl, methyl-substituted phenyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alphamethylstyrene, and butadiene. These and other polymer/polyol compositions which are suitably employed either individually or in combination with polyethers mentioned in paragraph (a) above are described in British Pat. No. 1,063,222 and U.S. Pat. No. 3,383,351, the disclosures of which are incorporated herein by reference. Such compositions are prepared by polymerizing the monomers in the polyol at a temperature between about 40° C and about 150° C. employing any free radical-generating initiator including peroxides, persulfates, percarbonates, perborates, and azo compounds, such as, for example, hydrogen peroxide, dibenzoyl peroxide, benzoyl hydroperoxide, lauroyl peroxide, and azobis(isobutyronitrile). The polymer/polyether polyol product may also contain a small amount of unreacted polyether, monomer and free polymer.

c. Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

d. Phosphorus-containing derivatives such as tris(dipropylene)glycol phosphite and other phosphites are also useful.

In preparing the flexible polyether polyurethane foams in accordance with the present invention it is, of course, to be understood that any of the aforesaid polyether polyols or mixtures thereof can be employed as reactants with the organic polyisocyanate. The particular polyether polyol or polyols employed merely depends upon the desired end-use of the polyurethane foam. Usually diols provide soft foams, firmer foams are obtained by the incorporation of polyether polyols having more than two hydroxyl groups, including triols, tetra-ols, pentols and hexols. When it is desired to produce polyurethanes having comparatively high load-bearing properties and/or diecutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 20 to about 150, and is usually no higher than about 80. As is well known in this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein
OH = hydroxyl number of the polyol,
$f$ = average functionality, that is, the average number of hydroxyl groups per molecule of polyol and
M.W. = average molecular weight of the polyol.

The organic polyisocyanates that are useful in producing flexible polyether polyurethane foam in accordance with the process of this invention are well known in the art and are organic compounds that contain at least two isocyanato groups and any such compounds or mixtures thereof may be employed. Among such suitable polyisocyanates are those conveniently represented by the general formula:

D(NCO)$_i$ wherein $i$ is an integer of two or more and D is an organic radical having the valence of $i$. D can be a substituted or unsubstituted hydrocarbon group (e.g., alkylene, cycloalkylene, arylene, alkarylene, aralkylene and the like). D can also be a group having the formula D'—T—D' wherein D' is an alkylene or arylene group and T is a divalent moiety such as —O—, —O—D'—O—, —C(O)—, —S—, —S—D'—S—, or —SO$_2$—.

Illustrative of suitable organic polyisocyanate reactants are the following including mixtures thereof: 1,2-diisocyanato-ethane; 1,3-diisocyanato-propane; 1,2-diisocyanato-propane; 1,4-diisocyanato-butane; 1,5-diisocyanato-pentane; 1,6-diisocyanato-hexane; 1,5-diisocyanato-2, 2-dimethyl-pentane; 1,7-diisocyanato-heptane; 1,5-diisocyanato-2, 2,4-trimethyl-pentane; 1,8-diisocyanato-octane; 1,9-diisocyanato-nonane; 1,10-diisocyanato-decane; 1, 11-diisocyanato-undecane; 1,12-diisocyanato-dodecane; 1,6-diisocyanato-3-methoxy-hexane; 1,6-diisocyanato-3-butoxy-hexane; bis(3-isocyanato-propyl)ether; the bis(3-isocyanato-propyl)ether of 1,4-butylene glycol; (OCNCH$_2$CH$_2$CH$_2$CH$_2$OCH)$_2$O; bis(2-isocyanatoethyl) carbonate; 1-methyl-2, 4-diisocyanato-cyclohexane; 1,8-diisocyanato-p-methane; bis 5,6-(2-isocyanatoethyl)bicyclo[2.2.1]-hept-2-ene; bis(3-isocyanato-propyl)sulfide; bis(isocyanato-hexyl)sulfide; 1,4-phenylene-diisocyanate; 2,4-tolylene-diisocyanate; 2,6-tolylene-diisocyanate; crude tolylene diisocyanates; xylylene diisocyanates; 4-chloro-1,3-phenylene-diisocyanate; 4-bromo-1, 3-phenylene-diisocyanate; 4-nitro-(1,3 or 1,5)-phenylene-diisocyanate; 4-ethoxy-1,3-phenylenediisocyanate; benzidine diisocyanate; toluidine diisocyanate; dianisidine diisocyanate; 2,4'-or 4,4'-diisocyanato-diphenyl ether; diphenylmethane-4,4'-diisocyanate; 4,4'-diisocyanatodibenzyl; isopropyl-benzene-alpha-4-diisocyanate; 1,5-diisocyanato-napthalene; 1,8-diisocyanato-naphthalene; 9,10-diisocyanato-anthracene; triphenyl-methane-4,4', 4"-triisocyanate; 2,4,6-toluene triisocyanate; and many other organic polyisocyanates that are known in the art such as those disclosed in an article by Siefken, Ann. 565,75 (1949). In general, the aromatically unsaturated polyisocyanates are preferred.

Further included among the isocyanates useful in the process of this invention are dimers and trimers of isocyanates and diisocyanates and polymeric diisocyanates such as those having the general formula:

[D(NCO$_4$)]$_j$ in which $i$ and $j$ are integers of two or more, and/or (as additional components in the reaction mixtures) compounds of the general formula:

L'(NCO)$_i$ in which $i$ is one or more and L' is a monofunctional or polyfunctional atom or radical. Examples of this type include ethylphosphonic diisocyanate, C$_2$H$_5$P(C)(NCO)$_2$; phenylphosphonic diisocyanate, C$_6$H$_5$(O)(NCO)$_2$; compounds containing an ≡Si-NCO group, isocyanates derived from sulfonamides (DSO$_2$NCO), cyanic acid, thiocyanic acid, and compounds containing a metal-NCO radical such as tributyltin isocyanate.

Also, included as useful in the preparation of the flexible polyether polyurethane foams in accordance with the process of this invention are the polyisocyanates of the aniline-formaldehyde polyaromatic type which are produced by phosgenation of the polyamine obtained by acid-catalyzed condensation of aniline with formaldehyde. Poly(phenylmethylene) polyisocyanates of this type are available commercially under such trade names as PAPI, NIAX Isocyanate AFPI, Mondur MR, Isonate 390 P, Thanate P-220, NCO-120 NCO-20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanato groups per molecule. Illustrative of such combinations are: a mixture of 2,4-tolylene diisocyanate, 2,6-tolylene diisocyanate and the aforesaid poly(phenylmethylene) polyisocyanates; and a mixture of isomeric tolylene diisocyanates with polymeric tolylene diisocyanates obtained as residues from the manufacture of the diisocyanates.

On a combined basis, the polyether polyol and organic polyisocyanate reactants usually constitute the major proportion by weight of the polyurethane-forming reaction mixture. In general, the polyisocyanate and polyether polyol reactants are employed in relative amounts such that the ratio of total —NCO equivalents to total active hydrogen equivalent (of the polyether polyol and any water, when used) is from 0.8 to 1.5, preferably from 0.9 to 1.1, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 90 to 110.

The urethane-forming reaction is effected in the presence of a minor amount of a catalyst, preferably an amine catalyst and usually a tertiary amine. Suitable amine catalysts include one or more of the following: N-methylmorpholine; N-ethylmorpholine; N-octadecylmorpholine; triethylamine; tributylamine; trioctylamine; N,N,N',N'-tetramethyl-ethylenediamine; N,N,N',N'-tetramethyl-1,3-butane-diamine; triethanolamines; N,N-dimethylethanolamine; triisoprpanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e, 1,4-diazabicyclo[2.2.2]octane); the formate and other salts of triethylenediamine, oxyalkylene adducts of the amino groups of primary and secondary amines and other such amine catalysts which are well known in the art of polyurethane manufacture such as the beta-amino carbonyl catalysts of U.S. Pat. No. 3,821,131 especially 3-dimethylamino-N,N-dimethylpropionamide. The amine catalyst may be introduced to the polyurethanepropducing reaction mixture as such or as a solution in suitable carrier solvents such as diethylene glycol, dipropylene glycol, and 2-methyl-2,4-pentanediol ("hexylene glycol") preferably the amine catalyst is generally present in the final urethane-producing reaction mixture in an amount of from about 0.05 to about 3 parts by weight of active catalyst (that is, the amine exclusive of other components present in solutions thereof) per 100 parts by weight of the polyether polyol reactant.

It is also preferred to include a minor amount of certain metal catalysts in addition to the amine catalyst in the component of the reaction mixture a minor amount of production of the polyurethane foam. Such supplementary catalysts are well known to the art of flexible polyether-based polyurethane foam manufacture. For example, useful metal catalysts include organic derivatives of tin, particularly tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal cocatalysts which can be present in the polyurethaneproducing reaction mixture is within the range from about 0.05 to about 2 parts by weight per 100 parts by weight of the polyether polyol reactant.

Foaming is accomplished by employing a small amount of a polyurethane blowing agent such as water in the reaction mixture (e.g. about 0.5 to about 5 weight) percent of water, based on the total weight of the reaction mixture which upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluormethane, dichlorodifluoromethane, 1,1-dichloro-1-fluoroethane, 1,1,1-trifluoro-2-fluoro-3,3-difluoro-4,4,4-trifluorobutane, hexafluorocyclobutene, octafluorocyclobutane and the like. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The amount of blowing agent employed in the foaming reaction will vary with factors such as the density that is desired in the foamed product. Usually, however, from about 1 to about 30 parts by weight of the blowing agent per 100 parts by weight of the polyether polyol reactant is preferred.

The polyether-based polyurethane foams of this invention may be formed in accordance with any of the processing techniques known to the art such as, in particular, the "one-shot" technique. In accordance with this method, foamed products are provided by carrying out the reaction of the polyisocyanate and polyether polyol silutaneously with the foaming operation. It is sometimes convenient to add the polysiloxane-polyoxyalkylene block copolymer foam stabilizer to the reaction mixture as a premixture with one or more of the blowing agent, polyether polyol, and catalyst components.

It is to be understood that the relative amounts of the various components of the foam formulations are not narrowly critical. The polyether polyol and polyisocyanates are present in the foam-producing formulation in a major amount. The relative amounts of these two components is the amount required to produce the desired urethane structure of the foam and such relative amounts are well known in the art. The blowing agent, catalyst and polysiloxane-polyoxyalkylene block copolymer foam stabilizer are each present in a minor amount necessary to achieve the function of the component. Thus, the blowing agent is present in an amount sufficient to foam the reaction mixture, the catalyst is present in a catalytic amount (i.e., an amount sufficient to catalyze the reaction to produce the urethane at a reasonable rate), and the polysiloxane-polyoxyalkylene block copolymers of this invention are present in a foamstabilizing amount, that is, in an amount sufficient to stabilize the foam. The preferred amounts of these various components are as given hereinabove.

If desired other additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as fillers, dyes, pigments, anti-yellowing agents and the like. Flameretardant agents can also be employed if desired. Such flame retardants are well known in the art and include a variety of compounds which preferably contain phosphorus or halogen or both phosphorus and halogen. Illustrative of such flame retardant agents include those disclosed in U.S. Application Ser. No. 279,883 filed Aug. 11, 1972, now U.S. Pat. No. 3,846,462 and U.S. Pat. Nos. 3,075,927; 3,075,928; 3,222,305; and 3,574,149.

The polyurethanes produced in accordance with the present invention can be used in the same areas as conventional flexible polyether polyurethanes. For example, the foams of the present invention can be used with advantage in the manufacture of textile interliners, cashions, mattresses, paddings, carpet underlay, packaging, gaskets, sealers, thermal insulators and the like.

The following examples are illustrative of the present invention and are not to be regarded as limitative. In the following examples the terms, abbreviations and symbols used have the following indicated meanings.

| Definitions | |
|---|---|
| *: | An asterisk (*) beside the number of an example appearing below indicates that the example is presented for purpose of comparison and does not illustrate the present invention. |
| C.: | Centigrade |
| conc.: | Concentration |
| cstks. or cs.: | Centistokes at 25° C. |
| g.: | Grams |
| hr.: | Hour |
| in.: | Inch |
| lbs.: | Pounds |
| Me: | Methyl |
| ml.: | Milliliter |
| mm.: | Millimeters |
| Polyol I: | A polyol produced from glycerol and a mixture of 86 weight percent propylene oxide and 14 weight percent ethylene oxide. Polyol I has a hydroxyl number of 46. |
| Polyol II: | A polyol produced from glycerol and a mixture |

-continued

| | Definitions |
|---|---|
| | of 84 weight percent propylene oxide and 16 weight percent ethylene oxide. Polyol II has a hydroxyl number of 46. |
| SCFM: | Standard cubic feet per minute. |
| TDI: | A mixture of 80 weight-percent 2,4-tolylene diisocyanate and 20 weight-percent 2,6-tolylene diiocyanate. |
| visc.: | Viscosity |

POLYURETHANE FOAM PROPERTIES

The formulations and procedures for the polyurethane foam tests referred to in the examples are shown below.

Tests, I, II, III, IV, V and VI

| | Formulation |
|---|---|
| Material | Parts by Weight |
| Polyol I | 100.0 |
| Distilled water | 4.85 |
| Dimethylethanol amine | 0.35 |
| CCl$_3$F | 15.0 |
| Stannous octoate | 0.3 |
| TDI | 56.9 |
| Polysiloxane-polyoxyalkylene block copolymer: | Varied |
| Test I | 0.90 |
| Test II | 0.70 |
| Test III | 0.60 |
| Test IV | 0.50 |
| Test V | 0.40 |
| Test VI | 0.30 |

The foams were produced by adding the polysiloxanepolyoxyalkylene block copolymer to Polyol I in a 1000 ml. container, mixing with a spatula, adding a mixture of the water and amine to the container, adding CCl$_3$F to the container, mixing with a drill press for 15 seconds adding the stannous octoate, mixing for 8 seconds with a drill press adding the TDI, mixing with a drill press for 7 seconds, pouring into a mold and curing for 15 minutes at 135° C. Prior to the cure the temperature of the materials was maintained at no higher than 25° C. In view of the differences in the amounts of block copolymer used, Test VI is a more rigorous test than Test V; Test V is a more rigorous test than Test IV; Test IV is a more rigorous test than Test III; Test III is a more rigorous test than Test II; and Test II is a more rigorous test than Test I for evaluating the copolymers as polyurethane foam stabilizers.

FOAM EVALUATION

The following terms are used in the examples in connection with the above-described polyurethane foam tests:

| | |
|---|---|
| Foam Rise - | The Foam Rise is the height of the cured polyurethane foam in inches. |
| Efficiency - | The efficiency of a polysiloxane-polyoxyalkylene block copolymer composition denotes the effectiveness of the composition as a polyurethane foam stabilizer. At a given concentration, a more efficient composition will result in a higher Foam Rise value. |
| Cells Per inch - | This denotes the number of cells in the polyurethane foam per linear inch of the foam. The greater the cells per inch value, the finer the cell structure. |
| Air Flow - | This is the rate of flow of air in standard cubic feet per minute at 0.5 inch water positive pressure through a one inch thick block of foam having a cross-section of two inches by two inches. The Air Flow value is related to the porosity of the foam. The higher the Air Flow value, the more porous the foam. |
| Failed - | This denotes that the composition tested was not a polyurethane foam stabilizer in that either no foam was produced or a foam was produced but collapsed. |

EXAMPLE 1

A polysiloxane-poly(oxyethylene-oxypropylene) block copolymer was prepared by charging (1) about 162 g. of a polyether admixture having an average molecular weight of about 2,100 and consisting of about 78 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 22 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 200 g. of toluene; (3) about 0.6 g. of trifluoroacetic acid catalyst, about 0.28 g. of potassium acetate cocatalyst, and (4) about 40 g. of an equilibrated ethoxy endblocked polydimethylsiloxane fluid consisting essentially of about 1.3 siloxy units of the formula MeSiO$_{1.5}$, about 18.2 siloxy units of the formula Me$_2$SiO, and about 3.3 siloxy units of the formula (Me)$_2$(OC$_2$H$_5$)SiO$_{0.5}$ per average molecule (about 14.5 percent of the total siloxy units being (Me)$_2$(OC$_2$H$_5$)SiO$_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation the residue was then filtered to remove residual sodium bicarbonate and the salt formed in the neutralization. The polysiloxanepoly(oxyethyene-oxypropylene) block copolymer product was a homogenous liquid, having a viscosity of about 1000 cs., said block copolymer consisting essentially of about 19.5 percent by weight of polysiloxane blocks and about 80.5 percent by weight of polyoxyalkylene blocks. The polyurethane foam stabilizing properties of said block copolymer product are shown below.

EXAMPLE 2

A polysiloxane-poly(oxyethylene-oxypropylene) block copolymer was prepared by charging (1) about 162 g. of a polyether admixture having an average molecular weight of about 2,100 and consisting of about 78 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 22 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 140 g. of toluene; (3) about 0.6 g. of trifluoroacetic acid catalyst, about 0.28 g. of potassium acetate cocatalyst; and (4) about 40 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation the residue was then filtered to remove residual sodium bicarbonate and the salt formed in the neutralization. The polysiloxane-poly(oxyethylene-oxypropylene) block copolymer product was a homogeneous liquid having a viscosity of about 1000 cs., said block copolymer consisting essentially of about 19.5 percent by weight of polysiloxane blocks and about 80.5 percent by weight of polyoxyalkylene blocks. The polyurethane foam stabilizing properties of said block copolymer product are shown below.

EXAMPLE 3

A polysiloxane-poly(oxyethylene-oxypropylene) block copolymer was prepared by charging (1) about 162 g. of a polyether admixture having an average molecular weight of about 2,100 and consisting of about 78 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene. Said oxyalkylene groups being present in the copolymer in a random distribution, and about 22 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 110 g. of toluene; (3) about 0.6 g. of trifluoroacetic acid catalyst, about 0.28 g. of potassium acetate cocatalyst; and (4) about 40 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation the residue was then filtered to remove residual sodium bicarbonate and the salt formed in the neutralization. The polysiloxane-poly(oxyethylene-oxypropylene) block copolymer product was a homogeneous liquid having a viscosity of about 1000 cs., said block copolymer consisting essentially of about 19.5 percent by weight of polysiloxane blocks and about 80.5 percent by weight of polyoxyalkylene blocks. The polyurethane foam stabilizing properties of said block copolymer product are shown below.

EXAMPLE 4

A polysiloxane-poly(oxyethylene-oxypropylene) block copolymer was prepared by charging (1) about 162 g. of a polyether admixture having an average molecular weight of about 2,100 and consisting of about 78 percent by weight of a monohydroxy terminated polyoxyalkylene butanol started copolymer having an average molecular weight of about 1900 wherein about 50 weightpercent of the oxyalkylene groups of the copolymer are oxyethylene, the remainder of the oxyalkylene groups being oxypropylene, said oxyalkylene groups being present in the copolymer in a random distribution and about 22 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 75 g. of toluene; (3) about 0.6 g. of trifluoroacetic acid catalyst, about 0.28 g. of potassium acetate cocatalyst; and (4) about 40 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation the residue was then filtered to remove residual sodium bicarbonate and the salt formed in the neutralization. The polysiloxane-poly(oxyetylene-oxypropylene) block copolymer product was a homogeneous liquid having a viscosity of about 1000 cs., said block copolymer consisting essentially of about 19.5 percent by weight of polysiloxane blocks and about 80.5 percent by weight of polyoxyalkylene blocks. The polyurethane foam stabilizing properties of said block copolymer product are shown below.

EXAMPLE 5

A polysiloxane-poly(oxyethylene-oxypropylene) block copolymer was prepared by charging (1) about 162 g. of a polyether admixture having an average molecular weight of about 2100 and consisting of about 78 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution and about 22 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 2.0 g. of pyridinium dodecylbenzenesulfonate catalyst ($C_5H_5NH^+C_{12}H_{25}C_6H_4SO_3^-$); and about 40 g. of an equilibrated ethoxy endblocked polydimethylsiloxane fluid consisting essentially of about 1.3 siloxy units of the formula $MeSiO_{1.5}$, and about 18.2 siloxy units of the formula $Me_2SiO$ and about 3.3 siloxy units of the formula $(Me)_2(OC_2H_5)SiO_{0.5}$ per serving molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. With nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 1000 cs., said block copolymer consisting essentially of about 19.5 percent by weight of polysiloxane blocks and about 80.5 percent by weight of polyoxyalkylene blocks. The polyurethane foam stabilizing properties of said block copolymer product are shown below.

EXAMPLE 6

A polysiloxane-poly(oxyethylene-oxypropylene) block copolymer was prepared by charging (1) about 105 g. of a monomethoxy terminated polyoxyalkylene allyl alcohol started copolymer having an average molecular weight of about 2800 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 57 g. of toluene; (3) about 0.5 cc. of chloroplatinic acid catalyst (10% solution in 1,2-dimethoxy ethane), and (4) about 27 g. of an equilibrated trimethyl endblocked poly(dimethylsiloxy-methylhydrogen siloxy) siloxane copolymer fluid consisting essentially of about 5.1 siloxy units of the formula $(Me)(H)SiO$, about 72 siloxy units of the formula $Me_2SiO$ and about 2 siloxy units of the formula $(Me)_3SiO_{0.5}$ per average molecule (about 6.4 percent of the total siloxy units being $(Me)(H)SiO$) to a one liter, agitated, glass reaction vessel fitted with a still head. The reaction mixture was heated to 80 C-90 C. and held until silanic hydrogen was no longer detectable by reaction with an ethanol solution of potassium hydroxide. The toluene was removed by distillation and the residue filtered. The polysiloxane-poly(oxyethylene-oxypropylene) block copolymer product was a homogeneous liquid having a viscosity of about 3400 cs., said block copolymer consisting essentially of about 25.1 percent by weight of polysiloxane blocks and about 74.9 percent by weight of polyoxyalkylene blocks. The polyurethane foam stabilizing properties of the block copolymer are shown below.

EXAMPLE 7

A polysiloxane-poly(oxyethylene-oxypropylene) block copolymer was prepared by charging (1) about 105 g. of a monomethoxy terminated polyoxyalkylene allyl alcohol started copolymer having an average molecular weight of about 2800 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.5 cc. of chloroplatinic acid catalyst (10% solution in 1,2-dimethoxy ethane), and (3) about 27g. of an equilibrated trimethyl end blocked poly(dimethylsiloxy-methylhydrogensiloxy) siloxane copolymer fluid consisting essentially of about 5.1 siloxy units of the formula $(Me)(H)SiO$, about 72 siloxy units of the formula $Me_2SiO$ and about 2 siloxy units of the formula $(Me)_3SiO_{0.5}$ per average molecule (about 6.4 percent of the total siloxy units being $(Me)(H)SiO$) to a one liter, agitated, glass reaction vessel fitted with a still head. The reaction mixture was heated to 80 C-90 C and held until silanic hydrogen was no longer detectable by reaction with an ethanol solution of potassium hydroxide. The polysiloxane-poly(oxyethylene-oxypropylene) block copolymer product was a hazy liquid, said block copolymer consisting essentially of about 25.1 percent by weight of polysiloxane blocks and about 74.9 percent weight of polyoxyalkylene blocks. The polyurethane foam stabilizing properties of the block copolymer are shown below.

EXAMPLE 8

A polysiloxane-poly(oxyethylene-oxypropylene) block copolymer was prepared by charging (1) about 200 g. of a polyether admixture having an average molecular weight of about 1560 and consisting of about 50 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 50 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.8 g. of pyridinium dodeylbenzenesulfonate catalyst; and (3) about 72 g. of an equilibrated ethoxy end blocked polydimethyl-siloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 24.7 percent by weight of polysiloxane blocks and about 75.3 percent by weight of polyoxyalkylene blocks. The polyurethane foam stabilizing properties of said block copolymer product are shown below.

EXAMPLE 9

A polysiloxane-poly(oxyethylene-oxypropylene) block copolymer was prepared by charging (1) about 100 g. of a polyether admixture having an average molecular weight of about 173 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium doceylbenzenesulfonate catalyst and (3) about 32 g. of an equilibrated ethoxy end blocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135-145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 22.8 percent by weight of polysiloxane blocks and about 77.2 percent by weight of polyoxyalkylene blocks. The polyurethane foam stabilizing properties of said block copolymer product are shown below.

EXAMPLE 10

A polysiloxane-poly(oxyethylene-oxypropylene) block copolymer was prepared by charging (1) about 150 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.2 g. of pyridinium doceylbenzenesulfonate catalyst; and (3) about 52 g. of an equilibrated ethoxy end blocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecular (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 1060 cs., said block copolymer consisting essentially of about 24.3 percent by weight of polysiloxane blocks and about 75.7 percent by weight of polyoxyalkylene blocks. The polyurethane foam stabilizing properties of said block copolymer product are shown below.

EXAMPLE 11

A polysiloxane-poly(oxyethylene-oxypropylene) block copolymer was prepared by charging (1) about 150 g. of a polyether admixture having an average molecular weight of about 1630 and consisting of about 45 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 55 percent by weight of monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.2 g. of pyridinium dodecylbenzenesulfonate catalyst; and (3) about 51 g. of an equilibrated ethoxy end blocked polydimethyl-siloxane fluid consisting essentially of about 1.3 siloxy units of the formula $MeSiO_{1.5}$, and 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 23.7 percent by weight of polysiloxane blocks and about 76.3 percent by weight of polyoxyalkylene blocks. The polyurethane foam stabilizing properties of said block copolymer product are shown below.

EXAMPLE 12

Polysiloxane-poly(oxyethylene-oxypropylene) block copolymer was prepared by charging (1) about 150 g. of a polyether admixture having an average molecular weight of about 1480 and consisting of about 55 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 45 percent by weight of a monohydroxy terminated polyoxyalkylene butanol started copolymer having an average molecular weight of about 3200 wherein about 50 weight percent of the oxyalkylene groups of the copolymers are oxyethlene, the remainder of the oxyalkylene groups being oxypropylene, said oxyalkylene groups being present in the copolymer in a random distribution; (2) about 1.2 g. of pyridinium dodecylbenzenesulfonate catalyst; and (3) about 57 g. of an equilibrated ethoxy end blocked polydimethyl-siloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 26.8 percent by weight of polysiloxane blocks and about 73.2 percent by weight of polyoxyalkylene blocks. The polyurethane foam stabilizing properties of said block copolymer product are shown below.

EXAMPLE 13

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.6 g. of a pyridinium dodecylbenzenesulfonate catalyst; and (3) about 31 g. of an equilibrated ethoxy end blocked polydimethylsiloxane fluid consisting essentially of about 1.8 siloxy units of the formula $MeSiO_{1.5}$, about 20.2 siloxy units of the formula $Me_2SiO$ and about 3.8 siloxy units of the formula $(Me)_2(OC_2H_5)SiO_{0.5}$ per average molecule (about 14.7 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 22.1 percent by weight of polysiloxane blocks and about 77.9 percent by weight of polyoxyalkylene blocks. The polyurethane foam stabilizing properties of said block copolymer product are shown below.

EXAMPLE 14

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.6 g. of pyridinium dodecylbenzenesulfonate catalyst; and (3) about 33 g. of an equilibrated ethoxy end blocked polydimethylsiloxane fluid consisting essentially of about 2.0 siloxy units of the formula $MeSiO_{1.5}$, about 22.6 siloxy units of the formula $Me_2SiO$ and about 4.0 siloxy units of the formula $(Me)_2(OC_2H_5)SiO_{0.5}$ per average molecule (about 13.9 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 23.4 percent by weight of polysiloxane blocks and about 76.6 percent by weight of polyoxyalkylene blocks. The polyurethane foam stabilizing properties of said block copolymer product are shown below.

EXAMPLE 15

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of a pyridinium dodecylbenzenesulfonate catalyst; and (3) about 34 g. of an equilibrated ethoxy end blocked polydimethylsiloxane fluid consisting essentially of about 1.4 siloxy units of the formula $MeSiO_{1.5}$, about 19.7 siloxy units of the formula $Me_2SiO$ and about 3.4 siloxy units of the formula $(Me)_2(OC_2H_5)SiO_{0.5}$ per average molecule (about 14.6 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 23.6 percent by weight of polysiloxane blocks and about 76.4 percent by weight of polyoxyalkylene blocks. The polyurethane foam stabilizing properties of said block copolymer product are shown below.

EXAMPLE 16

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of pyridinium dodecylbenzenesulfonate catalyst, and (3) about 37 g. of an equilibrated ethoxy end blocked polydimethylsiloxane fluid consisting essentially of about 2.5 siloxy units of the formula $MeSiO_{1.5}$, about 29.3 siloxy units of the formula $Me_2SiO$ and about 4.5 siloxy units of the formula $(Me)_2(OC_2H_5)SiO_{0.5}$ per average molecule (about 12.4 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 25.6 percent by weight of polysiloxane blocks and about 74.4 percent by weight of polyoxyalkylene blocks. The polyurethane foam stabilizing properties of said block copolymer products are shown below.

EXAMPLE 17

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 34 g. of an equilibrated ethoxy end blocked polydimethylsiloxane fluid consisting essentially of about 1.4 siloxy units of the formula $MeSiO_{1.5}$, about 20.2 siloxy units of the formula $Me_2SiO$ and about 3.4 siloxy units of the formula $(Me)_2(OC_2H_5)SiO_{0.5}$ per average molecule (about 13.6 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 24.0 percent by weight of polysiloxane blocks and about 76.0 percent by weight of polyoxyalkylene blocks. The polyurethane foam stabilizing properties of said block copolymer product are shown below.

EXAMPLE 18

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 32 g. of an equilibrated ethoxy end blocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 15.3 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 22.8 percent by weight of polysiloxane blocks and about 77.2 percent by weight of polyoxyalkylene blocks. The polyurethane foam stabilizing properties of said block copolymer product are shown below.

EXAMPLE 19

A polysiloxane-poly(oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 37 g. of an equilibrated ethoxy end blocked polydimethylsiloxane fluid consisting essentially of about 2.5 siloxy units of the formula $MeSiO_{1.5}$, about 29.5 siloxy units of the formula $Me_2SiO$ and about 4.5 siloxy units of the formula $(Me)_2(OC_2H_5)SiO_{0.5}$ per average molecule (about 12.3 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 25.7 percent by weight of polysiloxane blocks and about 74.3 percent by weight of polyoxyalkylene blocks. The polyurethane foam stabilizing properties of said block copolymer product are shown below.

EXAMPLE 20

A polysiloxane-poly(oxyethylene-oxypropylene) block copolymer was prepared by charging (1) about 100 g. of a polyether admixture having an average molecular weight of about 1480 and consisting of about 55 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 45 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 35 g. of an equilibrated ethoxy end blocked polydimethylsiloxane fluid consisting essentially of about 1.8 siloxy units of the formula $MeSiO_{1.5}$, about 20.2 siloxy units of the formula $Me_2SiO$ and about 3.8 siloxy units of the formula $(Me)_2(OC_2H_5)SiO_{0.5}$ per average molecule (about 14.7 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 23.9 percent by weight of polysiloxane blocks and about 76.1 percent by weight of polyoxyalkylene blocks. The polyurethane foam stabilizing properties of said block copolymer product are shown below.

EXAMPLE 21

A polysiloxane-poly(oxyethylene-oxypropylene) block copolymer was prepared by charging (1) about 100 g. of a polyether admixture having an average molecular weight of about 1480 and consisting of about 55 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 45 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 6.8 g. of pyridinium dodecylbenzenesulfonate catalyst; and (3) about 37 g. of an equilibrated ethoxy end blocked polydimethylsiloxane fluid consisting essentially of about 2.0 siloxy units of the formula $MeSiO_{1.5}$, about 22.6 siloxy units of the formula $Me_2SiO$ and about 4.0 siloxy units of the formula $(Me)_2(OC_2H_5)SiO_{0.5}$ per average molecule (about 14.0 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 25.2 percent by weight of polysiloxane blocks and about 74.8 percent by weight of polyoxyalkylene blocks. The polyurethane foam stabilizing properties of said block copolymer product are shown below.

EXAMPLE 22

A polysiloxane-poly(oxyethylene-oxypropylene) block copolymer was prepared by charging (1) about 100 g. of a polyether admixture having an average molecular weight of about 1480 and consisting of about 55 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 45 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 41 g. of an equilibrated ethoxy end blocked polydimethylsiloxane fluid consisting essentially of about 2.5 siloxy units of the formula $MeSiO_{1.5}$, about 29.3 siloxy units of the formula $Me_2SiO$ and about 4.5 siloxy units of the formula $(Me)_2(OC_2H_5)SiO_{0.5}$ per average molecule (about 12.4 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried our for about 2 hours with ethanol being removed at the still head. The reaction mixture was then neutralized with sodium bicarbonate and the residue filtered to remove residual sodium bicarbonate and the salt formed in the neutralization. The polysiloxanepoly(oxyethylene-oxypropylene) block copolymer product was a homogeneous liquid, said block copolymer consisting essentially of about 27.6 percent by weight of polysiloxane blocks and about 72.4 percent by weight of polyoxyalkylene blocks. The polyurethane foam stabilizing properties of said block copolymer product are shown below.

EXAMPLE 23

A polysiloxane-poly(oxyethylene-oxypropylene) block copolymer was prepared by charging (1) about 100 g. of a polyether admixture having an average molecular weight of about 1480 and consisting of about 55 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in random distribution, and about 45 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 38 g. of an equilibrated ethoxy end blocked polydimethylsiloxane fluid consisting essentially of about 1.4 siloxy units of the formula MeSiO$_{1.5}$ about 20.2 siloxy units of the formula Me$_2$SiO and about 3.4 siloxy units of the formula (Me)$_2$(OC$_2$H$_5$)SiO$_{0.5}$ per average molecule (about 13.6 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethyleneoxypropylene) block copolymer product was a homogeneous liquid, said block copolymer consisting essentially of about 25.9 percent by weight of polysiloxane blocks and about 74.1 percent by weight of polyoxyalkylene blocks. The polyurethane foam stabilizing properties of said block copolymer product are shown below.

EXAMPLE 24

A polysiloxane-poly(oxyethylene-oxypropylene) block copolymer was prepared by charging (1) about 100 g. of a polyether admixture having an average molecular weight of about 1730 and consisting of about 60 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of a pyridinium dodecylbenzenesulfonate catalyst; and (3) about 31 g. of an equilibrated ethoxy end blocked polydimethylsiloxane fluid consisting essentially of about 1.4 siloxy units of the formula MeSiO$_{1.5}$, about 19.7 siloxy units of the formula Me$_2$SiO and about 3.4 siloxy units of the formula (Me)$_2$(OC$_2$H$_5$) Sio$_{0.5}$ per average molecule (about 14.6 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135–145° C. with nitrogen being fed through the subnatent tube. The reaction was carried our for about 2 hours with ethanol being removed at the still head. The reaction mixture was then neutralized with sodium bicarbonate and the residue filtered to remove residual sodium bicarbonate and the salt formed in the neutralization. The polysiloxanepoly(oxyethylene-oxypropylene) block copolymer product was a homogeneous liquid, said block copolymer consisting essentially of about 21.6 percent by weight of polysiloxane blocks and about 78.4 percent by weight of polyoxyalkylene blocks. The polyurethane foam stabilizing properties of said block copolymer product are shown below.

EXAMPLE 25

A polysiloxane-poly (oxyethylene-oxypropylene) block copolymer was prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 percent of the oxyalkylene groups of the copolymer are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups present in the copolymer in a random distribution; (2) about 0.8 g. of pyridinium dodecylbenzenesulfonate catalyst; and (3) about 29 g. of an equilibrated ethoxy endblocked, polydimethylsiloxane fluid consisting essentially of about 1.8 siloxy units of the formula MeSiO$_{1.5}$, about 20.2 siloxy units of the formula Me$_2$SiO and about 3.8 siloxy units of the formula (Me)$_2$(OC$_2$H$_5$)SiO$_{0.5}$ per average molecule (about 14.7 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 20.7 percent by weight of polysiloxane blocks and about 79.3 percent by weight of polyoxyalkylene blocks. The polyurethane foam stabilizing properties of said block copolymer product are shown below.

EXAMPLE 26

A polysiloxane-poly (oxyethylene-oxypropylene) block copolymer was prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 30 g. of an equilibrated ethoxy endblocked polydimethylsiloxane fluid consisting essentially of about 2.0 siloxy units of the formula MeSiO$_{1.5}$, about 22.6 siloxy units of the formula Me$_2$SiO and about 4.0 siloxy units of the formula (Me)$_2$(OC$_2$H$_5$)SiO$_{0.5}$ per average molecular (about 13.9 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 21.9 percent by weight of polysiloxane blocks and about 78.1 percent by weight of polyoxyalkylene blocks. The polyurethane foam stabilizing properties of said block copolymer product are shown below.

EXAMPLE 27

A polysiloxane-poly (oxyethylene-oxypropylene) block copolymer was prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 34 g. of an equilibrated ethoxy endblocked polydimethylsiloxane fluid consisting essentially of about 2.5 siloxy units of the formula MeSiO$_{1.5}$, about 29.3 siloxy units of the formula Me$_2$SiO and about 4.5 siloxy units of the formula (Me)$_2$(OC$_2$H$_5$) SiO$_{0.5}$ per average molecule (about 12.4 percent of the total siloxy units being (Me)$_2$(OC$_2$H$_5$)SiO$_{0.5}$) to a one liter, agitated, glass reaction vessel fitted with a still head and a tube extending to near the botton of the vessel. The reaction mixture was heated to 135°–145° C. with nitrogen being fed through the subnatennt tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 24.1 percent by weight of polysiloxane blocks and about 75.9 percent by weight of polyoxyalkylene blocks. The polyurethane foam stabilizing properties of said block copolymer product are shown below.

EXAMPLE 28

A polysiloxane-poly (oxyethylene-oxypropylene) block copolymer was prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 32 g. of an equilibrated ethoxy endblocked polydimethylsiloxane fluid consisting essentially of about 1.4 siloxy units of the formula MeSiO$_{1.5}$, about 20.2 siloxy units of the formula Me$_2$SiO and about 3,4 siloxy units of the formula (Me)$_2$(OC$_2$H$_5$)SiO$_{0.5}$ per average molecule (about 13.6 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 22.5 percent by weight of polysiloxane blocks and about 77.5 percent by weight of polyoxyalkylene blocks. The polyurethane foam stabilizing properties of said block copolymer product are shown below.

EXAMPLE 29

A polysiloxane-poly (oxyethylene-oxypropylene) block copolymer was prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pryidinium dodecylbenzenesulfonate catalyst, and (3) about 30 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 15.3 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 21.3 percent by weight of polysiloxane blocks and about 78.7 percent by weight of polyoxyalkylene blocks. The polyurethane foam stabilizing properties of said block copolymer product are shown below.

EXAMPLE 30

A polysiloxane-poly (oxyethylene-oxypropylene) block copolymer oxyalkylene groups of the copolymer prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the remainder are oxyethylene, the remainder of the oxyalkylene groups being oxypropylene, said oxyalkylene groups being present in the copolymer in a random distribution, and about 60 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8 g. of pyridinium dodecylbenzenesulfonate catalyst; and (3) about 31 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 1200 cs., said block copolymer consisting essentially of about 22.3 percent by weight of polysiloxane blocks and about 77.7 percent by weight of polyoxyalkylene blocks. The polyurethane foam stabilizing properties of said block copolymer product are shown below.

EXAMPLE 31

A polysiloxane-poly (oxyethylene-oxypropylene) block copolymer was prepared by charging (1) about 158 g. of a polyether admixture having an average molecular weight of about 1870 and consisting of about 34 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 66 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a ramdon distribution; (2) about 1.0 g. of pyridinium dodecylbenzenesulfonate catalyst; and (3) about 41 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 20.5 percent by weight of polysiloxane blocks and about 79.5 percent by weight of polyoxyalkylene blocks. The polyurethane foam stabilizing properties of said block copolymer product are shown below.

EXAMPLE 32

A polysiloxane-poly(oxyethyelen-oxypropylene) block copolymer was prepared by charging (1) about 130 g. of a polyether admixture having an average molecular weight of about 2650 and consisting of about 50 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 50 percent by weight of a monomethoxy terminated allyl alcohol started polyoxyalkylene copolymer having an average molecular weight of about 2950 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 28.5 g. of an equilibrated trimethyl endblocked poly(dimethylsiloxy methylhydrogen siloxy) siloxane copolymer fluid consisting essentially of about 17.5 siloxy units of the formula (Me)(H)SiO, about 130 siloxy units of the formula $Me_2SiO$ and about 2 siloxy units of the formula $(Me)_3SiO_{0.5}$ per average molecule (about 10.9 percent of the total siloxy units being (Me)(H)SiO) to a one liter, agitated, glass reaction vessel fitted with a still head. The reaction mixture was heated to 80°–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 990 cs., said block copolymer consisting essentially of about 22.2 percent by weight of polysiloxane blocks and about 77.8 percent by weight of polyoxyalkylene blocks. The polyurethane foam stabilizing properties of the block copolymer are shown below.

EXAMPLE 33

A polysiloxane-poly(oxyethylene-oxypropylene) block copolymer was prepared by charging (1) about 120 g. of a polyether admixture having an average molecular weight of about 2350 and consisting of 25 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 4050 and wherein about 40 weight percent of the oxyalkylene groups of the copolymer are oxyethylene, the remainer of the oxyalkylene groups being oxypropylene, said oxyalkylene groups being present in the copolymer in a random distribution; (2) about 0.11 cc. of chloroplatininc acid catalyst (10% solution in 1,2-dimethoxy ethane) and (3) about 34 g. of an equilibrated trimethyl end blocked poly(dimethylsiloxy-methylhydrogensiloxy) siloxane copolymer fluid consisting essentially of about 3.2 siloxy units of the formula (Me)(H)SiO, about 32.8 siloxy units of the formula $Me_2SiO$ and about 2 siloxy units of the formula $(Me)_3SiO_{0.5}$ per average molecule (about 8.4 percent of the total siloxy units being (Me)(H)SiO) to a one liter, agitated, glass reaction vessel fitted with a still head. The reaction mixture was heated to 80°–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 930 cs., said block copolymer consisting essentially of about 25.4 percent by weight of polysiloxane blocks and about 74.6 percent by weight of polyoxyalkylene blocks. The polyurethane foam stabilizing properties of the block copolymer are shown below.

EXAMPLE 34

A polyxiloxane-poly(oxyethylene-oxypropylene) block copolymer was prepared by charging (1) to about 120 g. of a polyether admixture having an average molecular weight of about 2350 and consisting of 25 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 4050 and wherein about 40 weight percent of the oxyalkylene groups of the copolymer ae oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 36 g. of an equilibrated trimethyl endblocked poly(dimethylsiloxymethylhydrogensiloxy) siloxane copolymer fluid consisting essentially of about 4.2 siloxy units of the formula (Me)(H)SiO, about 44.7 siloxy units of the formula $Me_2SiO$ and about 2 siloxy units of the formula $(Me)_3SiO_{0.5}$ per average molecule (about 8.3 percent of the total siloxy units being (Me)(H)SiO) to a one liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxanepoly(oxyethylene-oxypropylene) block copolymer product was a homogeneous liquid having a viscosity of about 1360 cs., said block copolymer consisting essentially of about 26.4 percent by weight of polysiloxane blocks and about 73.6 percent by weight of polyoxyalkylene blocks. The polyurethane foam stabilizing properties of the block copolymer are shown below.

EXAMPLE 35

A polysiloxane-poly(oxyethylene-oxypropylene) block copolymer was prepared by charging (1) about 120 g. of a polyether admixture having an average molecular weight of about 2350 and consisting of 25 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 4050 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 36 g. of an equilibrated trimethyl end blocked poly(dimethylsiloxy)-methylhydrogensiloxy) siloxane copolymer fluid consisting essentially of about 6.3 siloxy units of the formula (Me)(H)SiO, about 62.7 siloxy units of the formula $Me_2SiO$ and about 2 siloxy units of the formula $(Me)_3SiO_{0.5}$ per average molecule (about 8.9 percent of the total siloxy units being (Me)(H)SiO) to aone liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 2030 cs., said block copolymer consisting essentially of about 26.4 percent by weight of polysiloxane blocks and about 73.6 percent by weight of polyoxyalkylene blocks. The polyurethane foam stabilizing properties of the block copolymer are shown below.

EXAMPLE 36

A polysiloxane-poly(oxyethylene-oxypropylene) block copolymer was prepared by charging (1) about 120 g. of a polyether admixture having an average molecular weight of about 2350 and consisting of 25 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 4050 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 36.2 g. of an equilibrated trimethyl end blocked poly(dimethylsiloxy-methylhydrogensiloxy) siloxane copolymer fluid consisting essentially of about 13.7 siloxy units of the formula (Me)(H)SiO, about 135.5 siloxy units of the formula $Me_2SiO$ and about 2 siloxy units of the formula $(Me)_3SiO_{0.5}$ per average molecule (about 8.4 percent of the total siloxy units being (Me)(H)SiO to a one liter, agitated, glass reaction vessel fitted with a still head. The reaction mixture was heated to 80° C–90° C. and held until silanichydrogen was no longer detectable by reaction with an ethanol solution of potassium hydroxide. The polysiloxane-poly(oxyethylene-oxypropylene) block copolymer product was a homogeneous liquid having a viscosity of about 3420 cs., said block copolymer consisting essentially of about 26.4 percent by weight of polysiloxane blocks and about 73.6 percent by weight of polyoxyalkylene blocks. The polyurethane foam stabilizing properties of the block copolymer are shown below.

EXAMPLE 37

A polysiloxane-poly(oxyethylene-oxypropylene) block copolymer was prepared by charging (1) about 130 g. of a polyether admixture having an average molecular weight of about 1610 and consisting of 25 percent by weight of a monomethoxy terminated polyoxyalkylene allyl alcohol started copolymer having an average molecular weight of about 570 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 4050 and wherein about 40 weight percent of the oxyalkylene groups of the copolymer are oxyethylene, the remainder of the oxyalkylene groups being oxypropylene, said oxyalkylene groups being present in the copolymer in a random distribution, (2) about 0.11 cc. of chloroplatinic acid catalyst (10% solution in 1,2-dimethoxy ethane) and (3) about 34 g. of an equilibrated trimethyl end blocked poly(dimethylsiloxymethylhydrogensiloxy) siloxane copolymer fluid consisting essentially of about 9.9 siloxy units of the formula (Me)(H)SiO, about 64.6 siloxy units of the formula $Me_2SiO$ and about 2 siloxy units of the formula $(Me)_3SiO_{0.5}$ per average molecule (about 13.0 percent of the total siloxy units being (Me)(H)SiO) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1170 cs., said block copolymer consisting essentially of about 25.9 percent by weight of polysiloxane blocks and about 74.1 percent by weight of polyoxyalkylene blocks. The polyurethane foam stabilizing properties of the block copolyer are shown below.

EXAMPLE 38

A polysiloxane-poly(oxyethylene-oxypropylene) block copolymer was prepared by charging (1) about 126 g. of a polyether admixture having an average molecular weight of about 1700 and consisting of about 33 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution; about 33 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 34 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ehtane); and (3) about 32 g. of an equilibrated trimethyl endblocked poly(dimethylsiloxy-methylhydrogensiloxy) siloxane copolymer fluid consisting essentially of about 9.9 siloxy units of the formula (Me)(H)SiO, about 64.6 siloxy units of the formula $Me_2SiO$ and about 2 siloxy units of the formula $(Me)_3SiO_{0.5}$ per average molecule (about 12.9 percent of the total siloxy units being (Me)(H)SiO) to a one liter, agitated, glass reaction vessel fitted with a still head. The reaction mixture was heated to 80° C–90° C. and held until silanic hydrogen was no longer detectable by reaction with an ethanol solution of potassium hydrogen. The polysiloxane-poly(oxyethylene-oxypropylene) block copolymer product was a homogeneous liquid having a viscosity of about 840 cs., said block copolymer consisting essentially of about 24.3 percent by weight of polysiloxane blocks and about 75.7 percent by weight of polyoxyalkylene blocks. The polyurethane foam stabilizing properties of the block copolymer are shown below.

EXAMPLE 39

A polysiloxane-poly(oxyethylene-oxypropylene) block copolymer was prepared by charging (1) about 126 g. of a polyether admixture having an average molecular weight of about 1700 and consisting of about 33 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution; about 33 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 34 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane); and (3) about 33 g. of an equilibrated trimethyl end blocked poly(dimethylsiloxy-methylhydrogensiloxy) siloxane copolymer fluid consisting essentially of about 19.8 siloxy units of the formula $(Me)(H)SiO$ about 130 siloxy units of the formula $Me_2SiO$ and about 2 siloxy units of the formula $(Me)_3SiO_{0.5}$ per average molecule (about 13.0 percent of the total siloxy units being $(Me)(H)SiO$) to a one liter, agitated, glass reaction vessel fitted with a still head. The reaction mixture was heated to 80° C.-90° C. and held until silanic hydrogen was no longer detectable by reaction with an ethanol solution of potassium hydroxide. The polysiloxanepoly(oxyethylene-oxypropylene) block copolymer product was a honmogeneous liquid having a viscosity of about 1220 cs., said block copolymer consisting essentially of about 24.8 percent by weight of polysiloxane blocks and about 75.2 percent by weight of polyoxyalkylene blocks. The polyurethane foam stabilizing properties of the block copolymer are shown below.

EXAMPLE 40

A polysiloxane-poly(oxyethylene-oxypropylene) block copolymer was prepared by charging (1) about 120 g. of a polyether admixture having an average molecular weight of about 1640 and consisting of about 20 percent by weight of a monomethoxy terminated polyoxyalkylene allyl alcohol started copolymer having an average molecular weight of about 570 wherein about 40 weight percent of the oxyalkylene groups of the copolymer are oxyethylene, the remainder of the oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 2950 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of the chloroplatinic acid catalyst (10% solution in 1,2-dimethoxy ethane); and (3) about 31 g. of an equilibrated trimethyl end blocked poly(dimethylsiloxy-methylhydrogensiloxy) copolymer fluid consisting essentially of about 9.9 siloxy units of the formula $(Me)(H)SiO$, about 64.6 siloxy units of the formula $Me_2SiO$ and about 2 siloxy units of the formula $(Me)_3SiO_{0.5}$ per average molecule (about 12.9 percent of the total siloxy units being $(Me)(H)SiO$) to a one liter, agitated, glass reaction vessel fitted with a still head. The reaction mixture was heated to 80° C-90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1010 cs., said block copolymer consisting essentially of about 23.6 percent by weight of polysiloxane blocks and about 76.4 percent by weight of polyoxyalkylene blocks. The polyurethane foam stabilizing properties of the block copolymer are shown below.

EXAMPLE 41

A polysiloxane-poly(oxyethylene-oxypropylene) block copolymer was prepared by charging (1) about 120 g. of a polyether admixture having an average molecular weight of about 1640 and consisting of about 20 percent by weight of a monomethoxy terminated polyoxyalkylene allyl alcohol started copolymer having an average molecular weight of about 570 wherein about 40 weight percent of the oxyalkylene groups of the copolymer are oxyethylene, the remainder of the oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 2950 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane); and (3) about 32 g. of an equilibrated trimethyl endblocked poly(dimethylsiloxy-methylhydrogensiloxy) siloxane copolymer fluid consisting essentially of about 19.8 siloxy units of the formula (Me)(H)SiO, about 130 siloxy units of the formula Me$_2$SiO and about 2 siloxy units of the formula (Me)$_3$SiO$_{0.5}$ per average molecule (about 13.0 percent of the total siloxy units being (Me)(H)SiO) to a one liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1490 cs., said block copolymer consisting essentially of about 24.2 percent by weight of polysiloxane blocks and about 75.7 percent by weight of polyoxyalkylene blocks. The polyurethane foam stabilizing properties of the block copolymer are shown below.

EXAMPLE 42

A polysiloxane-poly(oxyethylene-oxypropylene) block copolymer was prepared by charging (1) about 120 g. of a polyether admixture having an average molecular weight of about 2200 and consisting of about 20 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of th oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplantinic acid catalyst (10% solution in 1,2-dimethoxy ethane); and (3) about 31.5 g. of an equilibrated trimethyl endblocked poly(dimethylsiloxy-methylhydrogensiloxy) siloxane copolymer fluid consisting essentially of about 7.5 siloxy units of the formula (Me)(H)SiO, about 67 siloxy units of the formula Me$_2$SiO and about 2 siloxy units of the formula (Me)$_3$SiO$_{0.5}$ per average molecule (about 9.8 percent of the total siloxy units being (Me)(H)SiO) to a one liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1250 cs., said block copolymer consisting essentially of about 23.9 percent by weight of polysiloxane blocks and about 76.1 percent by weight of polyoxyalkylene blocks. The polyurethane foam stabilizing properties of the block copolymer are shown below.

EXAMPLE 43

A polysiloxane-poly(oxyethylene-oxypropylene) block copolymer was prepared by charging (1) about 120 g. of a polyether admixture having an average molecular weight of about 2200 and consisting of about 20 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplantinic acid catalyst (10% solution in 1,2-dimethoxy ethane); and (3) about 38.5 g. of an equilibrated trimethyl endblocked poly(dimethylsiloxy-methylhydrogensiloxy) siloxane copolymer fluid consisting essentially of about 4.2 siloxy units of the formula (Me)(H)SiO, about 44.7 siloxy units of the formula Me$_2$SiO and about 2 siloxy units of the formula (Me)$_3$SiO$_{0.5}$ per average molecule (about 8.3 percent of the total siloxy units being (Me)(H)SiO) to a one liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1210 cs., said block copolymer consisting essentially of about 27.9 percent by weight of polysiloxane blocks and about 72.1 percent by weight of polyoxyalkylene blocks. The polyurethane foam stabilizing properties of the block copolymer are shown below.

EXAMPLE 44

A polysiloxane-poly(oxyethylene-oxypropylene) block copolymer was prepared by charging (1) about 120 g. of a polyether admixture having an average molecular weight of about 2200 and consisting of about 20 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane); and (3) about 38.5 g. of an equilibrated trimethyl end blocked poly(dimethylsiloxy-methylhydrogensiloxy) siloxane copolymer fluid consisting essentially of about 6.3 siloxy units of the formula (Me)(H)SiO, about 67.7 siloxy units of the formula $Me_2SiO$ and about 2 siloxy units of the formula $(Me)_3SiO_{0.5}$ per average molecule (about 8.3 percent of the total siloxy units being (Me)(H)SiO) to a one liter, agitated, glass reaction vessel fitted with a still head. The reaction mixture was heated to 80° C.-90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1680 cs., said block copolymer consisting essentially of about 27.9 percent by weight of polysiloxane blocks and about 72.1 percent by weight of polyoxyalkylene blocks. The polyurethane foam stabilizing properties of the block copolymer are shown below.

EXAMPLE 45

A polysiloxane-poly(oxyethylene-oxypropylene) block copolymer was prepared by charging (1) about 120 g. of a polyether admixture having an average molecular weight of about 2200 and consisting of about 20 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of of the oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane); and (3) about 38.6 g. of an equilibrated trimethyl endblocked poly(dimethylsiloxy-methylhydrogensiloxy) siloxane copolymer fluid consisting essentially of about 12.7 siloxy units of the formula (Me)(H)SiO, about 135.5 siloxy units of the formula $Me_2SiO$ and about 2 siloxy units of the formula $(Me)_3SiO_{0.5}$ per average molecule (about 8.5 percent of the total siloxy units being (Me)(H)SiO) to a one liter, agitated, glass reaction vessel fitted with a still head. The reaction mixture was heated to 80° C.-90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 2500 cs., said block copolymer consisting essentially of about 27.8 percent by weight of polysiloxane blocks and about 72.2 percent by weight of polyoxyalkylene blocks. The polyurethane foaming stabilizing properties of the block copolymer are shown below.

EXAMPLE 46

A polysiloxane-poly(oxyethylene-oxypropylene) block copolymer was prepared by charging (1) about 122 g. of a polyether admixture having an average molecular weight of about 2460 and consisting of about 15 percent by weight of a monomethoxy terminated polyoxyalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution; about 15 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; and about 70 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of, the oxyalkylene groups being oxypropylene, said oxyalkylene groups being present in the copolymer in a random distribution; (2) about 0.11 cc. of chloroplatinic acid catalyst (10% solution in 1,2-dimethoxy ethane); and (3) about 48 g. of an equilibrated trimethyl endblocked poly(dimethylsiloxy-methylhydrogensiloxy) siloxane copolymer fluid consisting essentially of about 5.1 siloxy units of the formula (Me)(H)SiO, about 72 siloxy units of the formula $Me_2SiO$ and about 2 siloxy units of the formula $(Me)_3SiO_{0.5}$ per average molecule (about 6.4 percent of the total siloxy units being (Me)(H)SiO) to a one liter, agitated, glass reaction vessel fitted with a still head. The reaction mixture was heated to 80° C.-90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 3500 cs., said block copolymer consisting essentially of about 32.4 percent by weight of polysiloxane blocks and about 67.6 percent by weight of polyoxyalkylene blocks. The polyurethane foam stabilizing properties of the block copolymer are shown below.

EXAMPLE 47

A polysiloxane-poly (oxyethylene-oxypropylene) block copolymer was prepared by charging (1) about 100 g. of a polyether admixture having an average molecular weight of about 2270 and consisting of about 25 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.6 g. of pyridinium dodecylbenzenesulfonate catalyst; and (3) about 28.5 g. of an equilibrated ethoxy endblocked polydimethylsiloxane fluid consisting essentially of about 4.0 siloxy units of the formula $MeSiO_{1.5}$, about 38.0 siloxy units of the formula $Me_2SiO$ and about 6.0 siloxy units of the formula $(Me)_2(OC_2H_5)SiO_{0.5}$ per average molecule (about 12.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 4800 cs., said block copolymer consisting essentially of about 21.3 percent by weight of polysiloxane blocks and about 78.7 percent by weight of polyoxyalkylene blocks. The polyurethane foam stabilizing properties of said block copolymer product are shown below.

EXAMPLE 48

A polysiloxane-poly (oxyethylene-oxypropylene) block copolymer was prepared by charging (1) about 100 g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 31g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecular (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly (oxyethylene-oxypropylene) block copolymer product was a homogeneous liquid having a viscosity of about 2070 cs., said block copolymer consisting essentially of about 22.1 percent by weight of polysiloxane blocks and about 77.9 percent by weight of polyoxyalkylene blocks. The polyurethane foam stabilizing properties of said block copolymer product are shown below.

EXAMPLE 49

A polysiloxane-poly (oxyethylene-oxypropylene) block copolymer was prepared by charging (1) about 100g. of a polyether admixture having an average molecular weight of about 1730 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 34g. of an equilibrated ethoxy endblocked polydimethylsiloxane fluid consisting essentially of about 4.0 siloxy units of the formula $MeSiO_{1.5}$, about 38 siloxy units of the formula $Me_2SiO$ and about 6 siloxy units of the formula $(Me)_2(OC_2H_5)SiO_{0.5}$ per average molecule (about 12.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 2090 cs., said block copolymer consisting essentially of about 23.7 percent by weight of polysiloxane blocks and about 76.3 percent by weight of polyoxyalkylene blocks. The polyurethane foam stabilizing properties of said block copolymer product are shown below.

EXAMPLE 50

A polysiloxane-poly (oxyethylene-oxypropylene) block copolymer was prepared by charging (1) about 100g. of a polyether admixture having an average molecular weight of about 1770 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) and 0.8g. pyridinium dodecylbenzenesulfonate catalyst; and (3) about 31g. of an equilibrated ethoxy endlocked polydimethylsiloxane fluid consisting essentially of about 4 siloxy units of the formula $MeSiO_{1.5}$, about 54.8 siloxy units of the formula $Me_2SiO$ and about 6 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly (oxyethylene-oxypropylene) block copolymer product was a homogeneous liquid, said block copolymer consisting essentially of about 22.1 percent by weight of polysiloxane blocks and about 77.9 percent by weight of polyoxyalkylene blocks. The polyurethane foam stabilizing properties of said block copolymer product are shown below.

EXAMPLE 51

A polysiloxane-poly (oxyethylene-oxypropylene) block copolymer was prepared by charging (1) about 100g. of a polyether admixture having an average molecular weight of about 1770 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 34g. of an equilibrated ethoxy endblocked polydimethylsiloxane fluid consisting essentially of about 4 siloxy units of the formula $MeSiO_{1.5}$, about 38 units of the formula $Me_2SiO$ and about 6 siloxy units of the formula $(Me)_2(OC_2H_5)SiO_{0.5}$ per average molecule (about 12.5 percent of the total siloxy units being $(Me)_2(OC_2H_5)SiO_{0.5}$) to a one liter, agitated, glass reaction vessel fitted with a still head and a tube extending to near the bottom vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 23.7 percent by weight of polysiloxane blocks and about 76.3 percent by weight of polyoxyalkylene blocks. The polyurethane foam stabilizing properties of said block copolymer product are shown below.

EXAMPLE 52

A polysiloxane-poly (oxyethylene-oxypropylene) block copolymer was prepared by charging (1) about 120g. of a polyether admixture having an average molecular weight of about 1870 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 35g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy of the formula $(Me)_2(OC_2H_5)SiO$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 21.2 percent by weight of polysiloxane blocks and about 78.8 percent by weight of polyoxyalkylene blocks. The polyurethane foam stabilizing properties of said block copolymer product are shown below.

EXAMPLE 53

A polysiloxane-poly (oxyethylene-oxypropylene) block copolymer was prepared by charging (1) about 120g. of a polymer admixture having an average molecular weight of about 1980 and consisting of about 33.4 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 33.3 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 33.3 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g of pyridinium dodecylbenzenesulfonate catalyst; and (3) about 33g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 2610 cs., said block copolymer consisting essentially of about 20.3 percent by weight of polysiloxane blocks and about 79.7 percent by weight of polyoxyalkylene blocks. The polyurethane foam stabilizing properties of said block copolymer product are shown below.

EXAMPLE 54

A polysiloxane-poly (oxyethylene-oxypropylene) block copolymer was prepared by charging (1) about 120g. of a polyether admixture having an average molecular weight of about 1770 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 20 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxyalkylene groups being oxypropylene, said oxyalkylene groups being present in the copolymer in a randon distribution; (2) about 0.8g. of pyridinium dodecylbenzenesulfonate catalyst; and (3) about 37g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 2430 cs., said block copolymer consisting essentially of about 22.1 percent by weight of polysiloxane blocks and about 77.9 percent by weight of polyoxyalkylene blocks. The polyurethane foam stabilizing properties of said block copolymer product are shown below.

EXAMPLE 55

A polysiloxane-poly (oxyethylene-oxypropylene) block copolymer was prepared by charging (1) about 120g. of a polyether admixture having an average molecular weight of about 1950 and consisting of about 30 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 34g. of an equilibrated ethoxy endblocked polydimethylsiloxane fluid consisting essentially of about 1.3 siloxy units of the formula $MeSiO_{1.5}$ about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 20.5 percent by weight of polysiloxane blocks and about 79.5 percent by weight of polyoxyalkylene blocks. The polyurethane foam stabilizing properties of said block copolymer product are shown below.

EXAMPLE 56

A polysiloxane-poly (oxyethylene-oxypropylene) block copolymer was prepared by charging (1) about 120g. of a polyether admixture having an average molecular weight of about 1700 and consisting of about 36 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 24 percent by weight of a monohydroxy terminated polyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0g. of pyridinium dodecylbenzenesulfonate catalyst; and (3) about 36.5g. of an equilibrated ethoxy endblocked polydimethylsiloxane fluid consisting essentially of about 1.3 siloxy units of the formula $MeSiO_{1.5}$, about 18.2 siloxy units of the formula $M_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 2290 cs., said block copolymer consisting essentially of about 21.7 percent by weight of polysiloxane blocks and about 78.3 percent by weight of polyoxyalkylene blocks. The polyurethane foam stabilizing properties of said block copolymer product are shown below.

EXAMPLE 57

A polysiloxane-poly (oxyethylene-oxypropylene) block copolymer was prepared by charging (1) about 120g. of a polyether admixture having an average molecular weight of about 1830 and consisting of about 30 percent by weight of a monohydroxy terminated polyoxyalkylne butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 36g. of an equilibrated ethoxy endblocked polydimethylsiloxane fluid consisting essentially of about 1.3 siloxy units of the formula MeSiO$_{1.5}$, about 18.2 siloxy units of the Me$_2$SiO and about 3.3 siloxy units of the formula (Me)$_2$(OC$_2$H$_5$)SiO$_{0.5}$ per average molecule (about 14.5 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remoe residual sodium bicarbonate and the salt formed in the neutralization. The polysiloxanepoly(oxyethylene-oxypropylene) block copolymer product was a homogeneous liquid having a viscosity of about 2260cs., said block copolymer consisting essentially of about 21.5 percent by weight of polysiloxane blocks and about 78.5 percent by weight of polyoxyalkylene blocks. The polyurethane foam stabilizing properties of said block copolymer product are shown below.

EXAMPLE 58

A polysiloxane-poly (oxyethylene-oxypropylene) block copolymer was prepared by charging (1) about 120g. of a polyether admixture having an average molecular weight of about 1520 and consisting of about 45 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 20 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 38.5g. of an equilibrated ethoxy endblocked polydimethylsiloxane fluid consisting essentially of about 1.3 siloxy units of the formula MeSiO$_{1.5}$, about 18.3 siloxy units of the formula Me$_2$SiO and about 3.3 siloxy units of the formula (Me)$_2$(OC$_2$H$_5$)SiO$_{0.5}$ per average molecule (about 14.5 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neturalization. The polysiloxane-poly (oxyethylene-oxypropylene) block copolymer product was a homogeneous liquid having a viscosity of about 1650cs., said block copolymer consisting essentially of about 24.7 percent by weight of polysiloxane blocks and about 75.3 percent by weight of polyoxyalkylene blocks. The polyurethane foam stabilizing properties of said block copolymer product are shown below.

EXAMPLE 59

A polysiloxane-poly (oxyethylene-oxypropylene) block copolymer was prepared by charging (1) about 120g. of a polyether admixture having an average molecular weight of about 1630 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 20 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 45 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0g. of pyridinium dodecylbenzenesulfonate catalyst; and (3) about 36.7g. of an equilibrated ethoxy endblocked polydimethylsiloxane fluid consisting essentially of about 1.3 siloxy units of the formula MeSiO$_{1.5}$, about 18.2 siloxy units of the formula Me$_2$SiO and about 3.3 siloxy units of the formula (Me)$_2$(OC$_2$H$_5$)SiO$_{0.5}$ per average molecule (about 14.5 percent of the total siloxy units being (Me)$_2$(OC$_2$H$_5$)SiO$_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly (oxyethylene-oxypropylene) block copolymer product was a homogeneous liquid having a viscosity of about 2760cs., said block copolymer consisting essentially of about 21.8 percent by weight of polysiloxane blocks and about 78.2 percent by weight of polyoxyalkylene blocks. The polyurethane foam stabilizing properties of said block copolymer product are shown below.

EXAMPLE 60

A polysiloxane-poly (oxyethylene-oxypropylene) block copolymer was prepared by charging (1) about 120g. of a polyether admixture having an average molecular weight of about 1610 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 25 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 37g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polyxiloxane-poly(oxyethyleneoxypropylene) block copolymer product was a homogeneous liquid having a viscosity of about 2010cs., said block copolymer consisting essentially of about 22.0 percent by weight of polysiloxane blocks and about 78.0 percent by weight of polyoxyalkylene blocks. The polyurethane foam stabilizing properties of said block copolymer product are shown below.

EXAMPLE 61

A polysiloxane-poly (oxyethylene-oxypropylene) block copolymer was prepared by charging (1) about 120g. of a polyether admixture having an average molecular weight of about 1910 and consisting of about 30 percent by weight of a monohydroxy terminated polyoxyalkylene butanol started copolyner having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 25 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 45 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalklene groups being oxypropylene, said oxyalkylene groups being present in the copolymer in a random distribution; (2) about 0.8g. of pyridinium dodecylbenzenesulfonate catalyst; and (3) about 31g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethyleneoxypropylene) block copolymer product was a homegeneous liquid having a viscosity of about 2850cs., said block copolymer consisting essentially of about 19.2 percent by weight of polysiloxane blocks and about 80.7 percent by weight of polyoxyalkylene blocks. The polyurethane foam stabilizing properties of said block copolymer product are shown below.

EXAMPLE 62

A polysiloxane-poly (oxyethylene-oxypropylene) block copolymer was prepared by charging (1) about 120g. of a polyether admixture having an average molecular weight of about 1700 and consisting of abouut 30 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 31g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)(OC_2H_2)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly (oxyethyleneoxypropylene) block copolymer product was a homogeneous liquid having a viscosity of about 2700cs., said block copolymer consisting essentially of about 19.2 percent by weight of polysiloxane blocks and about 80.7 percent by weight of polyoxyalkylene blocks. The polyurethane foam stabilizing properties of said block copolymer product are shown below.

EXAMPLE 63

A polysiloxane-poly (oxyethylene-oxypropylene) block copolymer was prepared by charging (1) about 100g. of a polyether admixture having an average molecular weight of about 1730 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in random distribution, and about 25 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.7g. of pyridinium dodecylbenzenesulfonate catalyst; and (3) about 30.2g. of an equilibrated ethoxy endblocked polymethylsiloxane fluid consisting essentially of about 1.3 siloxy units of the formula $MeSiO_{1.5}$ about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-ocypropylene) block copolymer product was a homogeneous liquid having a viscosity of about 2150cs., said block copolymer consisting essentially of about 21.7 percent by weight of polysiloxane blocks and about 78.3 percent by weight of polyoxyalkylene blocks. The polyurethane foam stabilizing properties of said block copolymer product are shown below.

EXAMPLE 64

A polysiloxane-poly (oxyethylene-oxypropylene) block copolymer was prepared by charging (1) about 100g. of a polyether admixture having an average molecular weight of about 1630 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a randon distribution, and about 25 percent by weight of monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.7g. of pyridinium dodecylbenzenesulfonate catalyst; and (3) about 32g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethyleneoxypropylene) block copolymer product was a homogeneous liquid having a viscosity of about 2140cs., said block copolymer consisting essentially of about 22.5 percent by weight of polysiloxane blocks and about 77.5 percent by weight of polyoxyalkylene blocks. The polyurethane foam stabilizing properties of said block copolymer product are shown below.

EXAMPLE 65

A polysiloxane-poly (oxyethylene-oxypropylene) block copolymer was prepared by charging (1) about 165g. of a polyether admixture having an average molecular weight of about 1740 and consisting of about 30 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 20 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 50 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.7g. of pyridinium dodecylbenzenesulfonate catalyst; and (3) about 43g. of an equilibrated ethoxy endblocked polydimethylsiloxane fluid consisting essentially of about 1.3 siloxy units of the formula $MeSiO_{1.5}$, about 18.2 units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reacton mixture was then neutralized with sodium bicarbonate and the residue filtered to remove residual sodium bicarbonate and the salt formed in the neutralization. The polysiloxane-poly(oxyethyleneoxypropylene) block copolymer product was a homogeneous liquid having a viscosity of about 2140cs., said block copolymer consisting essentially of about 20.5 percent by weight of polysiloxane blocks and about 79.5 percent by weight of polyoxyalkylene blocks. The polyurethane foam stabilizing properties of said block copolymer product are shown below.

EXAMPLE 66

A polysiloxane-poly (oxyethylene-oxypropylene) block copolymer was prepared by charging (1) about 165g. of a polyether admixture having an average molecular weight of about 1610 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 25 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.7g. of pyridinium dodecylbenzenesulfonate catalyst; and (3) about 47g. of an equilibrated ethoxy endblocked polydimethylsiloxane fluid consisting essentially of about 1.3 siloxy units of the formula $MeSiO_{1.5}$, about 18.3 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethyleneoxypropylene) block copolymer product was a homogeneous liquid having a viscosity of about 1460cs., said block copolymer consisting essentially of about 21.9 percent by weight of polysiloxane blocks and about 78.1 percent by weight of polyoxyalkylene blocks. The polyurethane foam stabilizing properties of said block copolymer product are shown below.

EXAMPLE 67

A polysiloxane-poly (oxyethylene-oxypropylene) block copolymer was prepared by charging (1) about 165g. of a polyether admixture having an average molecular weight of about 1630 and consisting of about 30 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) and 0.7g. of pyridinium dodecylbenzenesulfonate catalyst; and (3) about 46g. of an equilibrated ethoxy endblocked polydimethlsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecular (14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethyleneoxypropylene) block copolymer product was a homogeneous liquid having a viscosity of about 1470 cs., said block copolymer consisting essentially of about 21.5 percent by weight of polysiloxane blocks and about 78.5 percent by weight of polyoxyalkylene blocks. The polyurethane foam stabilizing properties of said block copolymer product are shown below.

EXAMPLE 68

A polysiloxane-poly (oxyethylene-oxypropylene) block copolymer was prepared by charging (1) about 120g. of a polyether admixture having an average molecular weight of about 2350 and consisting of 25 percent by weight of a monomethoxy terminated polyoxalkylene allyl alcohol started copolymer having an average molecular weight of about 1000 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 4050 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11cc. of chloroplatinic acid catalyst (10% solution in 1, 2-dimethoxy ethane); and (3) about 36 g. of an equilibrated trimethyl endblocked poly (dimethylsiloxy-methylhydrogensiloxy) siloxane copolymer fluid consisting essentially of about 12.7 siloxy units of the formula (Me)(H)SiO, about 135.5 siloxy units of the formula $Me_2SiO$, and about 2 siloxy units of the formula $(Me)_3SiO_{0.5}$ per average molecule (about 8.4 percent of the total siloxy units being (Me)(H)SiO) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethylene-oxypropylene) block copolymer product was homogeneous liquid having a viscosity of about 3420 cs., said block copolymer consisting essentially of about 26.7 percent by weight of polysiloxane blocks and about 73.3 percent by weight of polyoxalkylene blocks. The polyurethane foam stabilizing properties of the block copolymer are shown below.

EXAMPLE 69

A polyxiloxane-poly (oxyethylene-oxypropylene) block copolymer was prepared by charging (1) about 120g. of a polyether admixture having an average molecular weight of about 2350 and consisting of about 25 percent by weight of a monoallyloxy terminated butanol started polyoxalkylene copolymer having an average molecular weight of about 1000 wherein about 50 weight percent of the oxyalkylene groups are oxyethylene, the remainder of the oxalkylene groups being oxypropylene, said oxalkylene groups being present in the copolymer in a random distribution, and about 75 percent by weight of a monoallyloxy terminated polyoxalkylene butanol started copolymer having an average molecular weight of about 4050 and wherein about 50 weight percent of the oxyalkylene groups of the copolymer are oxyethylene, the remainder of the oxyalkylene groups being oxypropylene, said oxalkylene groups being present in the copolymer in a random distribution; (2) about 84 g. of toluene; (3) about 0.11 cc. of chloroplatinic acid catalyst (10% solution in 1,2-dimethoxyethane) of an equilibrated trimethyl endblocked poly (dimethylsiloxy-methylhydroxensiloxy) siloxane copolymer fluid consisting essentially of about 12.7 siloxy units of the formula (Me)(H)SiO, about 135.5 siloxy units of the formula $Me_2SiO$ and about 2 siloxy units of the formula $(Me)_3SiO_{0.5}$ per average molecule (about 8.4 percent of the total siloxy units being (Me)(H)SiO) to a one liter, agitated, glass reaction vessel fitted with a still head.

The reaction mixture was heated to 80° C–90° C. and held until silanic hydrogen was no longer detectable by reaction with an ethanol solution of potassium hydroxide. The toluene was removed by distillation and the residue filtered. The polysiloxane-poly(oxyethyleneoxypropylene) block copolymer product was a homogeneous liquid having a viscosity of about 1550 cs., said block copolymer consisting essentially of about 26.7 percent by weight of polysiloxane blocks and about 73.3 percent by weight of polyoxalkylene blocks. The polyurethane foam stabilizing properties of the block copolymer are shown below.

EXAMPLE 70

A polysiloxane-poly (oxyethylene) block copolymer was prepared by charging (1) about 100g. of a polyether madmixture having an average molecular weight of about 1730 and consisting of about 40 percent by weight of a monohydroxy terminated polyoxalkylene butanol started copolymer having an average molecular weight of about 1000 wherein about 50 weight percent of the oxalkylene groups of the copolymer are oxyethylene the remainder of the oxyalkylene groups being oxypropylene, said oxalkylene groups being present in the copolymer in a random distribution, and about 30 percent by weight of a monohydroxy terminated polyoxalkylene butanol started copolymer having an average molecular weight of about 3200 wherein about 50 weight percent of the oxalkylene groups of the copolymer are oxyethylene, the remainder of the oxyalkylene groups being oxypropylene, said oxyalkylene groups being present in the copolymer in a random distribution and about 30 percent by weight of a monohydroxy terminated polyoxyalkylene butanol started copolymer having an average molecular weight of about 3800 wherein about 50 weight percent of the oxyalkylene groups of the copolymer are oxethylene, the remainder of the oxyalkylene groups being oxypropylene, said oxyalkylene groups being present in the copolymer in a random distribution; (2) about 0.8g. of pyridinium dodecylbenzenesulfonate catalyst; and (3) about 31g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the resiude filtered to remove residual sodium bicarbonate and the salt formed in the neutralization. The polysiloxane-poly (oxyethylene-oxypropylene) block copolymer product was a homogeneous liquid having a viscosity of about 2070 cs., said block copolymer consisting essentially of about 22.1 percent by weight of polysiloxane blocks and about 77.9 percent by weight of polyoxalkylene blocks. The polyurethane foam stabilizing properties of said block copolymer product are shown below.

EXAMPLE 71

A polysiloxane-poly (oxyethylene-oxypropylene) block copolymer was prepared by charging (1) about 130g. of a polyether admixture having an average molecular weight of about 1730 and consisting of about 40 percent by weight of a monohydroxy terminated polyoxalkylene butanol started copolymer having an average molecular weight of about 1000 wherein about 50 weight present of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxalkylene butanol started copolymer having an average molecular weight of about 3800 wherein about 50 weight percent of the oxyalkylene groups of the copolymer are oxethylene, the remainder of the oxalkylene groups being oxypropylene, said oxalkylene groups being present in the copolymer in a random distribution; (2) about 1.0g. of pyridiniumdodecylbenzenesulfonate catalyst; and (3) about 40g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 1 hour with ethanol being removed at the still head. The reaction mixture was then neutralized with sodium bicarbonate and the residue filtered to remove residual sodium bicarbonate and the salt formed in the neutralization. The polysiloxane-poly (oxyethylene-oxypropylene) block copolymer product was a homogeneous liquid having a viscosity of about 1200 cs., said block copolymer consisting essentially of about 22.1 percent by weight of polysiloxane blocks and about 77.9 percent by weight of polyoxalkylene blocks. The polyurethane foam stabilizing properties of said block copolymer product are shown below.

EXAMPLE 72

A polysiloxane-poly (oxyethylene-oxypropylene) block copolymer was prepared by charging (1) about 120 g. of a polyether admixture having an average molecular weight of about 1770 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene being present in the copolymer in a random distribution, and about 20 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution and about 40 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of pyridinium dodecylbenzenesulfonate catalyst; and (3) about 37.2 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 2430 cs., said block copolymer consisting essentially of about 23.9 percent by weight of polysiloxane blocks and about 76.1 percent by weight of polyoxyalkylene blocks. The polyurethane foam stabilizing properties of said block copolymer product are shown below.

EXAMPLE 73

A polysiloxane-poly (oxyethylene-oxypropylene) block copolymer was prepared by charging (1) about 108 g. of a polyether admixture having an average molecular weight of about 1770 and consisting of about 40 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, about 20 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; and about 40 percent by weight of a monohydroxy terminated butanol started polyoxyalkylene copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 62 g. of toluene; (3) about 0.2 g. of pyridinium dodecylbenzenesulfonate catalyst; and (4) about 37 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation, the residue was then filtered to remove residual sodium bicarbonate and the salt formed in the neutralization. The polysiloxane-poly(oxyethylene-oxypropylene) block copolymer product was a homogeneous liquid having a viscosity of about 1700 cs., said block copolymer consisting essentially of about 23.9 percent by weight of polysiloxane blocks and about 76.1 percent by weight of polyoxyalkylene blocks. The polyurethane foam stabilizing properties of said block copolymer product are shown below.

EXAMPLE 74

A polysiloxane-poly (oxyethylene-oxypropylene) block copolymer was prepared by charging (1) about 120 g. of a polyether admixture having an average molecular weight of about 1950 and consisting of about 30 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of pyridinium dodecylbenzenesulfonate catalyst; and (3) about 33.0 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the reidue filtered to remove residual sodium bicarbonate and the salt formed in the neutralization. The polysiloxane-poly(oxyethylene-oxypropylene) block copolymer product was a homogeneous liquid, said block copolymer consisting essentially of about 20.5 percent by weight of polysiloxane blocks and about 79.5 percent by weight of polyoxyalkylene blocks. The polyurethane foam stabilizing properties of said block copolymer product are shown below.

EXAMPLE 75

A polysiloxane-poly (oxyethylene-oxypropylene) block copolymer was prepared by charging (1) about 120 g. of a polyether admixture having an average molecular weight of about 1950 and consisting of about 30 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, about 35 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated butanol started polyoxyalkylene copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 105 g. of toluene; (3) about 0.7 g. of pyridinium dodecylbenzenesulfonate catalyst; and (4) about 33 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation, the residue was then filtered to remove residual sodium bicarbonate and the salt formed in the neutralization. The polysiloxane-poly(oxyethylene-oxypropylene) block copolymer product was a homogeneous liquid having a viscosity of about 3400 cs., said block copolymer consisting essentially of about 20.5 percent by weight of polysiloxane blocks and about 79.5 percent by weight of polyoxyalkylene blocks. The polyurethane foam stabilizing properties of said block copolymer product are shown below.

EXAMPLE 76

A polysiloxane-poly (oxyethylene-oxypropylene) block copolymer was prepared by charging (1) about 165 g. of a polyether admixture having an average molecular weight of about 1610 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 25 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.7 g. of pyridinium doceylbenzenesulfonate catalyst; and (3) about 46.7 g. of an equilibrated ethoxy endbilocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 1460 cs., said block copolymer consisting essentially of about 21.9 percent by weight of polysiloxane blocks and about 78.1 percent by weight of polyoxyalkylene blocks. The polyurethane foam stabilizing properties of said block copolymer product are shown below.

EXAMPLE 77

A polysiloxane-poly (oxyethylene-oxypropylene) block copolymer was prepared by charging (1) about 165 g. of a polyether admixture having an average molecular weight of about 1610 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, about 25 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution; and about 40 percent by weight of a monohydroxy terminated butanol started polyoxyalkylene copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random fashion; (2) about 90 g. of toluene; (3) about 0.6 g. of pyridinium dodecylbenzenesulfonate catalyst and (4) about 46.7 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecular (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation, the residue was then filtered to remove residual sodium bicarbonate and the salt formed in the neutralization. The polysiloxane-poly(oxyethylene-oxypropylene) block copolymer product was a homogeneous liquid having a viscosity of about 1150 cs., said block copolymer consisting essentially of about 21.9 percent by weight of polysiloxane blocks and about 78.1 percent by weight of polyoxyalkylene blocks. The polyurethane foam stabilizing properties of said block copolymer product are shown below.

EXAMPLE 78

A polysiloxane-poly (oxyethylene-oxypropylene) block copolymer was prepared by charging (1) about 165 g. of a polyether admixture having an average molecular weight of about 1630 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 30 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 35 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.7 g. of pyridinium doceylbenzenesulfonate catalyst; and (3) about 45.8 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid having a viscosity of about 1470 cs., said block copolymer consisting essentially of about 21.5 percent by weight of polysiloxane blocks and about 78.5 percent by weight of polyoxyalkylene blocks. The polyurethane foam stabilizing properties of said block copolymer product are shown below.

EXAMPLE 79

A polysiloxane-poly (oxyethylene-oxypropylene) block copolymer was prepared by charging (1) about 165 g. of a polyether admixture having an average molecular weight of about 1630 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, about 30 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution; and about 35 percent by weight of a monohydroxy terminated butanol started polyoxyalkylene copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 90 g. of toluene; (3) about 0.6 of pyridinium dodecylbenzenesulfonate catalyst; and (4) about 45.8 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation the residue was then filtered to remove residual sodium bicarbonate and the salt formed in the neutralization. The polysiloxane-poly (oxyethylene-oxypropylene) block copolymer product was a homogeneous liquid having a viscosity of about 1015 cs., said block copolymer consisting essentially of about 21.5 percent by weight of polysiloxane blocks and about 78.5 percent by weight of polyoxyalkylene blocks. The polyurethane foam stabilizing properties of said block copolymer product are shown below.

EXAMPLE 80

A polysiloxane-poly (oxyethylene-oxypropylene) block copolymer was prepared by charging (1) about 200 g. of a polyether admixture having an average molecular weight of about 1730 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; and about 25 percent by weight of a monohydroxy terminated butanol started polyoxyalkylene copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 46 g. of toluene; (3) about 0.5 g. of pyridinium dodecylbenzenesulfonate catalyst and (4) about 60.4 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation, the residue was then filtered to remove residual sodium bicarbonate and the salt formed in the neutralization. The polysiloxane-poly(oxyethylene-oxypropylene) block copolymer product was a homogeneous liquid having a viscosity of about 1630 cs., said block copolymer consisting essentially of about 21.5 percent by weight of polysiloxane blocks and about 78.5 percent by weight of polyoxyalkylene blocks. The polyurethane foam stabilizing properties of said block copolymer product are shown below.

EXAMPLE 81

A polysiloxane-poly (oxyethylene-oxypropylene) block copolymer was prepared by charging (1) about 200 g. of a polyether admixture having an average molecular weight of about 1730 and consisting of about 35 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution and about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; and about 25 percent by weight of a monohydroxy terminated butanol started polyoxyalkylene copolymer having an average molecular weight of about 3800 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 87 g. of toluene; (3) about 0.5 g. of pyridinium dodecylbenzenesulfonate catalyst and (4) about 60.4 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$, and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one-liter, agitated, glass reaction vessel fitted with a distillation column and still head. The reaction mixture was heated to reflux. Ethanol was removed at the still head operated at a partial reflux as a toluene-ethanol azeotrope until the temperature at the still head remained about at least 105° C. Then toluene was essentially the only volatile component in the reaction mixture. The reaction mixture was then neutralized with sodium bicarbonate and the toluene was removed by distillation the residue was then filtered to remove residual sodium bicarbonate and the salt formed in the neutralization. The polysiloxane-poly(oxyethylene-oxypropylene) block copolymer product was a homogeneous liquid having a viscosity of about 1650 cs., said block copolymer consisting essentially of about 21.5 percent by weight of polysiloxane blocks and about 78.5 percent by weight of polyoxyalkylene blocks. The polyurethane foam stabilizing properties of said block copolymer product are shown below.

EXAMPLE 82

A polysiloxane-poly (oxyethylene-oxypropylene) block copolymer was prepared by charging (1) about 162 g. of a polyether admixture having an average molecular weight of about 2100 and consisting of about 78 percent by weight of a monohydroxy terminated polyoxyalkylene butanol started copolymer having an average molecular weight of about 1900 wherein about 50 weight percent of the oxyalkylene groups of the copolymer are oxyethylene, the remainder of the oxyalkylene groups being oxypropylene, said oxyalkylene groups being present in the copolymer in a random distribution, and about 22 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of pyridinium dodecylbenzenesulfonate catalyst; and (3) about 40 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 19.5 percent by weight of polysiloxane blocks and about 80.5 percent by weight of polyoxyalkylene blocks. The polyurethane foam stabilizing properties of said block copolymer product are shown below.

EXAMPLE 83

A polysiloxane-poly (oxyethylene-oxypropylene) block copolymer was prepared by charging (1) about 100 g. of a polyether admixture having an average molecular weight of about 1600 and consisting of about 47 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 53 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of pyridinium doceylbenzenesulfonate catalyst; and (3) about 41.2 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 10.4 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°-145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 27.6 percent by weight of polysiloxane blocks and about 72.4 percent by weight of polyoxyalkylene blocks. The polyurethane foam stabilizing properties of said block copolymer product are shown below.

EXAMPLE 84

A polysiloxane-poly (oxyethylene-oxypropylene) block copolymer was prepared by charging (1) about 150 g. of a polyether admixture having an average molecular weight of about 1630 and consisting of about 11.3 percent by weight of a monohydroxy terminated polyoxyalkylene butanol started copolymer having an average molecular weight of about 350 wherein about 50 weight percent of the oxyalkylene groups of the copolymer are oxyethylene, the remainder of the oxyalkylene groups being oxypropylene, said oxyalkylene groups being present in the copolymer in a random distribution, and about 88.7 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 1.0 g. of pyridinium doceylbenzenesulfonate catalyst; and (3) about 48 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 4 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 22.5 percent by weight of polysiloxane blocks and about 77.5 percent by weight of polyoxyalkylene blocks. The polyurethane foam stabilizing properties of said block copolymer product are shown below.

EXAMPLE 85

A polysiloxane-poly (oxyethylene-oxypropylene) block copolymer was prepared by charging (1) about 100 g. of a polyether admixture having an average molecular weight of about 1390 and consisting of about 60 percent by weight of a monohydroxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution, and about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; (2) about 0.6 g. of pyridinium doceylbenzenesulfonate catalyst; and (3) about 40.3 g. of an equilibrated ethoxy endblocked polydimethylsiloxane fluid consisting essentially of about 1.3 siloxy units of the formula $MeSiO_{1.5}$, about 18.2 siloxy units of the formula $Me_2SiO$ and about 3.3 siloxy units of the formula $(Me)_2(OC_2H_5)SiO_{0.5}$ per average molecule (about 14.5 percent of the total siloxy units being $(Me)_2(OC_2H_5)SiO_{0.5}$) to a one liter, agitated, glass reaction vessel fitted with a still head and a tube extending to near the bottom of the vessel. The reaction mixture was heated to 135°–145° C. with nitrogen being fed through the subnatent tube. The reaction was carried out for about 2 hours with ethanol being removed at the still head. The reaction mixture was then neutralized with sodium bicarbonate and the residue filtered to remove residual sodium bicarbonate and the salt formed in the neutralization. The polysiloxane-poly(oxyethylene-oxypropylene) block copolymer product was a homogeneous liquid, said block copolymer consisting essentially of about 26.9 percent by weight of polysiloxane blocks and about 73.1 percent by weight of polyoxyalkylene blocks. The polyurethane foam stabilizing properties of said block copolymer product are shown below.

EXAMPLE 86

A polysiloxane-poly(oxyethylene-oxypropylene) block copolymer was prepared by charging (1) about 162 g. of a polyether admixture having an average molecular weight of about 2650 and consisting of 25 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 2950 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane); and (3) about 27.3 g. of an equilibrated trimethyl endblocked poly(dimethylsiloxymethylhydrogensiloxy) siloxane copolymer fluid consisting essentially of about 14 siloxy units of the formula $(Me)(H)SiO$ and about 134 siloxy units of the formula $Me_2SiO$ and about 2 siloxy units of the formula $Me_3SiO_{0.5}$ per average molecule (about 9.9 percent of the total siloxy units being $(Me)(H)SiO$) to a one liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1660 cs., said block copolymer consisting essentially of about 21.4 percent by weight of polysiloxane blocks and about 78.6 percent by weight of polyoxyalkylene blocks. The polyurethane foam stabilizing properties of the block copolymer are shown below.

EXAMPLE 87

A polysiloxane-poly(oxyethylene-oxypropylene) block copolymer was prepared by charging (1) about 162 g. of a polyether admixture having an average molecular weight of about 2650 and consisting of 25 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution, and about 75 percent by weight of a monomethoxy terminated polyoxyalkylene allyl alcohol started copolymer having an average molecular weight of about 2950 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxyethane) and (3) about 27.3 g. of an equilibrated trimethyl endblocked poly(dimethylsiloxy-methylhydrogensiloxy) siloxane copolymer fluid consisting essentially of about 7.5 siloxy units of the formula (Me)(H)SiO, about 67 siloxy units of the formula $Me_2SiO$ and about 2 siloxy units of the formula $(Me)_3SiO_{0.5}$ per average molecule (about 10.9 percent of the total siloxy units being (Me)(H)SiO) to a one liter, agitated, glass reaction vessel fitted with still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 2200 cs., said block copolymer consisting essentially of about 21.4 percent by weight of poly-siloxane blocks and about 78.6 percent by weight of polyoxyalkylene blocks. The polyurethane foam stabilizing properties of the block copolymer are shown below.

EXAMPLE 88

A polysiloxane-poly(oxyethylene-oxypropylene) block copolymer was prepared by charging (1) about 120 g. of a polyether admixture having an average molecular weight of about 2750 and consisting of about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; about 60 percent by weight of a monomethoxy terminated polyoxyalkylene allyl alcohol started copolymer having an average molecular weight of about 2920 wherein about 40 weight percent of the oxyalkylene groups of the copolymer are oxyethylene, the remainder of the oxyalkylene groups being oxypropylene, said oxyalkylene groups being present in the copolymer in a random distribution; and about 20 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 51 g. of an equilibrated trimethyl end blocked poly(dimethylsiloxy-methylhydrogensiloxy)siloxane copolymer fluid consisting essentially of about 7.6 siloxy units of the formula (Me)(H)SiO, about 140 siloxy units of the formula $Me_2SiO$ and about 2 siloxy units of the formula $(Me)_3SiO_{0.5}$ per average molecule (about 5.1 percent of the total siloxy units being (Me)(H)SiO) to a one liter, agitated, glass reaction vessel fitted with a still head. The reaction mixture was heated to 80 C–90° C. and held until silanic hydrogen was no longer detectable by reaction with an ethanol solution of potassium hydroxide. The polysiloxane-poly(oxyethyleneoxypropylene) block copolymer product was a homogeneous liquid having a viscosity of about 12000 cs., said block copolymer consisting essentially of about 33.7 percent by weight of polysiloxane blocks and about 66.3 percent by weight of polyoxyalkylene blocks. The polyurethane foam stabilizing properties of the block copolymer are shown below.

EXAMPLE 89

A polysiloxane-poly(oxyethylene-oxypropylene) block copolymer was prepared by charging (1) about 120 g. of a polyether admixture having an average molecular weight of about 2900 and consisting of 50 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution, and about 50 percent by weight of a monomethoxy terminated polyoxyalkylene allyl alcohol started copolymer having an average molecular weight of about 4050 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 34 g. of an equilibrated trimethyl end blocked poly(dimethylsiloxy-methylhydrogensiloxy) siloxane copolymer fluid consisting essentially of about 4.2 siloxy units of the formula (Me)(H)SiO, about 43.9 siloxy units of the formula $Me_2SiO$ and about 2 siloxy units of the formula $(Me)_3SiO_{0.5}$ per average molecule (about 8.4 percent of the totl siloxy units being (Me)(H)SiO) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1140 cs., said block copolymer consisting essentially of about 25.4 percent by weight of polysiloxane blocks and about 74.6 percent by weight of polyoxyalkylene blocks. The polyurethane foam stabilizing properties of the block copolymer are shown below.

EXAMPLE 90

A polysiloxane-poly(oxyethylene-oxypropylene) block copolymer was prepared by charging (1) about 120 g. of a polyether admixture having an average molecular weight of about 2900 and consisting of 50 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution, and about 50 percent by weight of a monomethoxy terminated polyoxyalkylene allyl alcohol started copolymr having an average molecular weight of about 4050 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 34 g. of an equilibrated trimethyl end blocked poly(dimethylsiloxy-methylhydrogensiloxy) siloxane copolymer fluid consisting essentially of about 6.3 siloxy units of the formula $(Me)(H)SiO$, about 67.7 siloxy units of the formula $Me_2SiO$ and about 2 siloxy units of the formula $(Me)_3SiO_{0.5}$ per averge molecule (about 8.3 percent of the total siloxy units being $(Me)(H)SiO$) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1530 cs., said block copolymer consisting essentially of about 25.3 percent by weight of polysiloxane blocks and about 74.7 percent by weight of polyoxyalkylene blocks. The polyurethane foam stabilizing properties of the block copolymer are shown below.

EXAMPLE 91

A polysiloxane-poly(oxyethylene-oxypropylene) block copolymer was prepared by charging (1) about 120 g. of a polyether admixture having an average molecular weight of about 2750 and consisting of about 20 percent by weight of a monomethoxy terminated polyoxyalkylene allyl alcohol started copolymer having an average molecular weight of about 1750 wherein about 40 weight percent of the oxyalkylene groups of the copolymer and oxyethylene, the remainder of the oxyalkylene groups being oxypropylene, said oxyalkylene groups being present in the copolymer in a random distribution; about 60 percent by weight of a monomethoxy terminated polyoxyalkylene allyl alcohol started copolymer having an average molecular weight of about 2950 wherein about 40 weight percent of the oxyalkylene groups of the copolymer are oxyethylene, the remainder of the oxyalkylene groups being oxypropylene, said oxyalkylene groups being present in the copolymer in a random distribution; and about 20 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 36 g. of an equilibrated trimethyl endblocked poly(dimethylsiloxymethylhydrogensiloxy) siloxane copolymer fluid consisting essentially of about 2.5 siloxy units of the formula $(Me)(H)SiO$, about 34.3 siloxy units of the formula $Me_2SiO$ and about 2 siloxy units of the formula $(Me)_3SiO_{0.5}$ per average molecule (about 6.6 percent of the total siloxy units being $(Me)(H)SiO$) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1150 cs., said block copolymer consisting essentially of about 26.2 percent by weight of polysiloxane blocks and about 73.8 percent by weight of polyoxyalkylene blocks. The polyurethane foam stabilizing properties of the block copolymer are shown below.

EXAMPLE 92

A polysiloxane-poly(oxyethylene-oxpropylene) block copolymer was prepared by charging (1) about 120 g. of a polyether admixture having an average molecular weight of about 2750 and consisting of about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxypropylene, said oxyalkylene groups being present in the copolymer in a random distribution; about 60 percent by weight of a monomethoxy terminated polyoxyalkylene allyl alcohol started copolymer having an average molecular weight of about 2950 wherein about 40 weight percent of the oxyalkylene groups of the copolymer are oxyethylene, the remainder of the oxyalkylene groups being oxypropylene, said oxyalkylene groups being present in the copolymer in a random distribution; and about 20 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being persent in the copolymer in a random distribution; (2) about 0.11 cc. of chloroplatinic acid catalyst (10% solution in 1,2-dimethoxy ethane) and (3) about 38 g. of an equilibrated trimethyl endblocked poly(dimethylsiloxy-methylhydrogensiloxy) siloxane copolymer fluid consisting essentially of about 5.1 siloxy units of the formula $(Me)(H)SiO$, about 68.8 siloxy units of the formula $Me_2SiO$ and about 2 siloxy units of the formula $(Me)_3SiO_{0.5}$ per average molecule (about 6.7 percent of the total siloxy units being $(Me)(H)SiO$) to a one liter, agitated, glass reaction vessel fitted with a still head. The reaction mixture was heated to 80° C. –90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 2530 cs., said block copolymer consisting essentially of about 27.5 percent by weight of polysiloxane blocks and about 72.5 percent by weight of polyoxyalkylene blocks. The polyurethane foam stabilizing properties of the block copolymer are shown below.

EXAMPLE 93

A polysiloxane-poly(oxyethylene-oxypropylene) block copolymer was prepared by charging (1) about 120 g. of a polyether admixture having an average molecular weight of about 2750 and consisting of about 20 percent by weight of a monomethoxy terminated polyoxyalkylene allyl alcohol started copolymer having an average molecular weight of about 1750 wherein about 40 weight percent of the oxyalkylene groups of the copolymer are oxyethylene, the remainder of the oxyalkylene groups being oxpropylene, said oxyalkylene groups being present in the copolymer in a random distribution; about 60 percent by weight of a monomethoxy terminated polyoxyalkylene allyl alcohol started copolymer having an average molecular weight of about 2950 wherein about 40 weight percent of the oxyalkylene groups of the copolymer are oxyethylene, the remainder of the oxyalkylene groups being oxypropylene, said oxyalkylene groups being present in the copolymer in a random distribution; and about 20 percent by weight of a monomethoxy terminated allyl alcohol started polyoxyalkylene copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 35 g. of an equilibrated trimethyl end blocked poly(dimethylsiloxy-methylhydrogensiloxy) siloxane copolymer fluid consisting essentially of about 10.1 siloxy units of the formula (Me)(H)SiO, about 137 siloxy units of the formula $Me_2SiO$ and about 2 siloxy units of the formula $(Me)_3SiO_{0.5}$ per average molecule (about 6.8 percent of the total siloxy units being (Me)(H)SiO) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethyleneoxypropylene) block copolymer product was a homogeneous liquid having a viscosity of about 3710 cs., said block copolymer consisting essentially of about 26.9 percent by weight of polysiloxane blocks and about 73.1 percent by weight of polyoxyalkylene blocks. The polyurethane foam stabilizing properties of the block copolymer are shown below.

EXAMPLE 94

A polysiloxane-poly(oxyethylene-oxypropylene copolymer was prepared by charging (1) about 94 g. of a polyether admixture having an average molecular weight of about 2200 and consisting of about 20 percent by weight of a monomethoxy terminated polyoxyalkylene allyl alcohol started copolymer having an average molecular weight of about 100 wherein about 40 weight percent of the oxyalkylene groups of the copolymer are oxyethylene, the remainder of the oxyalkylene groups being oxypropylene, said oxylkylene groups being present in the copolymer in a random distribution; about 20 percent by weight of a monomethoxy terminated polyoxyalkylene allyl alcohol started copolymer having an average molecular weight of about 1700 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated polyoxyalkylene allyl alcohol started copolymer having an average molecular weight of about 4050 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.19 cc. of chloroplatinic acid catalyst (10% solution in 1,2-dimethoxy ethane), and (3) about 50 g. of an equilibrated monochlorodimethyl end blocked poly(dimethylsiloxy-methylhydrogensiloxy) siloxane copolymer fluid consisting essentially of about 5.5 siloxy units of the formula (Me)(H)SiO, about 77.5 siloxy units of the formula $Me_2SiO$ and about 2 siloxy units of the formula $(Cl)(Me)_2SiO_{0.5}$ per average molecule to a one liter, agitated glass reaction vessel fitted with a still head. The reaction mixture was heated to about 85° C and held until silanic hydrogen was no longer detectable by reaction with an ethanol solution of potassium hydroxide. Then to the polysiloxane-polyoxyalkylene block copolymer product so produced was added (1) about 37 g. of a polyether admixture having an average molecular weight of about 1700 and consisting of about 35 percent by weight of a monohydroxy terminated polyooxyalkylene butanol started copolyymer having an average molecular weight of about 1000 wherein about 50 weight percent of the oxyalkylene groups of the copolymer are oxyethylene, the remainder of the oxyalkylene groups being oxypropylene, said oxyalkylene groups being present in the copolymer in a random distribution; about 40 percent by weight of a monohydroxy terminated polyoxyalkylene butanol started copolymer having an average molecular weight of about 3200 wherein about 50 weight percent of the oxyalkylene groups of the copolymer are oxyethylene, the remainder of the oxyalkylene groups being oxypropylene, said oxyalkylene groups being present in the copolymer in a random distribution; and about 25 percent by weight of a monohydroxy terminated polyoxyalkylene butanol started copolymer having an average molecular weight of about 3800 wherein about 50 weight percent of the oxyalkylene groups of the copolymer are oxyethylene, the remainder of the oxyalkylene groups in the copolymer being oxypropylene, and (2) about 21 g. of Amberlyst A-21, a tertiary amine functional macroreticular ion exchange resin. The new reaction mixture was heated to 130° C. and held for 40 minutes. The product residue was the filtered to remove the ion exchange resin which was in hydrochloride form and recover the desired polysiloxane-poly(oxyethylene-oxypropylene) block copolymer product which was an honogeneous liquid having a viscosity of about 4600 cs. The polyurethane foam stabilizing properties of the block copolymer are shown below.

EXAMPLE 95

A polysiloxane-poly(oxyethylene-oxypropylene) block copolymer was prepared by charging (1) about 122 g. of a polyether admixture having an average molecular weight of about 2580 and consisting of about 25 percent by weight of a monomethoxy terminated polyoxyalkylene allyl alcohol started copolymer having an average molecular weight of about 1200 wherein about 40 weight percent of the oxyalkylene groups of the copolymer are oxyethylene, the remainder of the oxyalkylene groups being oxypropylene, said oxyalkylene groups being present in the copolymer in a random distribution; about 10 percent by weight of a monomethoxy terminated polyoxyalkylene allyl alcohol started copolymer having an average molecular weight of about 2750 wherein about 40 weight percent of the oxyalkylene groups of the copolymer are oxyethylene, the remainder of the oxyalkylene groups being oxypropylene, said oxyalkylene groups being present in the copolymer in a random distribution; and about 65 percent by weight of a monomethoxy terminated polyoxyalkylene allyl alcohol started copolymer having an average molecular weight of about 4600 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc. of chloroplatinic acid catalyst (10% solution in 1,2-dimethoxy ethane) and (3) about 25 g. of an equilibrated trimethyl end blocked poly(dimethylsiloxy-methylhydrogensiloxy) siloxane copolymer fluid consisting essentially of about 8.7 siloxy units of the formula $(Me)(H)SiO$, about 64 siloxy units of the formula $Me_2SiO$ and about 2 siloxy units of the formula $(Me)_3SiO_{0.5}$ per average molecule to a one liter, agitated, glass reaction vessel fitted with a still head. The reaction mixture was heated to 80° C.–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1500 cs., said block copolymer consisting essentially of about 17.0 percent by weight of polysiloxane blocks and about 83.0 percent by weight of polyoxyalkylene blocks. The polyurethane foam stabilizing properties of the block copolymer are shown below.

EXAMPLE 96

A polysiloxane-poly(oxyethylene-oxypropylene) block copolymer was prepared by charging (1) about 125 g. of a polyether admixture having an average molecular weight of about 2750 and consisting of about 20 percent by weight of a monomethoxy terminated polyoxyalkylene allyl alcohol started copolymer having an average molecular weight of about 1200 wherein about 40 weight percent of the oxyalkylene groups of the copolymer are oxyethylene, the remainder of the oxyalkylene groups being oxypropylene, said oxyalkylene groups being present in the copolymer in a random distribution; about 20 percent by weight of a monomethoxy terminated polyoxyalkylene allyl alcohol started copolymer having an average molecular weight of about 2750 wherein about 40 weight percent of the oxyalkylene groups of the copolymer are oxyethylene, the remainder of the oxyalkylene groups being oxypropylene, said oxyalkylene groups being present in the copolymer in a random distribution; and about 60 percent by weight of a monomethoxy terminated allyl alcohol started polyoxyalkylene copolymer having an average molecular weight of about 4600 wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc of chloroplatinic acid catalyst (10% solution in 1,2-dimethoxy ethane) and (3) about 34.5 g. of an equilibrated trimethyl end blocked poly(dimethylsiloxy methylhydrogensiloxy)siloxane copolymer fluid consisting essentially of about 6.3 siloxy units of the formula $(Me)(H)SiO$, about 66 siloxy units of the formula $Me_2SiO$ and about 2 siloxy units of the formula $(Me)_3SiO_{0.5}$ per average molecule (about 8.4 percent of the total siloxy units being $(Me)(H)SiO$) to a one liter, agitated, glass reaction vessel fitted with a still head. The reaction mixture was heated to 80°–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 2290 cs., said block copolymer consisting essentially of about 21.6 percent by weight of polysiloxane blocks and about 98.4 percent by weight of polyoxyalkylene blocks. The polyurethane foam stabilizing properties of the block copolymer are shown below.

EXAMPLE 97

A polysiloxane-poly(oxyethylene-oxypropylene) block copolymer was prepared by charging (1) about 250 g. of a polyether admixture having an average molecular weight of about 2160 and consisting of 40 percent by weight of a monomethoxy terminated polyoxyalkylene allyl alcohol started copolymer having an average molecular weight of about 1200 wherein about 40 weight percent of the oxyalkylene groups of the copolymer are oxyethylene, the remainder of the oxyalkylene groups being oxypropylene, said oxyalkylene groups being present in the copolymer in a random distribution and about 60 percent by weight of a monomethoxy terminated polyoxyalkylene allyl alcohol started copolymer having an average molecular weight of about 4600 and wherein about 40 weight percent of the oxyalkylene groups of the copolymer are oxyethylene the remainder of the oxyalkylene groups being oxypropylene, said oxyalkylene groups being present in the copolymer in a random distribution; (2) about 0.25 cc. of chloroplatinic acid catalyst (10% solution in 1,2-dimethoxy ethane) and (3) about 69 g. of an equilibrated trimethyl end blocked poly(dimethylsiloxy-methylhydrogensiloxy) siloxane copolymer fluid consisting essentially of about 14.9 siloxy units of the formula $(Me)(H)SiO$, about 132 siloxy units of the formula $Me_2SiO$ and about 2 siloxy units of the formula $(Me)_3SiO_{0.5}$ per average molecule (about 10.0 percent of the total siloxy units being $(Me)(H)SiO$) to a one liter, agitated, glass reaction vessel fitted with a still head. The reaction mixture was heated to 80°–90° C. and held until silanic hydrogen was no longer detectable by reaction with an ethanol solution of potassium hydroxide. The polysiloxane-poly(oxyethyleneoxypropylene) block copolymer product was a homogeneous liquid having a viscosity of about 1400 cs., said block copolymer consisting essentially of about 21.6 percent by weight of polysiloxane blocks and about 78.4 percent by weight of polyoxyalkylene blocks. The polyurethane foam stabilizing properties of the block copolymer are shown below.

EXAMPLE 98

A polysiloxane-poly(oxyethylene-oxypropylene) block copolymer was prepared by charging (1) about 122 g. of a polyether admixture having an average molecular weight of about 2160 and consisting of 40 percent by weight of a monomethoxy terminated polyoxyalkylene allyl alcohol started copolymer having an average molecular weight of about 1200 wherein about 40 weight percent of the oxyalkylene groups of the copolymer are oxyethylene, the remainder of the oxyalkylene groups being oxypropylene, said oxyalkylene groups being present in the copolymer in a random distribution, and about 60 percent by weight of a monomethoxy terminated polyosyalkylene allyl alcohol started copolymer having an average molecular weight of about 4600 and wherein about 40 weight percent of the oxyalkylene groups of the copolymer are oxyethylene, the remainder of the oxyalkylene groups being oxypropylene, said oxyalkylene groups being present in the copolymer in a random distribution; (2) about 0.11 cc of chloroplatinic acid catalyst (10% solution in 1,2-dimethoxyethane) and (3) about 41.8 g. of an equilibrated trimethyl end blocked poly(dimethylsiloxy-methylhydrogensiloxy)siloxane copolymer fluid consisting essentially of about 6.3 siloxy units of the formula (Me)(H)SiO, about 66 siloxy units of the formula $Me_2SiO$ and about 2 siloxy units of the formula $(Me)_3SiO_{0.5}$ per average molecule (about 8.4 percent of the total siloxy units being (Me)(H)SiO) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxyethylene-oxypropylene) block copolymer product was a homogeneous liquid having a viscosity of about 1400 cs., said block copolymer consisting essentially of about 25.5 percent by weight of polysiloxane blocks and about 74.6 percent by weight of polyoxyalkylene blocks. The polyurethane foam stabilizing properties of the block copolymer are shown below.

EXAMPLE 99

A polysiloxane-poly(oxyethylene-oxypropylene) block copolymer was prepared by charging (1) about 366 g. of a polyether admixture having an average molecular weight of about 1830 and consisting of 40 percent by weight of a monoallyloxy terminated polyoxyalkylene butanol started copolymer having an average molecular weight of about 1000 wherein about 50 weight percent of the oxyalkylene groups of the copolymer are oxyethylene, the remainder of the oxyalkylene groups being oxypropylene, said oxy alkylene groups being present in the copolymer in a random distribution; about 40 percent by weight of a monoallyloxy terminated polyoxyalkylene butanol started copolymer having an average molecular weight of about 3200 and wherein about 50 weight percent of the oxyalkylene groups of the copolymer are oxyethylene the remainder of the oxyalkylene groups being oxypropylene, said oxyalkylene groups being present in the copolymer in a random distribution; and about 20 percent by weight of a monoallyloxy terminated polyoxyalkylene butanol started copolymer having an average molecular weight of about 3800 and wherein 50 weight percent of the oxyalkylene groups of the copolymer are oxyethylene, the remainder of the oxyalkylene groups being oxypropylene, said oxyalkylene groups being present in the copolymer in a random distribution; (2) about 0.21 cc. of chloroplatinic acid catalyst (10% solution in 1,2-dimethoxy ethane) and (3) about 105 g. of an equilibrated trimethyl end blocked poly(dimethylsiloxy-methylhydrogensiloxy)siloxane copolymer fluid consisting essentially of about 6.9 siloxy units of the formula (Me)(H)SiO, about 50 siloxy units of the formula $Me_2SiO$ and about 2 siloxy units of the formula $(Me)_3SiO_{0.5}$ per average molecule (about 11.7 percent of the total siloxy units being (Me)(H)Sio) to a one liter, agitated, glass reaction vessel fitted with a still head. The reaction mixture was heated to 80° C–90° C. and held until silanic hydrogen was no longer detectable by reaction with an ethanol solution of potassium hydroxide. The polysiloxane-poly(oxxyethylene-oxypropylene) block copolymer product was a homogeneous liquid having a viscosity of about 3740 cs., said block copolymer consisting essentially of about 22.2 percent by weight of polysiloxane blocks and about 77.8 percent by weight of polyoxyalkylene blocks. The polyurethane foam stabilizing properties of the block copolymer are shown below.

EXAMPLE 100

The polysiloxane-poly(oxyethylene-oxypropylene) block copolymers of the above Examples were evaluated as foam stabilizers for flexible polyether polyurethane foam according to the above defined test procedures and the results are reported in Table I below. Said results demonstrate the superiority of the novel polysiloxane-poly(oxyethylene-oxypropylene) block copolymers of this invention as compared to polysiloxane-poly(oxyethylene-oxypropylene) block copolymers not of the instant invention.

TABLE I

| Product of Example | Foam Test | Height of Rise, Inches | Cells Per Inch | Air Flow Rate |
|---|---|---|---|---|
| 1* | I | 12.6 | 34 | 6.0 |
| 2* | I | 12.4 | 34 | 6.0 |
| 3* | I | 11.0 | 30 | 4.0 |
| 4* | I | | Failed | |
| 5* | I | | Failed | |
| 6* | V | 12.0 | 34 | 6.2 |
| 7* | V | | Failed | |
| 8* | I | 12.0 | 34 | 7.3 |
| 9* | I | 11.2 | 34 | 5.7 |
| 10* | I | 11.7 | 34 | 7.3 |
| 11* | I | 12.0 | 34 | 7.6 |
| 12* | I | 11.4 | 34 | 7.5 |
| 13* | I | 11.6 | 34 | 8.5 |
| 14* | I | 11.8 | 34 | 7.8 |
| 15* | I | 11.6 | 34 | 8.2 |
| 16* | I | 11.4 | 34 | 6.6 |
| 17* | I | 11.4 | 34 | 6.9 |
| 18* | I | 11.7 | 34 | 7.3 |
| 19* | I | 11.9 | 34 | 7.5 |
| 20* | I | 11.3 | 34 | 8.0 |
| 21* | I | 11.2 | 34 | 7.7 |
| 22* | I | 11.4 | 34 | 7.7 |
| 23* | I | 11.4 | 34 | 8.2 |
| 24* | I | 11.9 | 34 | 7.4 |
| 25* | I | 12.1 | 34 | 7.2 |
| 26* | I | 12.0 | 34 | 6.5 |
| 27* | I | 11.2 | 34 | 7.2 |
| 28* | I | 11.9 | 34 | 7.7 |
| 29* | I | 12.0 | 34 | 7.5 |
| 30* | I | 11.5 | 32 | 7.4 |
| 31* | I | 11.0 | 34 | 6.7 |
| 32 | III | 11.2 | 32 | 1.5 |
| 33 | III | 11.9 | 30 | 4.3 |
| 34 | III | 11.8 | 32 | 5.0 |
| 35 | VI | 12.0 | 34 | 5.5 |
| 35 | V | 12.5 | 34 | 3.9 |

TABLE I-continued

| Product of Example | Foam Test | Height of Rise, Inches | Cells Per Inch | Air Flow Rate |
|---|---|---|---|---|
| 36 | VI | 11.8 | 32 | 2.5 |
| 37 | V | 12.2 | 32 | 0.8 |
| 38 | V | 11.9 | 34 | 4.2 |
| 39 | V | 12.1 | 34 | 5.1 |
| 40 | V | 12.1 | 34 | 1.8 |
| 41 | V | 12.2 | 34 | 0.6 |
| 42 | VI | 11.8 | 32 | 4.3 |
| 43 | VI | 12.8 | 34 | 6.5 |
| 44 | VI | 12.0 | 34 | 6.0 |
| 45 | VI | 11.8 | 32 | 2.7 |
| 46 | V | 11.8 | 32 | 5.8 |
| 47 | I | 12.7 | 34 | 3.1 |
| 48 | II | 12.1 | 32 | 6.7 |
| 49 | II | 12.1 | 32 | 6.6 |
| 50 | II | 12.1 | 32 | 4.8 |
| 51 | II | 12.3 | 32 | 4.3 |
| 52 | II | 12.1 | 32 | 6.8 |
| 53 | II | 12.0 | 32 | 5.7 |
| 54 | II | 11.9 | 32 | 7.2 |
| 55 | II | 12.4 | 32 | 4.2 |
| 56 | IV | 12.3 | 32 | 7.3 |
| 57 | II | 12.1 | 32 | 4.9 |
| 58 | II | 11.8 | 34 | 7.3 |
| 59 | IV | 11.9 | 28 | 4.9 |
| 60 | II | 12.1 | 34 | 6.7 |
| 61 | II | 12.4 | 32 | 6.5 |
| 62 | II | 12.0 | 32 | 5.9 |
| 63 | IV | 11.9 | 34 | 7.4 |
| 64 | IV | 11.8 | 32 | 7.3 |
| 65 | IV | 11.5 | 26 | 5.4 |
| 66 | IV | 11.5 | 30 | 6.1 |
| 67 | IV | 11.4 | 30 | 5.2 |
| 68 | VI | 11.8 | 32 | 2.5 |
| 69 | V | 12.5 | 34 | 5.9 |
| 70 | II | 12.1 | 32 | 6.7 |
| 71 | II | 12.3 | 32 | 6.8 |
| 72 | II | 11.9 | 32 | 7.2 |
| 73 | IV | 11.7 | 32 | 7.2 |
| 74 | II | 12.4 | 32 | 4.7 |
| 75 | II | 12.0 | 30 | 4.7 |
| 76 | IV | 11.5 | 30 | 6.1 |
| 77 | IV | 11.9 | 32 | 6.0 |
| 78 | IV | 11.4 | 30 | 5.7 |
| 79 | IV | 11.7 | 30 | 5.2 |
| 80 | IV | 12.1 | 30 | 7.8 |
| 81 | IV | 12.0 | 32 | 7.6 |
| 82* | I | | Failed | |
| 83* | I | | Failed | |
| 84* | I | | Failed | |
| 85* | I | 9.6 | 32 | 6.6 |
| 86* | I | | Failed | |
| 87* | I | | Failed | |
| 88* | III | 11.1 | 34 | 2.0 |
| 89 | I | 11.8 | 28 | 2.2 |
| 90 | III | 11.9 | 24 | 3.6 |
| 91* | I | | Failed | |
| 92* | I | | Failed | |
| 93* | I | | Failed | |
| 94 | III | 12.2 | 32 | 5.8 |
| 95 | VI | 11.4 | 32 | 3.9 |
| 96 | VI | 11.8 | 32 | 6.1 |
| 97 | VI | 11.8 | 30 | 7.3 |
| 98 | VI | 11.3 | 32 | 6.0 |
| 99 | V | 12.5 | 32 | 5.9 |

EXAMPLE 101

About 8.0 g. of pyridinium dodecylbenzenesulfonate catalyst was added to 792 g. of a polysiloxane-poly(oxyethylene-oxypropylene) block copolymer prepared according to conditions and procedure of Example 1 which had been heated to 120° C. The catalyzed block copolymer was held at 120° C., aliquots were withdrawn at 1 hour intervals and filtered through sodium bicarbonate. After 5 hours sufficient toluene was added to give a solution containing 60 percent by weight of the polysiloxane-poly(oxyethylene-oxypropylene) block copolymer. After an additional hour at 120° C. sodium bicarbonate was added, the toluene was removed by distillation and the residual sodium bicarbonate and salts formed in neutralization were removed from the block copolymer by filtration. The polyurethane foam stabilizing properties of the block copolymers so prepared, according to above defined Test III procedure are shown in Table 2 below.

TABLE 2

| Time After Addition of Catalyst | Foam Test | Height of Rise, Inches | Cells Per Inch | Air Flow Rate |
|---|---|---|---|---|
| Before treatment | III | 12.3 | 34 | 7.0 |
| 1 Hour | III | 11.9 | 34 | 6.3 |
| 2 Hours | III | 11.2 | 32 | 5.9 |
| 3 Hours | III | 11.0 | 32 | 5.9 |
| 4 Hours | III | | Failed | |
| 5 Hours | III | | Failed | |
| 1 Hour After Addition of Toluene | III | 11.4 | 32 | 6.7 |

EXAMPLE 102

Polysiloxane-poly (oxyethylene-oxypropylene block copolymers produced according to the conditions and procedures of Examples 6, 63, 97 and 99 along with a commercial hyrolyzable polysiloxane-polyoxyalkylene block copolymer (Goldschmidt BF-2270, a product of Th. Goldschmidt A.G.) were evaluated as foam stabilizers for flexible polyether polyurethane foam in a foam formulation in which a range of tin catalyst concentrations was used. The following foam formulation was employed.

| FORMULATION | |
|---|---|
| Material | Parts by Weight |
| Polyol II | 100 |
| Distilled Water | 4.0 |
| Bis(2-dimethylaminoethyl)ether | 0.1 |
| C Cl$_3$F | 5.0 |
| TDI | 48.1 |
| Polysiloxane-polyoxyalkylene block copolymer | 1.0 |
| Stannous Octoate | Varied as shown in TABLE 3 |

The foams were produced by adding the polysiloxane-polyoxyalkylene block copolymer to Polyol II in a 1000 ml. container, mixing with a spatula, adding a mixture of water and the amine ether to the container, adding CCl$_3$F to the container, mixing with a drill press for 15 seconds, adding the stannous octoate, mixing for 8 seconds with a drill press adding the TDI, mixing with a drill press for 7 seconds, pouring into a mold and curing for 15 minutes at 135° C. Prior to the cure the temperature of the materials was maintained at no higher than 25° C. The test results are given in TABLE 3 below.

TABLE 3

| Product of Example | Stannous Octoate (Parts by Wt.) | Height of Rise, Inches | Cells per Inch | Air Flow Rate |
|---|---|---|---|---|
| 63 | 0.15 | 7.5 | 30 – 35 | 8.2 |
| 63 | 0.20 | 7.9 | 30 – 35 | 6.8 |
| 63 | 0.25 | 7.6 | 35 – 40 | 6.1 |
| 63 | 0.30 | 8.2 | 35 – 40 | 4.8 |
| 63 | 0.325 | 8.3 | 35 – 40 | 3.8 |
| BF-2270* | 0.15 | 7.4 | 30 – 35 | 6.5 |
| BF-2270* | 0.20 | 8.2 | 30 – 35 | 6.1 |
| BF-2270* | 0.25 | 7.9 | 30 – 35 | 3.2 |
| BF-2270* | 0.30 | 8.1 | 35 – 40 | 3.0 |
| BF-2270* | 0.325 | 8.2 | 30 – 35 | 1.7 |
| 99 | 0.17 | 9.1 | 35 – 40 | 6.1 |
| 99 | 0.20 | 9.3 | 35 – 40 | 5.4 |
| 99 | 0.25 | 9.3 | 35 – 40 | 3.6 |
| 99 | 0.30 | 9.5 | 35 – 40 | 0.8 |
| 6* | 0.17 | 9.2 | 35 – 40 | 2.4 |
| 6* | 0.25 | 9.4 | 35 – 40 | 1.5 |
| 6* | 0.30 | Shrinkage and Voids | | |
| 97 | 0.15 | 8.6 | 35 – 40 | 6.5 |

TABLE 3-continued

| Product of Example | Stannous Octoate (Parts by Wt.) | Height of Rise, Inches | Cells per Inch | Air Flow Rate |
|---|---|---|---|---|
| 97 | 0.20 | 9.2 | 35 – 40 | 4.9 |
| 97 | 0.25 | 9.6 | 35 – 40 | 3.3 |
| 97 | 0.30 | 9.5 | 35 – 40 | 1.8 |
| 97 | 0.35 | 9.9 | 35 – 40 | ~0.1 |

The above data demonstrates that better open foams can be achieved over a broader range of tin catalyst concentrations by employing as the foam stabilizer, the polysiloxane-polyoxyalkylene block copolymers of this invention rather than the block copolymers are not of this invention.

Various modifications and variations of this invention will be obvious to a worker skilled in the art and it is to be understood that such modifications and variations are to be included within the purview of this application and the spirit and scope of the appended claims.

What is claimed is:

1. A process for preparing flexible polyether polyurethane foam, said process comprising reacting and foaming a mixture comprising (a) a polyether containing at least two hydroxyl groups per molecule, (b) an organic polyisocyanate, (c) a catalyst for the reaction of (a) and (b) to produce the polyurethane, (d) a blowing agent and (e) as the foam stabilizer a polysiloxane-poly(oxyethylene-oxypropylene) block copolymer consisting essentially of from about 15 to about 35 percent by weight of polysiloxane blocks and from about 85 to about 65 percent by weight of polyoxyalkylene blocks, and further consisting essentially of siloxy units of the formula $R_2SiO$, siloxy units selected from the group consisting of those of the formulas $(R)(Q)SiO$ and $RSiO_{3/2}$ and terminal siloxy units selected from the class consisting of those of the formulas $R_3SiO_{1/2}$ and $(R_2)(Q)SiO_{1/2}$, wherein the average number of total siloxy units per molecule of the polysiloxane-polyoxyalkylene block copolymer ranges from about 20 to about 200, wherein from about 6 to about 15 percent of said total siloxy units are selected from the group consisting of $(R)(Q)SiO$ and $(R_2)(Q)SiO_{1/2}$ and wherein there are no more than about four $RSiO_{3/2}$ siloxy units per average polysiloxane molecule, wherein each R individually represents a monovalent hydrocarbon radical or a substituted monovalent hydrocarbon radical, said radicals being free from aliphatic multiple carbon to carbon bonds, and wherein each Q individually represents a polyoxyalkylene polyether block having the formula —MX wherein each M is a bridging group individually selected from the class consisting of —O— and —$C_nH_{2n}$O— wherein $n$ has a value of 2 or 3, and X is a polyoxyalkylene radical consisting essentially of an admixture of Units A and B of the formula $(C_2H_4O)_x(C_3H_6O)_yZ$ wherein Z is a terminal group selected from the class consisting of alkyl, aryl and aralkyl radicals, with the proviso that when M is —$C_nH_{2n}$O— as defined above, Z can also be a terminal acyl radical, the values of $x$ and $y$ being determined by the following conditions prevailing for Units A and B;

Unit A representing from about 20 to about 80 percent by weight of low molecular weight polyoxyalkylene polyether based on the total weight of Units A and B in said admixture; said polyether being selected from the class consisting of (i) a polyoxyalkylene copolymer having an average molecular weight in the range of from about 800 to about 2300 wherein about 20 to about 60 weight percent of the oxyalkylene groups of said copolymer are oxyethylene, the remainder of the oxyalkylene groups being oxypropylene, and (ii) a blend of at least two polyoxyalkylene copolymers having different average molecular weights in the range of from about 500 to about 2900 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 800 to about 2300; and Unit B representing from about 80 to about 20 percent by weight of high molecular weight polyoxyalkylene polyether based on the total weight of Units A and B in said admixture said polyether being selected from the class consisting of (i) a polyoxyalkylene copolymer having an average molecular weight in the range of from about 3400 to about 5500 wherein about 20 to about 60 weight percent of the oxyalkylene groups of said copolymer are oxyethylene, the remainder of the oxyalkylene groups being oxypropylene, and (ii) a blend of at least two polyoxyalkylene copolymers having different average molecular weights in the range of from about 3000 to about 5500 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 3400 to about 5500; and with the added proviso that said admixture of Units A and B has an average molecular weight in the range of from about 1600 to about 2900.

2. A process as defined in claim 1, wherein said block copolymer consists essentially of from about 18 to about 27 percent by weight of polysiloxane blocks and from about 73 to about 82 percent by weight of polyoxyalkylene blocks, wherein R is a methyl radical and wherein the oxyalkylene groups in said copolymers of Units A and B are present in a random distribution.

3. A process as defined in claim 2 wherein M is —O— and Z is an alkyl radical.

4. A process as defined in claim 2, wherein M is —$C_3H_6$O— and Z is an alkyl radical.

5. A process as defined in claim 2, wherein said block copolymer simultaneously contains both polyoxyalkylene blocks of the formulas —OX and —$C_3H_6$OX and wherein Z is an alkyl radical.

6. A process as defined in claim 2, wherein Unit A represents a low molecular weight polyoxyalkylene copolymer having an average molecular weight in the range of from about 800 to about 2300; and wherein Unit B represents a high molecular weight polyoxyalkylene copolymer having an average molecular weight in the range of from about 3400 to about 5500.

7. A process as defined in claim 6, wherein said admixture consists essentially of about 25 to about 50 percent by weight of Unit A and about 75 to about 50 percent by weight of Unit B, wherein said low molecular weight polyoxyalkylene copolymer has an average molecular weight in the range of from about 900 to about 1300 wherein about 30 to about 55 weight percent of the oxyalkylene groups of said copolymer are oxyethylene, the remainder of the oxyalkylene groups being oxypropylene; wherein said high molecular weight polyoxyalkylene copolymer has an average molecular weight in the range of from about 3800 to about 5000, wherein about 30 to about 55 weight percent of the oxyalkylene groups of said copolymer are oxyethylene, the remainder of the oxyalkylene groups being oxypropylene; wherein said admixture of Units A and B has an average molecular weight in the range of about 2000 to about 2400, wherein M is an —$C_3H_6O$— bridging group and wherein Z is an alkyl radical.

8. A process as defined in claim 2, wherein Unit A represents a blend of at least two low molecular weight polyoxyalkylene copolymers having different average molecular weights in the range of about 500 to about 2900, with the proviso that said blend has an average molecular weight in the range of from about 800 to about 2300; and wherein Unit B represents a high molecular weight polyoxyalkylene copolymer having an average molecular weight in the range of from about 3400 to about 5500.

9. A process as defined in claim 8, wherein said admixture consists essentially of about 30 to about 60 percent by weight of Unit A, and about 70 to about 40 percent by weight of Unit B, wherein at least one of said low molecular weight polyoxyalkylene copolymers has an average molecular weight in the range of from about 900 to about 1300 and at least one of said low molecular weight polyoxyalkylene copolymers has an average molecular weight in the range of from about 1700 to about 2900 and wherein about 30 to about 55 weight percent of the oxyalkylene groups of the copolymers in said blend of Unit A are oxyethylene, the remainder of the oxyalkylene groups being oxypropylene, with the proviso that said blend of Unit A has an average molecular weight in the range of from about 1100 to about 1900; wherein said high molecular weight polyoxyalkylene copolymer has an average molecular weight in the range of from about 3800 to about 5000 wherein about 30 to about 55 weight percent of the oxyalkylene groups of said copolymer are oxyethylene, the remainder of the oxyalkylene groups being oxypropylene, wherein M is a bridging group selected from the class consisting of —O— and —$C_3H_6O$—; and wherein Z is an alkyl radical.

10. A process as defined in claim 2, wherein Unit A represents a low molecular weight polyoxyalkylene copolymer having an average molecular weight in the range of from about 800 to about 2300; and wherein Unit B represents a blend of at least two high molecular weight polyoxyalkylene copolymers having different average molecular weights in the range of about 3000 to about 5500, with the proviso that said blend has an average molecular weight in the range of from about 3400 to about 5500.

11. A process as defined in claim 10, wherein said admixture consists essentially of about 30 to about 60 percent by weight of Unit A and about 70 to about 40 percent by weight of Unit B, wherein said low molecular weight polyoxyalkylene copolymer has an average molecular weight in the range of about 900 to about 1300 and wherein about 30 to about 55 weight percent of the oxyalkylene groups of said copolymer are oxyethylene, the remainder of the oxyalkylene groups being oxypropylene; wherein at least one of said high molecular weight polyoxyalkylene copolymers has an average molecular weight in the range of from about 3000 to about 3400 and at least one of said high molecular weight polyoxyalkylene copolymers has an average molecular weight in the range of from about 3800 to about 5000 wherein about 30 to about 55 weight percent of the oxyalkylene groups of the copolymers in said blend of Unit B are oxyethylene, the remainder of the oxyalkylene groups being oxypropylene, with the proviso that said blend of Unit B has an average molecular weight in the range of from about 3400 to about 5000; and with the added proviso that said admixture of Units A and B has an average molecular weight in the range of from about 1600 to about 2600; wherein M is a bridging group selected from the class consisting of —O— and —$C_3H_6O$— and wherein Z is an alkyl radical.

12. A process as defined in claim 2, wherein Unit A represents a blend of at least two low molecular weight polyoxyalkylene copolymers having different average molecular weights in the range of about 500 to about 2900, with the proviso that said blend has an average molecular weight in the range of from about 800 to about 2300; and wherein Unit B represents a blend of at least two high molecular weight polyoxyalkylene copolymers having different average molecular weights in the range of about 3000 to about 5500, with the proviso that said blend has an average molecular weight in the range of from about 3400 to about 5500.

13. A process as defined in claim 1, wherein said block copolymer consists essentially of $R_2SiO$, (R)(Q)SiO and $R_3SiO1/2$ siloxy units.

14. A process as defined in claim 1, wherein said block copolymer consists essentially of $R_2SiO$, (R)(Q)SiO and $(R_2)$(Q)SiO1/2 siloxy units.

15. A process as defined in claim 1, wherein said block copolymer consists essentially of $R_2SiO$, (R)(Q)SiO, $RSiO3/2$ and $R_3SiO1/2$ siloxy units.

16. A process as defined in claim 1, wherein said block copolymer consists essentially of $R_2SiO$;, (R)(Q)SiO, $RSiO3/2$ and $(R_2)$(Q)SiO1/2 siloxy units.

17. A process as defined in claim 1, wherein said block copolymer consists essentially of $R_2SiO$, $RSiO3/2$ and $(R_2)$(Q)SiO1/2 siloxy units.

18. A process as defined in claim 1, said block copolymer consisting essentially of from about 19 to about 26 percent by weight of polysiloxane blocks and from about 81 to about 74 percent by weight of polyoxyalkylene blocks, and further consisting essentially of from about 65 to about 140 slurry units of the formula $(CH_3)_2SiO$, from about 6 to about 17 siloxy units of the formula $CH_3(Q)SiO$ and about two siloxy units of the formula $(CH_3)_3SiO1/2$, wherein about 7 to about 14 percent of the total siloxy units are $CH_3(Q)SiO$ units, wherein M is a —$C_3H_6O$— bridging group, wherein said admixture consists essentially of about 25 to about 50 percent by weight of Unit A and about 75 to about 50 percent by weight of Unit B, wherein Unit A represents a low molecular weight polyoxyalkylene copolymer having an average molecular weight in the range of from about 900 to about 1300 wherein from about 20 to about 60 weight percent of the oxyalkylene groups of said copolymer are oxyethylene, the remainder of the oxyalkylene groups being oxypropylene, said oxyalkylene groups being present in the copolymer in a random distribution, wherein Unit B represents a high molecular weight polyoxyalkylene copolymer having an average molecular weight in the range of from about 3800 to about 5000, wherein from about 20 to about 60 weight percent of the oxyalkylene groups of said copolymer are oxyethylene, the remainder of the oxyalkylene groups being oxypropylene, said oxyalkylene groups being present in the copolymer in a random distribution, and wherein said admixture of Units A and B has an average molecular weight in the range of from about 1800 to about 2600.

19. A process as defined in claim 18, wherein said block copolymer consists essentially of from about 20 to about 24 percent by weight of polysiloxane blocks and from about 80 to about 76 percent by weight of polyoxyalkylene blocks and further consists essentially of from about 100 to about 135 siloxy units of the formula $(CH_3)_2SiO$, from about 10 to 15 siloxy units of the formula $CH_3(Q)SiO$, and about two siloxy units of the formula $(CH_3)_3SiO1/2$, wherein about 8 to about 12 percent of the total siloxy units are $CH_3(Q)SiO$, wherein Z represents a methyl or n-butyl radical, wherein said admixture consists essentially of about 35 to about 45 percent by weight of the low molecular weight polyoxyalkylene polyether copolymer and about 65 to about 55 percent by weight of the high molecular weight polyoxyalkylene polyether copolymer wherein said high molecular weight copolymer has an average molecular weight of from about 4000 to about 5000, wherein from about 30 to about 55 weight percent of the oxyalkylene groups of the copolymers of Units A and B are oxyethylene, the remainder of the oxyalkylene groups being oxypropylene, and wherein said admixture of Units A and B has an average molecular weight of from about 2000 to about 2400.

20. A process as defined in claim 1, said block copolymer consisting essentially of from about 19 to about 26 percent by weight of polysiloxane blocks and from about 81 to about 74 percent by weight of polyoxyalkylene blocks and further consisting essentially of from about 25 to about 65 siloxy units of the formula $(CH_3)_2SiO$, from about 3.5 to about 7.5 siloxy units of the formula $CH_3(Q)SiO$ and about two siloxy units of the formula $(CH_3)_3SiO1/2$, wherein about 10 to about 12 percent of the total siloxy units are $CH_3(Q)SiO$ units, wherein M is a $—C_3H_6O—$ bridging group, wherein said admixture consists essentially of about 35 to 45 percent by weight of Unit A and about 65 to 55 percent by weight of Unit B, wherein Unit A represents a low molecular weight polyoxyalkylene polyether copolymer having an average molecular weight in the range of from about 800 to about 1300 wherein from about 20 to about 60 weight percent of the oxyalkylene groups of said polyether copolymer are oxyethylene, the remainder of the oxyalkylene groups being oxypropylene, said oxyalkylene groups being present in the copolymer in a random distribution, wherein Unit B represents a blend of two high molecular weight polyoxyalkylene polyether copolymers, said blend consisting of from about 50 to about 75 percent by weight of a polyoxyalkylene polyether copolymer having an average molecular weight in the range of from about 3000 to about 3400, wherein from about 20 to about 60 weight percent of the oxyalkylene groups of said polyethylene copolymer are oxyethylene, the remainder of the oxyalkylene groups being oxypropylene, said oxyalkylene groups in the copolymer being present in a random distribution, and from about 50 to about 25 percent by weight of a polyoxyalkylene polyether copolymer having an average molecular weight in the range of from about 3800 to about 5000, wherein from about 20 to about 60 weight percent of the oxyalkylene groups of said polyether copolymer are oxyethylene, the remainder of the oxyalkylene groups being oxypropylene, said oxyalkylene groups being present in the copolymer in a random distribution, wherein said blend of Unit B has an average molecular weight in the range of from about 3400 to about 4000 and wherein said admixture of Units A and B has an average molecular weight in the range of about 1600 to about 2100.

21. A process as defined in claim 20, wherein said block copolymer consists essentially of from about 20 to about 24 percent by weight of polysiloxane blocks and from about 80 to about 76 percent by weight of polyoxyalkylene blocks and further consists of from about 40 to about 60 siloxy units of the formula $(CH_3)_2SiO$, from about 4 to about 7 siloxy units of the formula $(CH_3)(Q)SiO$ and about two siloxy units of the formula $(CH_3)_2SiO1/2$ wherein Z represents a methyl or n-butyl radical, wherein Unit B represents a blend consisting of from 60 to about 70 percent by weight of a polyoxyalkylene polyether copolymer having an average molecular weight in the range of from about 3000 to about 3400 and from about 40 to about 30 percent by weight of a polyoxyalkylene polyether copolymer having an average molecular weight of from about 3800 to about 5000, wherein about 30 to about 55 weight percent of the oxyalkylene groups of the copolymers of Units A and B are oxyethylene, the remainder of the oxyalkylene groups being oxypropylene, wherein said blend of Unit B has an average molecular weight in the range of about 3400 to about 3800 and wherein said admixture of Units A and B has an average moleculare weight in the range of from about 1700 to about 1900.

22. A process as defined in claim 1, said block copolymer consisting essentially of from about 17 to about 26 percent by weight of polysiloxane blocks and from about 83 to about 74 percent by weight of polyoxyalkylene blocks, and further consisting essentially of from about 17 to about 24 siloxy units of the formula $(CH_3)_2SiO$, from about 1.2 to about 1.8 siloxy units of the formula $CH_3SiO_{1.5}$ and from about 3 to about 4 siloxy units of the formula $(CH_3)_2QSiO1/2$, wherein M is a $—O—$ bridging group, wherein said admixture consists essentially of from about 30 to about 40 percent by weight of Unit A and from about 70 to about 60 percent by weight of Unit B, wherein Unit A represents a low molecular weight polyoxyalkylene polyether copolymer having an average molecular weight in the range of from about 900 to about 1300 wherein from about 20 to about 60 weight percent of the oxyalkylene groups of said polyether copolymer are oxyethylene, the remainder of the oxyalkylene groups being oxypropylene, said oxyalkylene groups being present in the copolymer in a random distribution, wherein Unit B represents a blend of two high molecular weight polyoxyalkylene polyether copolymers, said blend consisting of from about 55 to about 70 percent by weight of a polyoxyalkylene polyether copolymer having an average molecular weight in the range of from about 3000 to about 3400 wherein from about 20 to about 60 weight percent of the oxyalkylene groups of said polyether copolymer are oxyethylene, the remainder of the oxyalkylene groups being oxypropylene, said oxyalkylene groups being present in the copolymer in a random distribution, and from about 45 to about 30 percent by weight of a polyoxyalkylene polyether copolymer having an average molecular weight in the range of from about 3800 to about 5500 wherein from about 20 to about 60 weight percent of the oxyalkylene groups of said polyether copolymer are oxyethylene, the remainder of the oxyalkylene groups being oxypropylene, said oxyalkylene groups being present in the copolymer in a random distribution, wherein said blend of Unit B has an average molecular weight in the range from about 3400 to about 4000 and wherein said admixture of Units A and B has an average molecular weight in the range of from about 1600 to about 2100.

23. A process as defined in claim 22, wherein said block copolymer consists essentially of from about 19 to about 24 percent by weight of polysiloxane blocks and about 83 to about 74 percent by weight of polyoxyalkylene blocks, wherein Z is a n-butyl radical, wherein from about 45 to about 30 percent by weight of said blend of Unit B is a polyoxyalkylene polyether copolymer having an average molecular weight in the range of from about 4000 to about 5000, wherein about 30 to about 55 weight percent of the oxyalkylene groups of the copolymers of Units A and B are oxyethylene, the remainder of the oxyalkylene groups being oxypropylene, wherein said blend of Unit B has an average molecular weight of from about 3400 to about 3800, and wherein said admixture of Units A and B has an average molecular weight of from about 1700 to about 1900.

* * * * *

UNITED STATES PATENT OFFICE
CERTIFICATE OF CORRECTION

Patent No. 4,071,483     Dated January 31, 1978

Inventor(s)  C.J. Litteral and D.L. Mullins

It is certified that error appears in the above-identified patent and that said Letters Patent are hereby corrected as shown below:

Column 8, line 30 the formula should be

--- $Z'O(C_2H_4O)_x(C_3H_6O)_yZ$ ---.

Column 8, lines 40 to 55, the nine formulas should be

--- $HO(C_2H_4O)_x(C_3H_6O)_yCH_3$ ---

--- $HO(C_2H_4O)_x(C_3H_6O)_yC_6H_5$ ---

--- $HO(C_2H_4O)_x(C_3H_6O)_yC_2H_4C_6H_5$ ---

--- $H_2C=CH-CH_2O-(C_2H_4O)_x(C_3H_6O)_yCH_3$ ---

--- $HO-(C_2H_4O)_x(C_3H_6O)_yC_4H_9$ ---

--- $H_2C=CH-CH_2O-(C_2H_4O)_x(C_3H_6O)_yC_4H_9$ ---

--- $H_2C=CH-CH_2O-(C_2H_4O)_x(C_3H_6O)_yC_6H_5$ ---

--- $H_2C=CH-O-(C_2H_4O)_x(C_3H_6O)_yC_2H_4C_6H_5$ ---

--- $H_2C=CH-CH_2O-(C_2H_4O)_x(C_3H_6O)_yCOCH_3$ ---

UNITED STATES PATENT OFFICE
CERTIFICATE OF CORRECTION

Patent No. 4,071,483          Dated January 31, 1978

Inventor(s) C.J. Litteral and D.L. Mullins

It is certified that error appears in the above-identified patent and that said Letters Patent are hereby corrected as shown below:

Column 10, line 48, "5000⟩" should be -- 5000 --.

Column 13, line 59 and column 14, line 12 the formula should be -- $(C_2H_4O)_x(C_3H_6O)_y Z$ --.

Column 14, line 13, the formula should be -- $Z'O(C_2H_4O)_x(C_3H_6O)_y Z$ ---.

Column 18, line 20, Z''', second occurrence should be -- Z'''O ---.

Column 21, line 64, "$C_2H_5P(C)$" should be -- $C_2H_5P(O)$ --.

Column 21, line 65, "$C_6H_5(O)$" should be -- $C_2H_5P(O)$ --.

Column 24, lines 44-45, "cashions" should be -- cushions --.

Column 31, line 28, "173" should be -- 1730 --.

UNITED STATES PATENT OFFICE
CERTIFICATE OF CORRECTION

Patent No. 4,071,483            Dated January 31, 1978

Inventor(s) C.J. Litteral and D.L. Mullins

It is certified that error appears in the above-identified patent and that said Letters Patent are hereby corrected as shown below:

Column 45, line 26, delete "oxyalkylene groups of the copolymer" and insert -- was --.

Column 45, line 33 delete "remainder", first occurrance, and insert -- oxyalkylene groups of the copolymer ---.

Column 91, line 67, "100" should be -- 1000 --.

In claim 18, at column 102, line 42, "slurry" should be -- siloxy --.

In claim 21 at column 104, line 11, "$(CH_3)_2SiO1/2$" should be -- $(CH_3)_3SiO1/2$ --.

Signed and Sealed this

Twenty-fourth Day of October 1978

[SEAL]

Attest:

RUTH C. MASON
Attesting Officer

DONALD W. BANNER
Commissioner of Patents and Trademarks